(12) United States Patent
Shrivastava et al.

(10) Patent No.: US 11,735,183 B2
(45) Date of Patent: *Aug. 22, 2023

(54) CONTROLLING OPTICALLY-SWITCHABLE DEVICES

(71) Applicant: View, Inc., Milpitas, CA (US)

(72) Inventors: Dhairya Shrivastava, Los Altos, CA (US); Mark D. Mendenhall, Fremont, CA (US)

(73) Assignee: View, Inc., Milpitas, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 17/249,148

(22) Filed: Feb. 22, 2021

(65) Prior Publication Data

US 2021/0174804 A1  Jun. 10, 2021

Related U.S. Application Data

(63) Continuation of application No. 16/096,557, filed as application No. PCT/US2017/029476 on Apr. 25, (Continued)

(51) Int. Cl.
| | |
|---|---|
| *G10L 15/22* | (2006.01) |
| *G06F 21/32* | (2013.01) |
| *E06B 3/67* | (2006.01) |
| *E06B 9/24* | (2006.01) |
| *G02F 1/163* | (2006.01) |

(Continued)

(52) U.S. Cl.
CPC ............ *G10L 15/22* (2013.01); *E06B 3/6722* (2013.01); *E06B 9/24* (2013.01); *G02F 1/163* (2013.01); *G06F 3/04883* (2013.01); *G06F 3/04886* (2013.01); *G06F 3/16* (2013.01); *G06F 3/167* (2013.01); *G06F 21/32* (2013.01); *G10L 15/26* (2013.01); *E06B 2009/2464* (2013.01); *G06F 2203/0381* (2013.01); *G10L 2015/223* (2013.01)

(58) Field of Classification Search
CPC ...... E06B 3/6722; E06B 9/24; G06F 3/04883; G06F 3/04886; G06F 3/16; G06F 21/32

See application file for complete search history.

(56) References Cited

U.S. PATENT DOCUMENTS

| | | |
|---|---|---|
| 5,124,833 A | 6/1992 | Barton et al. |
| 5,170,108 A | 12/1992 | Peterson et al. |

(Continued)

FOREIGN PATENT DOCUMENTS

| | | |
|---|---|---|
| CN | 2590732 Y | 12/2003 |
| CN | 1526132 A | 9/2004 |

(Continued)

OTHER PUBLICATIONS

U.S. Appl. No. 62/102,516, filed Jan. 12, 2015, Nagel et al.

(Continued)

*Primary Examiner* — Douglas Godbold
(74) *Attorney, Agent, or Firm* — Weaver Austin Villeneuve & Sampson LLP; Brian D. Griedel

(57) ABSTRACT

This disclosure relates generally to optically switchable devices, and more particularly, to methods for controlling optically switchable devices. In various embodiments, one or more optically switchable devices may be controlled via voice control and/or gesture control.

19 Claims, 12 Drawing Sheets

Related U.S. Application Data 2017, said application No. 16/096,557 is a continuation-in-part of application No. 14/391,122, filed as application No. PCT/US2013/036456 on Apr. 12, 2013, now Pat. No. 10,365,531.

(60) Provisional application No. 62/327,880, filed on Apr. 26, 2016, provisional application No. 61/624,175, filed on Apr. 13, 2012.

(51) Int. Cl.
*G06F 3/04883* (2022.01)
*G06F 3/16* (2006.01)
*G10L 15/26* (2006.01)
*G06F 3/04886* (2022.01)

(56) References Cited

U.S. PATENT DOCUMENTS

| | | |
|---|---|---|
| 5,204,778 A | 4/1993 | Bechtel |
| 5,220,317 A | 6/1993 | Lynam et al. |
| 5,290,986 A | 3/1994 | Colon et al. |
| 5,353,148 A | 10/1994 | Eid et al. |
| 5,365,365 A | 11/1994 | Ripoche et al. |
| 5,379,146 A | 1/1995 | Defendini |
| 5,384,578 A | 1/1995 | Lynam et al. |
| 5,402,144 A | 3/1995 | Ripoche |
| 5,451,822 A | 9/1995 | Bechtel et al. |
| 5,579,149 A | 11/1996 | Moret et al. |
| 5,598,000 A | 1/1997 | Popat |
| 5,621,526 A | 4/1997 | Kuze |
| 5,673,028 A | 9/1997 | Levy |
| 5,694,144 A | 12/1997 | Lefrou et al. |
| 5,764,402 A | 6/1998 | Thomas et al. |
| 5,822,107 A | 10/1998 | Lefrou et al. |
| 5,900,720 A | 5/1999 | Kallman et al. |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen et al. |
| 6,039,850 A | 3/2000 | Schulz et al. |
| 6,055,089 A | 4/2000 | Schulz et al. |
| 6,084,700 A | 7/2000 | Knapp et al. |
| 6,130,448 A | 10/2000 | Bauer et al. |
| 6,130,772 A | 10/2000 | Cava |
| 6,222,177 B1 | 4/2001 | Bechtel et al. |
| 6,262,831 B1 | 7/2001 | Bauer et al. |
| 6,386,713 B1 | 5/2002 | Turnbull et al. |
| 6,407,468 B1 | 6/2002 | LeVesque et al. |
| 6,407,847 B1 | 6/2002 | Poll et al. |
| 6,449,082 B1 | 9/2002 | Agrawal et al. |
| 6,471,360 B2 | 10/2002 | Rukavina et al. |
| 6,535,126 B2 | 3/2003 | Lin et al. |
| 6,567,708 B1 | 5/2003 | Bechtel et al. |
| 6,614,577 B1 | 9/2003 | Yu et al. |
| 6,795,226 B2 | 9/2004 | Agrawal et al. |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,940,627 B2 | 9/2005 | Freeman et al. |
| 6,988,070 B2 * | 1/2006 | Kawasaki .............. G10L 15/26 704/E15.045 |
| 7,085,609 B2 | 8/2006 | Bechtel et al. |
| 7,133,181 B2 | 11/2006 | Greer |
| 7,215,318 B2 | 5/2007 | Turnbull et al. |
| 7,277,215 B2 | 10/2007 | Greer |
| 7,304,787 B2 | 12/2007 | Sides et al. |
| 7,391,420 B1 | 6/2008 | Coyne |
| 7,417,397 B2 | 8/2008 | Berman et al. |
| 7,542,809 B2 | 6/2009 | Bechtel et al. |
| 7,548,833 B2 | 6/2009 | Ahmed |
| 7,567,183 B2 | 7/2009 | Schwenke |
| 7,610,910 B2 | 11/2009 | Ahmed |
| 7,684,105 B2 | 3/2010 | Lamontagne |
| 7,800,812 B2 | 9/2010 | Moskowitz |
| 7,817,326 B1 | 10/2010 | Rennig et al. |
| 7,822,490 B2 | 10/2010 | Bechtel et al. |
| 7,873,490 B2 | 1/2011 | MacDonald |
| 7,941,245 B1 | 5/2011 | Popat |
| 7,962,326 B2 * | 6/2011 | Tsourikov .............. G06F 40/30 707/706 |
| 7,966,078 B2 | 6/2011 | Hoffberg et al. |
| 7,972,021 B2 | 7/2011 | Scherer |
| 7,990,603 B2 | 8/2011 | Ash et al. |
| 8,004,739 B2 | 8/2011 | Letocart |
| 8,018,644 B2 | 9/2011 | Gustavsson et al. |
| 8,024,073 B2 | 9/2011 | Imes et al. |
| 8,102,586 B2 | 1/2012 | Albahri |
| 8,213,074 B1 | 7/2012 | Shrivastava et al. |
| 8,214,494 B1 | 7/2012 | Slavin |
| 8,254,013 B2 | 8/2012 | Mehtani et al. |
| 8,292,228 B2 | 10/2012 | Mitchell et al. |
| 8,340,975 B1 * | 12/2012 | Rosenberger .......... G10L 15/22 704/274 |
| 8,456,729 B2 | 6/2013 | Brown et al. |
| 8,509,400 B2 | 8/2013 | Liu et al. |
| 8,533,580 B1 | 9/2013 | Xu |
| 8,547,624 B2 | 10/2013 | Ash et al. |
| 8,705,162 B2 | 4/2014 | Brown et al. |
| 8,723,467 B2 | 5/2014 | Berman et al. |
| 8,764,950 B2 | 7/2014 | Wang et al. |
| 8,836,263 B2 | 9/2014 | Berman et al. |
| 8,864,321 B2 | 10/2014 | Mehtani et al. |
| 8,902,486 B1 | 12/2014 | Chandrasekhar |
| 8,921,473 B1 * | 12/2014 | Hyman ................... C08K 3/04 524/495 |
| 8,976,440 B2 | 3/2015 | Berland et al. |
| 9,016,630 B2 | 4/2015 | Mitchell et al. |
| 9,030,725 B2 | 5/2015 | Pradhan et al. |
| 9,081,247 B1 | 7/2015 | Pradhan et al. |
| 9,390,726 B1 * | 7/2016 | Smus ..................... G06F 3/017 |
| 9,470,947 B2 | 10/2016 | Nagel et al. |
| 9,536,527 B1 * | 1/2017 | Carlson ................. H04L 43/14 |
| 9,677,327 B1 | 6/2017 | Nagel et al. |
| 9,749,583 B1 * | 8/2017 | Fineberg ............... H04L 67/52 |
| 9,898,912 B1 | 2/2018 | Jordan, II et al. |
| 9,984,686 B1 * | 5/2018 | Mutagi ................. G10L 15/22 |
| 10,286,839 B1 | 5/2019 | Mazuir et al. |
| 10,288,971 B2 | 5/2019 | Philips et al. |
| 10,329,839 B2 | 6/2019 | Fasi et al. |
| 10,365,531 B2 | 7/2019 | Shrivastava et al. |
| 10,867,266 B1 | 12/2020 | Carlin et al. |
| 10,921,675 B2 | 2/2021 | Barnum et al. |
| 10,964,320 B2 * | 3/2021 | Shrivastava ........... G10L 15/26 |
| 10,982,487 B2 | 4/2021 | Ramirez |
| 11,073,800 B2 | 7/2021 | Shrivastava et al. |
| 11,205,926 B2 | 12/2021 | Shrivastava et al. |
| 11,592,723 B2 | 2/2023 | Shrivastava et al. |
| 2002/0027504 A1 | 3/2002 | Davis et al. |
| 2002/0075472 A1 | 6/2002 | Holton |
| 2002/0113168 A1 | 8/2002 | Rukavina et al. |
| 2002/0152298 A1 | 10/2002 | Kikta et al. |
| 2003/0046072 A1 * | 3/2003 | Ramaswamy ......... G10L 17/02 704/240 |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0135989 A1 | 7/2004 | Klebe |
| 2004/0160322 A1 | 8/2004 | Stilp |
| 2004/0215520 A1 | 10/2004 | Butler et al. |
| 2005/0063036 A1 | 3/2005 | Bechtel et al. |
| 2005/0200934 A1 | 9/2005 | Callahan et al. |
| 2005/0200937 A1 | 9/2005 | Weidner |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0278047 A1 | 12/2005 | Ahmed |
| 2006/0001683 A1 | 1/2006 | May et al. |
| 2006/0018000 A1 | 1/2006 | Greer |
| 2006/0107616 A1 | 5/2006 | Ratti et al. |
| 2006/0170376 A1 * | 8/2006 | Piepgras ............... H05B 47/105 315/295 |

(56) References Cited

U.S. PATENT DOCUMENTS

| | | |
|---|---|---|
| 2006/0179376 A1 | 8/2006 | Asaka |
| 2006/0187608 A1 | 8/2006 | Stark |
| 2006/0209007 A1 | 9/2006 | Pyo et al. |
| 2006/0245024 A1 | 11/2006 | Greer |
| 2007/0002007 A1 | 1/2007 | Tam |
| 2007/0053053 A1 | 3/2007 | Moskowitz |
| 2007/0067048 A1 | 3/2007 | Bechtel et al. |
| 2007/0097484 A1 | 5/2007 | Libretto et al. |
| 2007/0162233 A1 | 7/2007 | Schwenke |
| 2007/0285759 A1 | 12/2007 | Ash et al. |
| 2008/0018979 A1 | 1/2008 | Mahe et al. |
| 2008/0043316 A2 | 2/2008 | Moskowitz |
| 2008/0048101 A1 | 2/2008 | Romig et al. |
| 2008/0211682 A1 | 9/2008 | Hyland et al. |
| 2009/0015740 A1 | 1/2009 | Sagitov et al. |
| 2009/0027759 A1 | 1/2009 | Albahri |
| 2009/0066157 A1 | 3/2009 | Tarng et al. |
| 2009/0143141 A1 | 6/2009 | Wells et al. |
| 2009/0187405 A1* | 7/2009 | Bhogal .................. G10L 17/00 704/246 |
| 2009/0243732 A1 | 10/2009 | Tarng et al. |
| 2009/0243802 A1 | 10/2009 | Wolf et al. |
| 2009/0257576 A1 | 10/2009 | Wellard et al. |
| 2010/0039410 A1 | 2/2010 | Becker et al. |
| 2010/0066484 A1 | 3/2010 | Hanwright et al. |
| 2010/0082081 A1 | 4/2010 | Niessen et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0228854 A1 | 9/2010 | Morrison et al. |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0274366 A1 | 10/2010 | Fata et al. |
| 2010/0302624 A1 | 12/2010 | Moskowitz |
| 2010/0315693 A1 | 12/2010 | Lam et al. |
| 2011/0046810 A1 | 2/2011 | Bechtel et al. |
| 2011/0063708 A1 | 3/2011 | Letocart |
| 2011/0097081 A1 | 4/2011 | Gupta et al. |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0184561 A1 | 7/2011 | Klasson et al. |
| 2011/0235152 A1 | 9/2011 | Letocart |
| 2011/0249313 A1 | 10/2011 | Letocart |
| 2011/0255142 A1 | 10/2011 | Ash et al. |
| 2011/0266419 A1 | 11/2011 | Jones et al. |
| 2011/0292488 A1 | 12/2011 | McCarthy et al. |
| 2011/0304898 A1 | 12/2011 | Letocart |
| 2011/0307112 A1 | 12/2011 | Barrilleaux |
| 2012/0190386 A1 | 1/2012 | Anderson |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0089488 A1 | 4/2012 | Letchford |
| 2012/0105257 A1 | 5/2012 | Murillo et al. |
| 2012/0133315 A1* | 5/2012 | Berman .................. E06B 9/68 359/275 |
| 2012/0153868 A1 | 6/2012 | Gu et al. |
| 2012/0194895 A1 | 8/2012 | Podbelski et al. |
| 2012/0200908 A1 | 8/2012 | Bergh et al. |
| 2012/0232969 A1 | 9/2012 | Fadell et al. |
| 2012/0236386 A1 | 9/2012 | Mehtani et al. |
| 2012/0239209 A1 | 9/2012 | Brown et al. |
| 2012/0268803 A1 | 10/2012 | Greer |
| 2012/0293855 A1 | 11/2012 | Shrivastava et al. |
| 2013/0057937 A1* | 3/2013 | Berman .................. G05B 13/04 359/245 |
| 2013/0073681 A1 | 3/2013 | Jiang et al. |
| 2013/0085614 A1 | 4/2013 | Wenzel et al. |
| 2013/0158790 A1 | 6/2013 | McIntyre, Jr. et al. |
| 2013/0196600 A1 | 8/2013 | Capers et al. |
| 2013/0226353 A1 | 8/2013 | Park |
| 2013/0242370 A1 | 9/2013 | Wang |
| 2013/0263510 A1 | 10/2013 | Gassion |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0289999 A1* | 10/2013 | Hymel .................. H04R 3/005 704/273 |
| 2013/0307771 A1* | 11/2013 | Parker .................. G06F 3/167 345/158 |
| 2014/0067733 A1 | 3/2014 | Humann |
| 2014/0098007 A1 | 4/2014 | Delpier et al. |
| 2014/0101573 A1 | 4/2014 | Kuo |
| 2014/0142937 A1* | 5/2014 | Powledge ............... G06F 3/017 704/235 |
| 2014/0160550 A1 | 6/2014 | Brown et al. |
| 2014/0169795 A1* | 6/2014 | Clough .................. H04W 88/02 398/106 |
| 2014/0172430 A1* | 6/2014 | Rutherford ............ G06Q 20/20 704/273 |
| 2014/0172557 A1 | 6/2014 | Eden et al. |
| 2014/0185284 A1 | 7/2014 | Hsu et al. |
| 2014/0229174 A1* | 8/2014 | Graumann ............ G06V 40/28 704/231 |
| 2014/0236323 A1 | 8/2014 | Brown et al. |
| 2014/0259931 A1 | 9/2014 | Plummer |
| 2014/0268287 A1 | 9/2014 | Brown et al. |
| 2014/0300945 A1 | 10/2014 | Parker |
| 2014/0330538 A1 | 11/2014 | Conklin et al. |
| 2014/0330569 A1* | 11/2014 | Kolavennu ......... G10L 15/1815 704/275 |
| 2014/0347190 A1 | 11/2014 | Grimm |
| 2014/0349497 A1 | 11/2014 | Brown et al. |
| 2014/0358553 A1 | 12/2014 | Helmke et al. |
| 2014/0371931 A1 | 12/2014 | Lin et al. |
| 2014/0379353 A1* | 12/2014 | Boies ..................... G10L 15/22 704/275 |
| 2015/0002919 A1 | 1/2015 | Jack et al. |
| 2015/0003822 A1 | 1/2015 | Fukada et al. |
| 2015/0023661 A1 | 1/2015 | Borkenhagen et al. |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0112667 A1* | 4/2015 | Kozuka .................. G06F 3/167 704/201 |
| 2015/0116811 A1* | 4/2015 | Shrivastava ............ H04Q 9/00 359/275 |
| 2015/0122474 A1 | 5/2015 | Peterson |
| 2015/0162006 A1 | 6/2015 | Kummer |
| 2015/0293422 A1 | 10/2015 | Pradhan et al. |
| 2015/0348554 A1 | 12/2015 | Orr et al. |
| 2016/0040478 A1* | 2/2016 | Lundy .................. G05B 15/02 700/275 |
| 2016/0054633 A1 | 2/2016 | Brown et al. |
| 2016/0154290 A1 | 6/2016 | Brown et al. |
| 2016/0170206 A1* | 6/2016 | Osborne ............... G02B 27/017 345/8 |
| 2016/0203403 A1 | 7/2016 | Nagel et al. |
| 2016/0261837 A1 | 9/2016 | Thompson et al. |
| 2016/0266461 A1 | 9/2016 | Yamamoto |
| 2016/0266878 A1 | 9/2016 | Mankovskii |
| 2016/0299210 A1 | 10/2016 | Zeine |
| 2016/0327293 A1 | 11/2016 | Grabowski et al. |
| 2016/0358603 A1* | 12/2016 | Azam .................. G10L 15/26 |
| 2017/0075183 A1 | 3/2017 | Brown |
| 2017/0076721 A1* | 3/2017 | Bargetzi ............... G10L 15/22 |
| 2017/0080341 A1 | 3/2017 | Mao et al. |
| 2017/0082903 A1 | 3/2017 | Vigano et al. |
| 2017/0092269 A1* | 3/2017 | Haubrich ............. H04R 25/554 |
| 2017/0188437 A1* | 6/2017 | Banta .................. G10L 15/00 |
| 2017/0234067 A1 | 8/2017 | Fasi et al. |
| 2017/0251488 A1 | 8/2017 | Urban et al. |
| 2017/0285432 A1 | 10/2017 | Shrivastava et al. |
| 2018/0090992 A1 | 3/2018 | Shrivastava et al. |
| 2018/0122366 A1* | 5/2018 | Nishikawa ............ G10L 15/26 |
| 2018/0129172 A1 | 5/2018 | Shrivastava et al. |
| 2018/0284555 A1 | 10/2018 | Klawuhn et al. |
| 2018/0293981 A1* | 10/2018 | Ni ......................... G10L 17/22 |
| 2018/0321042 A1 | 11/2018 | Brewer et al. |
| 2018/0335939 A1 | 11/2018 | Karunamuni et al. |

(56) References Cited

U.S. PATENT DOCUMENTS

| | | |
|---|---|---|
| 2019/0097827 A1 | 3/2019 | Angle et al. |
| 2019/0138740 A1 | 5/2019 | Shrivastava et al. |
| 2019/0235451 A1 | 8/2019 | Shrivastava et al. |
| 2019/0294018 A1 | 9/2019 | Shrivastava et al. |
| 2019/0346734 A1 | 11/2019 | Shrivastava et al. |
| 2019/0354071 A1 | 11/2019 | Turney et al. |
| 2020/0193155 A1 | 6/2020 | Keohane et al. |
| 2020/0387041 A1 | 12/2020 | Shrivastava et al. |
| 2021/0126063 A1 | 4/2021 | Vanderveen et al. |
| 2021/0210053 A1 | 7/2021 | Ng et al. |
| 2021/0373511 A1 | 12/2021 | Shrivastava et al. |
| 2022/0159077 A1 | 5/2022 | Shrivastava et al. |
| 2022/0365494 A1 | 11/2022 | Shrivastava et al. |

FOREIGN PATENT DOCUMENTS

| | | |
|---|---|---|
| CN | 1808505 A | 7/2006 |
| CN | 101013211 A | 8/2007 |
| CN | 101023711 A | 8/2007 |
| CN | 101213788 A | 7/2008 |
| CN | 101969207 A | 2/2011 |
| CN | 102203370 A | 9/2011 |
| CN | 102792764 A | 11/2012 |
| CN | 103226950 A | 7/2013 |
| CN | 104335595 A | 2/2015 |
| CN | 104395677 A | 3/2015 |
| CN | 104424947 A | 3/2015 |
| CN | 105143586 A | 12/2015 |
| CN | 106125444 A | 11/2016 |
| DE | 10124673 A1 | 11/2002 |
| EP | 0445314 | 9/1991 |
| EP | 0869032 | 10/1998 |
| EP | 0835475 B1 | 9/2004 |
| EP | 1510854 A1 | 3/2005 |
| EP | 1417535 | 11/2005 |
| EP | 1619546 A2 | 1/2006 |
| EP | 0920210 | 6/2009 |
| EP | 2090961 A1 | 8/2009 |
| EP | 2161615 | 3/2010 |
| EP | 2357544 | 8/2011 |
| EP | 2764998 A1 | 8/2014 |
| EP | 3352053 A1 | 7/2018 |
| JP | 63-208830 | 8/1988 |
| JP | 02-132420 | 5/1990 |
| JP | 05-178645 | 7/1993 |
| JP | 10-063216 | 3/1998 |
| JP | 2004-245985 | 9/2004 |
| JP | 2009116352 A | 5/2009 |
| JP | 4694816 B2 | 6/2011 |
| JP | 4799113 B2 | 10/2011 |
| JP | 2012028015 A | 2/2012 |
| JP | 2013-057975 A | 3/2013 |
| JP | 2015509204 A | 3/2015 |
| JP | 2016502355 A | 1/2016 |
| KR | 20-0412640 | 3/2006 |
| KR | 10-752041 B1 | 8/2007 |
| KR | 10-2008-0022319 | 3/2008 |
| KR | 10-2009-0026181 | 3/2009 |
| KR | 10-0904847 B1 | 6/2009 |
| KR | 10-0931183 | 12/2009 |
| KR | 10-2010-0034361 | 4/2010 |
| KR | 10-2011-0003698 | 1/2011 |
| KR | 10-2011-0094672 | 8/2011 |
| KR | 20110128213 A | 11/2011 |
| RU | 2378672 C2 | 10/2010 |
| RU | 2009132962 A | 10/2010 |
| TW | 201115503 A | 5/2011 |
| TW | 201535157 A | 9/2015 |
| TW | 201631551 A | 9/2016 |
| WO | WO1998/016870 | 4/1998 |
| WO | WO2002/013052 | 2/2002 |
| WO | WO2004/003649 | 1/2004 |
| WO | WO2005/098811 | 10/2005 |
| WO | WO2005/103807 | 11/2005 |
| WO | WO2007/016546 A2 | 2/2007 |
| WO | WO2007/146862 | 12/2007 |
| WO | WO2008/030018 | 3/2008 |
| WO | WO2008/147322 | 12/2008 |
| WO | WO2009/042359 A1 | 4/2009 |
| WO | WO2009/124647 | 10/2009 |
| WO | WO-2010079388 A1 | 7/2010 |
| WO | WO2010/120771 | 10/2010 |
| WO | WO2011/020478 | 2/2011 |
| WO | WO2011/087684 | 7/2011 |
| WO | WO2011/087687 | 7/2011 |
| WO | WO2011/124720 | 10/2011 |
| WO | WO2011/127015 | 10/2011 |
| WO | WO2012/079159 | 6/2012 |
| WO | WO2012/080618 | 6/2012 |
| WO | WO2012/080656 | 6/2012 |
| WO | WO2012/080657 | 6/2012 |
| WO | WO2012/145155 | 10/2012 |
| WO | WO2013/059674 | 4/2013 |
| WO | WO2013/109881 | 7/2013 |
| WO | WO-2013101066 A1 | 7/2013 |
| WO | WO2013/155467 | 10/2013 |
| WO | WO2014/121863 | 8/2014 |
| WO | WO2014/130471 | 8/2014 |
| WO | WO2014/134451 | 9/2014 |
| WO | WO2014/209812 A1 | 12/2014 |
| WO | WO2015/077097 A1 | 5/2015 |
| WO | WO2015/134789 | 9/2015 |
| WO | WO2015/168626 | 11/2015 |
| WO | WO-2015171886 A1 | 11/2015 |
| WO | WO2016/004109 | 1/2016 |
| WO | WO-2016037772 A1 | 3/2016 |
| WO | WO2016/094445 | 6/2016 |
| WO | WO2017/059362 | 4/2017 |
| WO | WO2017/075059 | 5/2017 |
| WO | WO2017/155833 | 9/2017 |
| WO | WO2017/189618 | 11/2017 |
| WO | WO2017/192881 | 11/2017 |
| WO | WO2018/098089 | 5/2018 |
| WO | WO2018/200740 | 11/2018 |
| WO | WO2018/200752 | 11/2018 |

OTHER PUBLICATIONS

U.S. Appl. No. 62/102,515, filed Jan. 12, 2015, Nagar et al.
U.S. Appl. No. 14/468,778, filed Aug. 26, 2014.
U.S. Office Action dated Jan. 18, 2013 in U.S. Appl. No. 13/049,756.
U.S. Final Office Action dated Aug. 19, 2013 in U.S. Appl. No. 13/049,756.
U.S. Office Action dated Oct. 6, 2014 in U.S. Appl. No. 13/049,756.
U.S. Final Office Action dated Jul. 2, 2015 in U.S. Appl. No. 13/049,756.
U.S. Office Action dated Oct. 6, 2014 in U.S. Appl. No. 13/968,258 21.
U.S. Final Office Action dated Jun. 5, 2015 U.S. Appl. No. 13/968,258.
U.S. Office Action dated Feb. 3, 2012 in U.S. Appl. No. 13/049,750.
U.S. Final Office Action dated Apr. 30, 2012 in U.S. Appl. No. 13/049,750.
U.S. Notice of Allowance dated May 8, 2012 in U.S. Appl. No. 13/049,750.
U.S. Office Action dated Sep. 23, 2013 in U.S. Appl. No. 13/479,137.
U.S. Final Office Action dated Jan. 27, 2014 in U.S. Appl. No. 13/479,137.
U.S. Office Action dated Jul. 3, 2014 in U.S. Appl. No. 13/479,137.
U.S. Final Office Action dated Feb. 26, 2015 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Jan. 16, 2015 in U.S. Appl. No. 14/468,778.
U.S. Office Action dated Mar. 27, 2012 in U.S. Appl. No. 13/049,623.
U.S. Notice of Allowance dated Jul. 20, 2012 in U.S. Appl. No. 13/049,623.
U.S. Office Action dated Dec. 24, 2013 in U.S. Appl. No. 13/309,990.
Notice of Allowanced dated Jun. 17, 2014 in U.S. Appl. No. 13/309,990.

(56) References Cited

OTHER PUBLICATIONS

U.S. Office Action dated Oct. 11, 2013 in U.S. Appl. No. 13/449,235.
U.S. Notice of Allowance dated Jan. 10, 2014 in U.S. Appl. No. 13/449,235.
U.S. Office Action dated Feb. 24, 2015 in U.S. Appl. No. 14/163,026.
U.S. Office Action dated Nov. 18, 2016 in U.S. Appl. No. 14/391,122.
U.S. Office Action dated Jul. 3, 2017 in U.S. Appl. No. 14/391,122.
U.S. Final Office Action dated Feb. 8, 2018 in U.S. Appl. No. 14/391,122.
U.S. Office Action dated Sep. 1, 2017 in U.S. Appl. No. 14/391,122.
U.S. Office Action dated Jun. 22, 2018 in U.S. Appl. No. 14/391,122.
U.S. Final Office Action dated Nov. 20, 2018 in U.S. Appl. No. 14/391,122.
U.S. Notice of Allowance dated Mar. 11, 2019 in U.S. Appl. No. 14/391,122.
U.S. Office Action dated Nov. 29, 2013 in U.S. Appl. No. 13/449,248.
U.S. Office Action dated Nov. 29, 2013 in U.S. Appl. No. 13/449,251.
U.S. Office Action dated May 16, 2014 in U.S. Appl. No. 13/449,248.
U.S. Office Action dated Sep. 29, 2014 in U.S. Appl. No. 13/449,248.
U.S. Final Office Action dated May 15, 2014 in U.S. Appl. No. 13/449,251.
U.S. Office Action dated Oct. 28, 2014 in U.S. Appl. No. 13/449,251.
U.S. Office Action dated Jun. 3, 2015 in U.S. Appl. No. 13/449,251.
U.S. Office Action dated Sep. 15, 2014 in U.S. Appl. No. 13/682,618.
U.S. Notice of Allowance dated Jan. 22, 2015 in U.S. Appl. No. 13/682,618.
U.S. Notice of Allowance dated Apr. 13, 2015 in U.S. Appl. No. 14/657,380.
U.S. Office Action dated Sep. 30, 2020 in U.S. Appl. No. 16/254,434.
U.S. Office Action dated May 18, 2020 in U.S. Appl. No. 16/096,557.
U.S. Final Office Action dated Nov. 5, 2020 in U.S. Appl. No. 16/096,557.
U.S. Notice of Allowance dated Jan. 13, 2021 in U.S. Appl. No. 16/096,557.
Letter dated Dec. 1, 2014 re Prior Art re U.S. Appl. No. 13/772,969 from Ryan D. Ricks representing MechoShade Systems, Inc.
Submission dated Feb. 2, 2015 and Feb. 18, 2015 PTO Notice re submission for U.S. Appl. No. 13/772,969.
European Search Report dated Aug. 11, 2014 in European Application No. 12757877.1.
International Search Report and Written Opinion dated Sep. 26, 2012, issued in PCT/US2012/027828.
International Preliminary Report on Patentability dated Sep. 26, 2013, issued in PCT/US2012/027828.
European Search Report dated Jul. 29, 2014 in European Application No. 12758250.0.
International Search Report and Written Opinion dated Sep. 24, 2012, issued in PCT/US2012/027909.
International Preliminary Report on Patentability dated Sep. 26, 2013, issued in PCT/US2012/027909.
European Search Report dated Jul. 23, 2014 in European Application No. 12756917.6.
International Search Report and Written Opinion dated Sep. 24, 2012, issued in PCT/US212/027742.
International Preliminary Report on Patentability dated Sep. 26, 2013, issued in PCT/US2012/027742.
Chinese Office Action dated Mar. 26, 2015 in Chinese Application No. 2015032301101560.
European Report dated Mar. 5, 2015 in European Application No. 12841714.4.
International Search Report and Written Opinion dated Mar. 28, 2013 in PCT/US2012/061137.
International Preliminary Report on Patentability dated May 1, 2014 in PCT/US2012/061137.
International Search Report and Written Opinion dated Jul. 23, 2013, issued in PCT/US2013/036235.
International Preliminary Report on Patentability dated Oct. 30, 2014 issued in PCT/US2013/036235.
Chinese Office Action dated Jun. 21, 2017 in CN Application No. 201380025802.1.
Chinese Office Action dated Jan. 15, 2018 in CN Application No. 201380025802.1.
Chinese Office Action dated Nov. 23, 2020 in CN Application No. 201810932986.4.
Chinese Office Action dated May 20, 2020 in CN Application No. 201810932986.4.
European (extended) Search Report dated Dec. 4, 2015 in European Application No. 13775052.7.
European (extended) Search Report dated Aug. 25, 2017 in European Application No. 17156033.7.
Indian Office Action dated Sep. 17, 2019 in Indian Application No. 2533/KOLNP/2014.
Russian Office Action dated Mar. 9, 2017 in Russian Application No. 2014145565.
International Search Report and Written Opinion dated Jul. 26, 2013, issued in PCT/US2013/036456.
International Preliminary Report on Patentability dated Oct. 23, 2014 issued in PCT/US2013/036456.
International Search Report and Written Opinion dated Jul. 11, 2013, issued in PCT/US2013/034998.
International Preliminary Report on Patentability dated Oct. 30, 2014 issued in PCT/US2013/034998.
International Search Report and Written Opinion dated Dec. 26, 2013, issued in PCT/US2013/053625.
International Preliminary Report on Patentability dated Feb. 19, 2015 issued in PCT/US2013/053625.
International Search Report and Written Opinion dated May 26, 2014, issued in PCT/US2014/016974.
Communication re Third-Party Observation dated Dec. 4, 2014 and Third-Party dated Dec. 3, 2014 in PCT/US2014/016974.
International Search Report and Written Opinion dated Oct. 16, 2014, issued in PCT/US2014/043514.
European Extended Search Report and Opinion dated Nov. 7, 2019 in European No. 17790290.5.
International Preliminary Report on Patentability dated Nov. 8, 2018 in PCT/US2017/29476.
International Search Report and Written Opinion (ISA:KR) dated Jul. 18, 2017, PCT/US2017/29476.
European Extended Search Report and Opinion dated May 20, 2020 in European Application No. 17874769.7.
International Preliminary Report on Patentability (ISA:KR) dated Jun. 6, 2019, issued in PCT/US2017/062634.
International Search Report and Written Opinion (ISA:KR) dated Mar. 19, 2018, issued in PCT/US2017/062634.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
"How Cleantech wants to make a 2012 comeback" http://mountainview.patch.com/articles/how-cleantech-wants-to-make-a-2012-comeback, Jan. 23, 2012.
APC by Schneider Electric, Smart-UPS 120V Product Brochure, 2013, 8 pp.
Hoosier Energy, "How do they do that? Measuring Real-Time Cloud Activity" Hoosier Energy Current Connections, undated. (http://members.questline.com/Article.aspx?articleID=18550&accountID=196000&nl.
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Haby, Jeff, "Cloud Detection (IR v. VIS)," (undated) [http://theweatherprediction.com/habyhints2/512/].
Graham, Steve, "Clouds & Radiation," Mar. 1, 1999. [http://earthobservatory.nasa.gov/Features/Clouds/].

(56) References Cited

OTHER PUBLICATIONS

National Aeronautics & Space Administration, "Cloud Radar System (CRS)," (undated) [http://har.gsfc.nasa.gov/index.php?section=12].
Science and Technology Facilities Council. "Cloud Radar: Predicting the Weather More Accurately." ScienceDaily, Oct. 1, 2008. [www.sciencedaily.com/releases/2008/09/080924085200.htm].
"Remote Sensing: Clouds," Department of Atmospheric and Ocean Science, University of Maryland, (undated) [http://www.atmos.umd.edu/~pinker/remote_sensing_clouds.htm].
National Aeronautics & Space Administration, "Cloud Remote Sensing and Modeling," (undated) [http://atmospheres.gsfc.nasa.gov/climate/index.php?section=134].
Kipp & Zonen, "Solar Radiation" (undated) [http://www.kippzonen.com/Knowledge-Center/Theoretical-info/Solar-Radiation].
Duchon, Claude E. et al., "Estimating Cloud Type from Pyranometer Observations," Journal of Applied Meteorology, vol. 38, Jan. 1999, pp. 132-141.
Lululemon athletica, "Mirror", The Mirror Gym product brochure, known Dec. 8, 2020, 9 pp, <<https://shop.lululemon.com/story/mirror-home-gym>>, retrieved Jan. 29, 2021.
U.S. Appl. No. 63/010,977, filed Apr. 16, 2020, Makker et al.
U.S. Appl. No. 63/080,899, filed Sep. 21, 2020, Makker et al.
AU Examination Report dated Jun. 3, 2021, in the application No. AU2017257789.
AU Office action dated Dec. 5, 2022, in AU Application No. AU2017363581.
AU Office Action dated Dec. 7, 2021, in Application No. AU2017257789.
AU Office Action dated Jun. 1, 2022, in Application No. AU2017257789.
AU Office Action dated May 13, 2022, in Application No. AU2017257789.
CN Office Action dated Aug. 30, 2021, in CN Application No. 201780035569.3 with English translation.
CN Office Action dated Jan. 28, 2023 in Application No. CN201780035569.3 with English translation.
CN Office Action dated May 7, 2022, in Application No. CN201780035569.3 with English translation.
EP Office Action dated Apr. 13, 2022, in Application No. EP17874769.7.
EP Office Action dated Oct. 5, 2021, in application No. EP17874769.7.
European Office Action dated Aug. 30, 2022 in Application No. EP17790290.5.
IN Office Action dated Jun. 21, 2021, in IN Application No. 201817042037.
IN Office Action dated Oct. 7, 2022, in Application No. IN202118056857.
Indian Office Action dated Jul. 6, 2022, in IN Application No. 201917018642.
International Search Report and Written Opinion dated Aug. 8, 2022, in Application No. PCT/US2022/023605.
International Search Report and Written Opinion dated Aug. 5, 2021 in PCT Application No. PCT/US2021/027418.
International Search Report and Written Opinion dated Jul. 6, 2022, in PCT Application No. PCT/US2022/020730.
Japanese Office Action dated Mar. 23, 2021 in JP Application No. 2018-555922.
JP Office Action dated Nov. 2, 2021, in JP Application No. JP20180555922.
KR Office Action dated Dec. 14, 2021, in Application No. KR1020187034166 with English translation.
KR Office Action dated Sep. 20, 2022, in Application No. KR10-2018-7034166 with English translation.
Taiwanese Office Action dated Apr. 16, 2021 in TW Application No. 106140690.
TW Office Action dated Sep. 28, 2022, in Application No. TW111130926 with English translation.
U.S. Notice of Allowance dated Jan. 11, 2023 in U.S. Appl. No. 16/946,947.
U.S. Non-Final office Action dated Nov. 15, 2022 in U.S. Appl. No. 17/355,086.
U.S. Non-Final office Action dated Sep. 9, 2022 in U.S. Appl. No. 16/946,947.
U.S. Notice of Allowance dated Dec. 20, 2022 in U.S. Appl. No. 16/946,947.
U.S. Notice of Allowance dated Feb. 14, 2023 in U.S. Appl. No. 17/355,086.
U.S. Notice of Allowance dated Mar. 26, 2021 in U.S. Appl. No. 16/254,434.
U.S. Appl. No. 18/100,773, inventors Shrivastava et al., filed Jan. 24, 2023.

* cited by examiner

CONTROLLING OPTICALLY-SWITCHABLE DEVICES

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in their entireties and for all purposes.

TECHNICAL FIELD

This disclosure relates generally to optically switchable devices, and more particularly, to methods and apparatus for controlling optically switchable devices

BACKGROUND

The development and deployment of optically switchable windows have increased as considerations of energy efficiency and system integration gain momentum. Electrochromic windows are a promising class of optically switchable windows. Electrochromism is a phenomenon in which a material exhibits a reversible electrochemically-mediated change in one or more optical properties when stimulated to a different electronic state. Electrochromic materials and the devices made from them may be incorporated into, for example, windows for home, commercial, or other use. The color, tint, transmittance, absorbance, or reflectance of electrochromic windows can be changed by inducing a change in the electrochromic material, for example, by applying a voltage across the electrochromic material. Such capabilities can allow for control over the intensities of various wavelengths of light that may pass through the window. One area of relatively recent interest is in intelligent control systems and algorithms for driving optical transitions in optically switchable windows to provide desirable lighting conditions while reducing the power consumption of such devices and improving the efficiency of systems with which they are integrated.

SUMMARY

Various embodiments herein relate to methods, systems, and networks for controlling optically switchable devices. In a number of cases, one or more optically switchable device may be controlled using voice control and/or gesture control.

In one aspect of the disclosed embodiments, a method of controlling an optical state of an optically switchable device is provided, the method including: (a) receiving a voice command or a gesture command from a user, the voice command or gesture command conveying information for changing the optical state of the optically switchable device to a desired optical state; (b) using voice recognition or gesture recognition to convert the voice command or gesture command, respectively, into a text command; (c) analyzing the text command from (b) to interpret the voice command or gesture command from the user in (a); and (d) executing the text command to cause the optically switchable device to transition to the desired optical state.

In certain embodiments, the method may further include (e) generating a response to the user indicating whether the voice command or gesture command made in (a) is occurring. In these or other cases, the method may include (f) confirming whether the user is authorized to execute the voice command or gesture command received in (a). The method may be implemented on a network of optically switchable devices, and may be implemented to control the optical state of a plurality of optically switchable devices on the network.

The voice command or gesture command may relate to a variety of different control options. In one example, the voice command or gesture command from the user in (a) describes the desired optical state based on a relative comparison to a starting optical state of the optically switchable device. For instance, the voice command or gesture command from the user in (a) may indicate that the optically switchable device should become darker or lighter. Similarly, the voice command or gesture command from the user in (a) may indicate that the optically switchable device should become more opaque or less opaque. In another example, the voice command or gesture command from the user in (a) indicates that the optically switchable device should become more reflective or less reflective. In some cases, the voice command or gesture command from the user in (a) indicates that a step change should be made to the optical state of the optically switchable device.

In certain embodiments, the voice command or gesture command from the user in (a) describes the desired optical state as a distinct optical state of the optically switchable device, without reference to a starting optical state of the optically switchable device. In various implementations, the voice command or gesture command from the user in (a) is a voice command instructing the optically switchable device to switch to the desired optical state according to one or more rules. In one example, the rule relates to a schedule and the voice command instructs the optically switchable device to switch to the desired optical state at a scheduled time. In another example, the rule relates to weather and the voice command instructs the optically switchable device to switch to the desired optical state if a particular weather condition occurs. In another example, the optically switchable device is installed in a building, the rule relates to environmental conditions within the building, and the voice command instructs the optically switchable device to switch to the desired optical state if an internal condition within the building occurs. In some such cases, the internal condition within the building relates to a temperature within the building.

The various operations may occur at a number of different locations. In some cases, each of (a)-(d) occur locally on one or more controllers installed in a building in which the optically switchable device is installed. In some such cases, each of (a)-(d) occur locally on one or more controllers installed onboard the optically switchable device. In some other embodiments, (c) occurs on a processor that is located remotely from a building in which the optically switchable device is installed.

In certain implementations, the voice command or gesture command from the user in (a) includes a gesture command. The user may identify the optically switchable device by pointing at it in some embodiments. In various cases, the method may involve interpreting both the gesture command and the voice command, the gesture command identifying which optically switchable device the user desires to control, and the voice command indicating the desired optical state for the optically switchable device.

One or more dictionaries may be used to implement the method. In certain embodiments, (b) includes using two or more dictionaries to convert the voice command or gesture command into the text command, where a first dictionary is used when converting a first portion of the voice command or gesture command, and a second dictionary is used when converting a second portion of the voice command or gesture command. In these or other cases, (c) may include using two or more dictionaries to analyze the text command, where a third dictionary is used when analyzing a first portion of the text command and a fourth dictionary is used when analyzing a second portion of the text command.

In a further aspect of the disclosed embodiments, a system for controlling an optical state of an optically switchable device in response to a voice command or gesture command from a user is provided, the system including: (a) at least one element selected from the group consisting of: a microphone, a video camera, and a motion sensor; (b) a controller communicatively coupled with the optically switchable device and configured to control the optical state of the optically switchable device; (c) either (i) a voice recognition module configured to convert the voice command to a text command, or (ii) a gesture recognition module configured to convert the gesture command to the text command, where the voice command is perceived by the microphone and/or where the gesture command is perceived by the video camera and/or by the motion sensor; (d) a command processing module configured to interpret the text command generated by the voice recognition module or gesture recognition module; and (e) a command execution module configured to execute the interpreted text command from the command processing module.

In certain embodiments, the system may further include (f) a response generation module configured to generate a response to the user; and (g) a response communication module configured to communicate the response to the user, where the response is communicated to the user visually and/or aurally.

In some cases, the system includes (h) an authentication module configured to confirm whether the user is authorized to control the optically switchable device as requested in the voice command or gesture command from the user. The authentication module may be configured to authorize the user for a particular duration, and to request an additional authorization after the particular duration has passed. In some cases, the authentication module confirms whether the user is authorized by requiring the user to log in with a passcode. In another example, the authentication module confirms whether the user is authorized by using facial recognition to identify the user. In another example, the authentication module confirms whether the user is authorized by using voice recognition to identify the user. In various embodiments, the authentication module is configured to confirm whether the user is authorized each time the user provides a new voice command or a new gesture command. In these or other implementations, the authentication module may influence which dictionary or dictionaries are used in the voice recognition module, the gesture recognition module, and/or the command processing module.

The microphone, video camera, and/or motion sensor may be provided onboard the optically switchable device in some cases. In some other cases, the microphone, video camera, and/or motion sensor may be provided on an electronic device that communicates with the optically switchable device. For instance, the electronic device may be a smartphone, tablet, laptop, personal computer, fitness device, watch, or wall unit. In some embodiments, the gesture command is perceived by the motion sensor, and the motion sensor includes one or more accelerometers, gyroscopes, and/or magnetometers. The system may be configured to control the optical state of a plurality of optically switchable devices each installed on a network.

In a further aspect of the disclosed embodiments, a method of querying a control system of an electrochromic device is provided, the method including: (a) receiving a query from a user, where the query is provided in spoken form, and where the query is received by a device that is part of the control system for the electrochromic device; (b) using voice recognition to convert the query into a text query; (c) analyzing the text query from (b) to interpret the query from the user in (a); (d) determining an answer to the query; and (e) providing the answer to the user.

In some embodiments, the answer is provided to the user in (e) by (i) displaying the answer so that the user can perceive the answer visually, and/or (ii) reciting the answer so that the user can perceive the answer aurally. The query may relate to the electrochromic device. In some cases, the query relates to a current optical state of the electrochromic device and/or to an ongoing optical transition on the electrochromic device. In some other cases, the query relates to a future optical state of the electrochromic device and/or to a future optical transition on the electrochromic device. In some embodiments, determining the answer to the query in operation (d) includes searching the Internet to determine the answer.

These and other features will be described below with reference to the associated drawings.

BRIEF DESCRIPTION OF THE DRAWINGS

Like reference numbers and designations in the various drawings indicate like elements.

DETAILED DESCRIPTION

Figure 1:
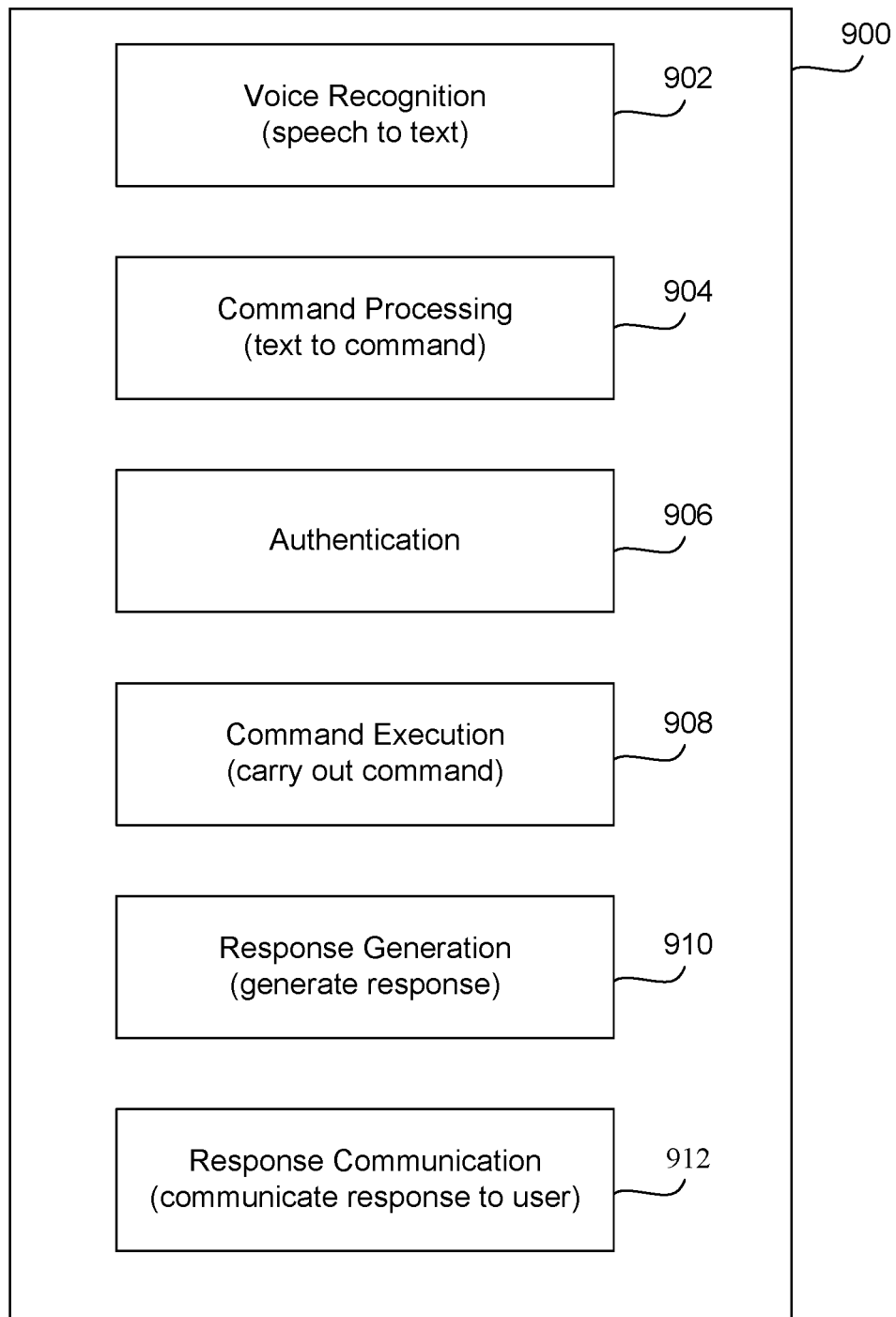
FIG. 1 shows a block diagram of example modules that may be used for implementing voice control in some implementations.

The following detailed description is directed to specific example implementations for purposes of disclosing the subject matter. Although the disclosed implementations are described in sufficient detail to enable those of ordinary skill in the art to practice the disclosed subject matter, this disclosure is not limited to particular features of the specific example implementations described herein. On the contrary, the concepts and teachings disclosed herein can be implemented and applied in a multitude of different forms and ways without departing from their spirit and scope. For example, while the disclosed implementations focus on electrochromic windows (also referred to as smart windows), some of the systems, devices and methods disclosed herein can be made, applied or used without undue experimentation to incorporate, or while incorporating, other types of optically switchable devices that are actively switched/controlled, rather than passive coatings such as thermochromic coatings or photochromic coatings that tint passively in response to the sun's rays. Some other types of actively controlled optically switchable devices include liquid crystal devices, suspended particle devices, and micro-blinds, among others. For example, some or all of such other optically switchable devices can be powered, driven or otherwise controlled or integrated with one or more of the disclosed implementations of controllers described herein. Additionally, in the following description, the phrases "operable to," "adapted to," "configured to," "designed to," "programmed to," or "capable of" may be used interchangeably where appropriate.

Voice and Gesture Control

In a number of embodiments, voice and/or gesture control may be used to interact with an optically switchable device. Such control methods may be more convenient compared to more conventional control methods that may require a user to touch or otherwise physically interact with a particular component (e.g., switch, knob, keypad, touchscreen, etc.). Voice control may be particularly beneficial for users with certain disabilities.

Example Commands

Generally speaking, voice and/or gesture control may be used to implement any type of command on an optically switchable device. For example, voice and/or gesture control may be used to implement tinting commands for a single optically switchable device (e.g., "change window 1 to tint 4" or "make window 1 darker"), or for a group or zone of optically switchable devices (e.g., "change the windows in zone 1 to tint 4" or "make the windows in zone 1 darker" or "make the windows in zone 1 much darker," etc.). The commands may relate to discrete optical states to which the relevant optically switchable device(s) should change (e.g., discrete tint levels, or other discrete optical states) or relative changes in the optical states of the optically switchable device(s) (e.g., darker, lighter, more reflective, less reflective, e.g., or "my office is too dark, please lighten it up" or "I want to run the projector," (letting the system know to darken the room) or "it's hot in here" (letting the system know to darken the windows and block heat gain) etc.). Where relative changes are used, the control system may be designed or configured to implement step changes (e.g., 10% darker or lighter) in the optical state of the optically switchable device to carry out the command. The degree of each step change may be pre-defined. Alternatively or in addition, the control system may be designed or configured to implement step changes of a size or degree specified by the user. Such commands may be modified by any relative words used in the command (e.g., "very" or "a little bit," or "lighter" or "darker" etc.).

Voice control can also be used to set a schedule for the optically switchable device. For instance, a user may direct the optically switchable device(s) to tint at particular times/days (e.g., "make the windows in zone 1 go to tint 4 at 2 pm Monday through Friday" or "the morning sun makes it hot in here" (letting the system know to tint the windows during the morning hours when the sun impinges on that side of the building) or "I can't see the mountains well in the afternoon" (letting the system know that the windows are tinted too much in the afternoon and to lighten them during the afternoon)). Similarly, voice control can be used to implement tinting rules for the optically switchable device (e.g., "tint the windows in zone 1 to tint 4 when it's sunny outside" or "tint the windows in this room if the temperature inside this room is above 70° F."). Any rules that can be implemented on a network of optically switchable devices (including any other networked components such as thermostat, BMS, electronic device, etc.) can be initiated via voice control.

Voice control can be implemented on various components of control architecture for the smart window system, e.g., onboard window controllers or other window controllers, network controllers, master controllers, wall switches (e.g., interfaces with control components) and/or a separate device that interfaces with any or all of the aforementioned devices and/or components.

Gesture control may be more limited to some degree, due to a more limited dictionary of movements that can be recognized compared to the more expansive dictionary of words that can be recognized when using voice control. However, gesture control can still be used to implement many types of commands. For instance, gesture control can be used to indicate that a particular window or group of windows should change to a lighter or darker state (or other optical states if non-electrochromic optically switchable devices are used). The user may indicate the window(s) to be changed by standing in front of the relevant window(s) and/or pointing to the relevant window(s). The user may indicate the desired change by raising or lowering their hands or arms, or by opening or closing their palms, for instance. A dictionary of recognized gestures may be created to define the types of commands that can be accomplished via gesture control. More expansive gesture dictionaries may enable finer, more complex control of the optically switchable devices. However, there is some degree of tradeoff in terms of ease of use, with smaller gesture dictionaries being easier for users to master.

In some cases, the gestures may be perceived by a video camera. The camera may be provided on any available device, and in some examples is provided as part of a wall unit, as part of a device that interfaces with a wall unit (e.g., a smartphone, tablet, or other electronic device), as part of a hand-held device (e.g., smartphone, tablet, or other electronic device), on an electrochromic window or frame, or as part of any other device that is configured to control an electrochromic or other optically switchable window. Alternatively or in addition, a user may gesture while holding, wearing, or otherwise moving a sensing device that is configured to sense movement/acceleration/etc. The readings on the sensing device may be used to help determine what gesture a user has made. The movement sensing device may include one or more accelerometers, gyroscopes, and/or magnetometers, etc. In some embodiments, the sensing device may be a fitness device (e.g., any of various wearable devices from Fitbit Inc. or Jawbone, each in San Francisco, Calif.), watch (e.g., from Apple Inc. of Cupertino, Calif. or Pebble Technology Corporation in Palo Alto, Calif.), or similar wearable device. In certain embodiments, facial recognition software is used to determine changes in facial expressions as commands to change the tint level of windows.

Another type of command that may be initiated via voice control is to turn off "listening mode." When listening mode is on, the device that listens for commands is able to pick up oral commands. When listening mode is off, the device that listens for commands is not able to pick up/hear/record such commands. As explained further below, the device that listens for commands may be part of a window controller, IGU, wall device, and/or other electronic device (e.g., phone, tablet, etc.), for example. A user may desire to turn listening mode off for increased privacy, energy savings, etc. In some cases, the user may request that listening mode turn off for a specified time period (e.g., the duration of a meeting). In order to turn listening mode back on, the user may press a button/touchscreen (e.g., on the device that listens for commands, on the window controller, IGU, wall device, or other electronic device) or otherwise indicate that listening mode should turn back on. Devices may indicate when listening mode is on and/or off. In one example, one or more lights (e.g., LEDs) may indicate whether listening mode is on or off. The light may be turned on to indicate that listening mode is on, and off to indicate that listening mode is off (or vice versa). In another example, a first light or light color may indicate that listening mode is on, and a second light or light color may indicate that listening mode is off. In another example, devices can use an audio cue, e.g., may emit a tone, e.g., periodically, as a reminder to the user that listening mode is inactive (or active). In certain implementations, listening mode may be deactivated for a period of time (e.g., 1 minute, 10 minutes, 30 minutes, 1 hour, 2 hour, 3 hours, 1 day, etc.), after which listening mode may automatically be reactivated. The period of time over which listening mode remains deactivated may be chosen by the user, or may be preset. In some embodiments, listening mode is activated by default. In other words, listening mode is on unless it is turned off (e.g., permanently turned off, or turned off for a period of time, as mentioned above). In other embodiments, the default setting may be that listening mode is off. In these embodiments, listening mode does not activate unless a command is received to turn listening mode on.

Analogously, where gesture command is used, the user may control whether a relevant device that interprets gesture commands is in a "watching mode." Like the listening mode, the watching mode can be turned on and off. When a device is in watching mode, it is able to sense and interpret gesture commands. When the watching mode is off, the device is not able to sense, record, and/or process gesture commands. Generally speaking, details provided herein related to listening mode may similarly apply to watching mode.

In certain implementations, voice commands may be used to ask a question to the system controlling the optically switchable device (or some component on the network on which the optically switchable device is installed). The questions may relate directly to the optically switchable device, or more generally, to any optically switchable device or group of devices on the network. For instance, a user may ask what the current optical state is for a particular optically switchable device (e.g., "what's the tint level of window 1?"). Similarly, a user may ask what the upcoming behavior will be for a particular optically switchable device (e.g., "when is the next time the windows in my office will begin to get darker?"). The questions may also relate to any other information to which the network has access. For instance, a user may ask about weather data (e.g., temperature data, cloud data, precipitation data, forecast data, etc.), location data (e.g., "where am I?" or "how do I get from here to the nearest printer/exit/bathroom/etc."), access data (e.g., "am I allowed to control the tint level of the windows in this room?"), etc. A user may also ask for an explanation of why the optically switchable device is performing in a certain way. In one example, a user might ask, "why is window 1 tinting?" and the system may explain in response to the query, "clouds expected to clear in 20 minutes, tinting in anticipation of bright sun." This feature is particularly useful in cases where the optically switchable device is programmed to execute rules that might not be immediately observable/understandable to a user. The answer may be provided visually (e.g., on a screen) or aurally (e.g., through a speaker).

Voice command may also be used to control the degree of privacy in the room with respect to wireless communications. In some embodiments, optically switchable windows may be patterned to include one or more antenna that may be used to block or allow particular wavelengths to pass through the windows. When activated, these patterned antennae can provide increased security/privacy by blocking cell phone communications, Wi-Fi communications, etc. Patterned antennae and related privacy considerations are discussed in P.C.T. Application No. PCT/US15/62387, filed Nov. 24, 2015, and titled WINDOW ANTENNAS, which is herein incorporated by reference in its entirety.

Dictionaries

Where voice and/or gesture control are used, one or more dictionaries may be defined. For voice control, the dictionaries may define a set of words and/or phrases that the system is configured to interpret/understand. Similarly, for gesture control, the dictionaries may define a set of gestures that the system is configured to interpret/understand. Dictionaries may be tiered, e.g., given a command in a first level dictionary, a new dictionary at a second level may be initiated for receiving commands, and once received, yet another level dictionary may be actuated. In this way, individual dictionaries need not be overly complex and the end user can quickly get to the command structure they desire.

Examples of words or phrases that may be defined include names/identifications for each optically switchable device or group of devices (e.g., "window 1," "group 1," "zone 1," etc.). Such names/identifications may also be based on the location of the optically switchable devices. In this respect, the dictionaries may be defined to include words that identify optically switchable devices based on location (e.g., "first floor," or "break room," or "east-facing"), and/or words that provide a relation between the user (or some other person) and the optically switchable device being identified (e.g., "my office," "the left window," or "Deepa's room").

The dictionaries may also define words related to the desired commands that can be instructed. For instance, the dictionaries may include words like "tint," "clear," "clearest," "darker," "darkest," "lighter," "lightest," "more," "less," "very," "a little," "tint level," "tint1," "tint2," etc. Any words likely to be used by a person when instructing the optically switchable device when using verbal commands can be included in the dictionary. In cases where the system is configured to allow a user to set a schedule or rules for the behavior of the optically switchable device, the dictionary or dictionaries can include any words needed to understand such commands (e.g., "Monday," "Tuesday through Friday," "morning," "afternoon," "bedtime," "sunrise," "if," "then,"

"when," "don't," "cloudy," "sunny," "degrees," "someone," "no one," "movement," "only," etc.). Similarly, in cases where the system is configured to allow a user to ask a question, the dictionary or dictionaries can include any words needed to understand the types of questions the system is designed to answer.

As mentioned above, there is some tradeoff between larger dictionaries, which may enable finer control, more natural/flexible commands, and more complex functions (e.g., answering any question where the answer is available on the internet), compared to smaller dictionaries, which may be easier for people to master, and which may enable faster and/or more local processing. Smaller dictionaries may be used in a tiered format, where access to successive dictionaries is afforded by a user providing the proper voice or gesture command in one dictionary in order to be allowed access to the next dictionary.

In some embodiments, a single dictionary may be used. In other cases, two or more dictionaries may be used, and the dictionary that is used at a particular time depends on what type of command, or what portion of a command a user is trying to convey. For instance, a first dictionary may be used when a user is identifying which optically switchable device they wish to control, and a second dictionary may be used when the user is identifying what they want the optically switchable device to do. The first dictionary could include any words needed to identify the relevant optically switchable device, while the second dictionary could include any words needed to interpret what the user wants the optically switchable device to do. Such contextual dictionaries can provide a limited subset of words that the system is configured to understand/interpret whenever the particular dictionary is being used. This may make it easier to interpret a user's commands. Further examples are provided below.

In certain implementations, one or more dictionaries may be tailored to particular users. The dictionaries for defining/determining which electrochromic window(s) a user desires to switch may be limited based on which windows the user is authorized to switch, for instance. In one example, user A is allowed to switch windows 1-5, while user B is allowed to switch windows 6-10. The dictionary or dictionaries used to transcribe and/or interpret commands from user A may be limited to identifying windows 1-5, while the dictionary or dictionaries used to transcribe and/or interpret commands from user B may be limited to identifying windows 6-10.

Each dictionary may include certain keywords that allow the user to navigate through the system more easily. Such keywords may include phrases such as "help," "back," "go back," "previous," "undo," "skip," "restart," "start over," "stop," "abort," etc. When a user requests help, the system may be configured to communicate to the user (e.g., visually and/or aurally) the words, phrases, commands, windows, etc. that the system is currently configured to accept/understand based on the dictionary that is being used at a given time. For instance, if a user requests help while the system is accessing a dictionary that defines the different windows available for switching, the system may communicate that the available inputs at that time are, e.g., "window 1," "window 2, "window 3," "group 1," etc.

Security/Authorization

In a number of embodiments, the system may act to ensure that a user is authorized to make a particular command before the command is executed. This can prevent unauthorized users from making changes to the optically switchable devices. One setting in which this is particularly valuable is conference rooms, where there may be many people present at once. In such cases, it may be desirable to ensure that people who do not have authority to change the optical state of the optically switchable devices are prevented from doing so. This can reduce the risk that the optically switchable devices will change based on overheard (typically non-relevant) comments made by those in the room. Another setting in which this feature is valuable is commercial office space, where it is desired that individual people can each control a limited number of optically switchable devices near their work spaces, for instance. In one example, each person may be authorized to control the optically switchable windows in their particular office, or on their particular floor, etc. In any case, it may be beneficial to ensure that the only people who are able to initiate optical transitions via voice or gesture command are authorized to do so.

The authorization may be done in a number of ways. In one example, a user may "log in" to the system to identify herself. This may be done by logging into an application on an electronic device (e.g., smartphone, tablet, etc.), by keying in or voicing a passcode, etc. In another example, voice recognition may be used to confirm the identity of a user. In a further example, facial recognition, fingerprint scanning, retinal scanning, or other biometric-based methods may be used to confirm the identity of a user. Different authorization procedures may be best suited for different applications/contexts. In a particular example, a user may be automatically authorized. Such authorization may be based on a physical authorization token (e.g., an RFID badge, a BLE beacon, UWF beacon, etc. having appropriate identification information), and the proximity of the physical authorization token to a sensor that reads the token. The sensor may be provided on an optically switchable device, on a controller in communication with the optically switchable device, on a wall unit in communication with the optically switchable device, etc. The verification may occur locally (e.g., on the sensor that reads the token, on an optically switchable device, on a controller, on a wall unit, etc.) or in the cloud.

In some cases, authorization may occur whenever it is needed, and authorization may expire after a set amount of time has passed, or after the user has been idle for a set amount of time (e.g., after 24 hours, or after 1 hour, or after 10 minutes). The time period used for auto-logging out may depend on the setting in which the windows are installed (e.g., whether the windows are in a public area or a private area). In some cases, authorization may not expire until a user logs out (e.g., using any available method including, but not limited to, orally requesting a logout, pressing a logout button, etc.). In certain embodiments, authorization may occur each time a command is made. In some such embodiments, authorization may occur in stages even when interpreting a single command. In a first authorization stage, it may be determined whether the user has authorization to make any changes on the network, and in a second authorization stage, it may be determined whether the user has authorization to make the particular change that the user has requested/initiated.

The authorization process may also be used to further limit the dictionaries used to interpret the voice and/or gesture commands. For example, the dictionary or dictionaries for a particular user may exclude optically switchable devices (or groups/zones of such devices) that the user is not authorized to control. In one example, a user is only authorized to control the optically switchable devices in zone1 and zone 2, so the dictionary or dictionaries used to interpret commands for this user may include "zone 1" and "zone 2"

while excluding "zone 3." Any other words needed to interpret/understand the command may also be included in the dictionary.

Example Voice/Gesture Control Techniques

FIG. 1 provides a block diagram of a voice/gesture control system 900, which includes several modules that may be used when practicing the disclosed voice control embodiments. These modules may be implemented separately or together, as appropriate for a particular application. The modules may be provided in separate pieces of hardware, and may control a variety of processors. The modules may be executed concurrently or non-concurrently. Generally speaking, each module may be independently implemented on a controller (e.g., the window controller, the network controller, and/or the master controller), an optically switchable device, a wall device, a router, and/or a remote processor. In certain implementations, one or more of the modules may be implemented on processor 402 of FIG. 7, processor 502 of FIG. 8, and/or a processing unit of a window controller. Within each module, any relevant processing may be done locally or remotely, as discussed further below. The processing may be done in a central location/device, or it may be distributed throughout a number of locations/devices.

The voice recognition module 902 converts/transcribes speech to text. In other words, the input to this module is typically speech (spoken by a user and captured/recorded by a microphone), and the output from this module is typically a text string or file. This module may be implemented using a number of commercially available speech to text products/services/libraries. As one example, Carnegie Mellon University of Pittsburgh, Pa. provides a number of open source speech software resources that may be used such as CMU Sphinx. Additional examples include various Dragon products available from Nuance Communications, Inc. in Burlington, Mass., and Tazti, available from Voice Tech Group, Inc. of Cincinnati, Ohio. The voice recognition module 902 may also be implemented using custom software designed specifically for voice control related to optically switchable devices.

The command processing module 904 interprets text in order to determine the desired command instruction. In other words, the input to this module is typically a text file (which may be generated by the voice recognition module 902), while the output is a set of commands/instructions that can be interpreted by the window controller (or another controller on the network) to cause the relevant optically switchable device to initiate the desired command. This function may also be referred to as language processing or natural language processing. Similar to the speech recognition module 902, the command processing module 904 may be implemented using a number of available products/services, or using software specifically developed for the particular application.

The authentication module 906 may be used to practice the authorization/security techniques discussed herein. Generally, the authorization module 906 may be used to ensure that the person giving the command is authorized to make the command. The module may compare the optically switchable device identified in the command to a list of optically switchable devices that the user is authorized to control. In cases where a user tries to control an optically switchable device that they are not authorized to control, the authentication module 906 may be configured to notify the user (e.g., visually and/or aurally) that they are not authorized to control the relevant optically switchable device. In other cases, no action is taken when an un-authorized command is given (e.g., no notification to the user, and no switching of the optically switchable device).

The command execution module 908 executes the commands on the relevant optically switchable device(s). The command may be executed on a master controller, network controller(s), and/or window controller(s). In one example, the command may be executed by instructing the master controller to send all windows in a particular group or zone to a desired tint level. Generally, the command may be executed on/by any of the control apparatus/methods described herein.

The response generation module 910 generates a response that will be communicated to the user by the response communication module 912. The response generated by the response generation module 910 may be a text response. The text response may be displayed to the user, e.g., on a screen, using the response communication module 912. Alternatively or in addition, the response communication module 912 may convert the text response into a speech response (e.g., in a sound file) that is played to the user. Any appropriate text-to-speech methods may be used to accomplish this. Generally, the response generation module 910 and the response communication module 912 may work together to generate and communicate a response to the user.

One purpose of the response generation module 910 and the response communication module 912 may be to notify the user what command has been understood by the control system. Similarly, these modules can be used to notify the user regarding any action that the optically switchable device is taking in response to the user's command. In one example, the response generation module 910 may generate a response that repeats the basic command given by the user (e.g., "window 1 to tint 4" or "tint window 1 to tint 4 when it becomes sunny"). The response may then be communicated to the user via the response communication module 912. The response generation module 910 and response communication module 912 may also be used to ask for clarification from the user. For instance, if it is unclear whether the user wants to change window 1 or window 2, the response generation module 910 may be used to prompt the user for clarification/further information.

Figure 2A:
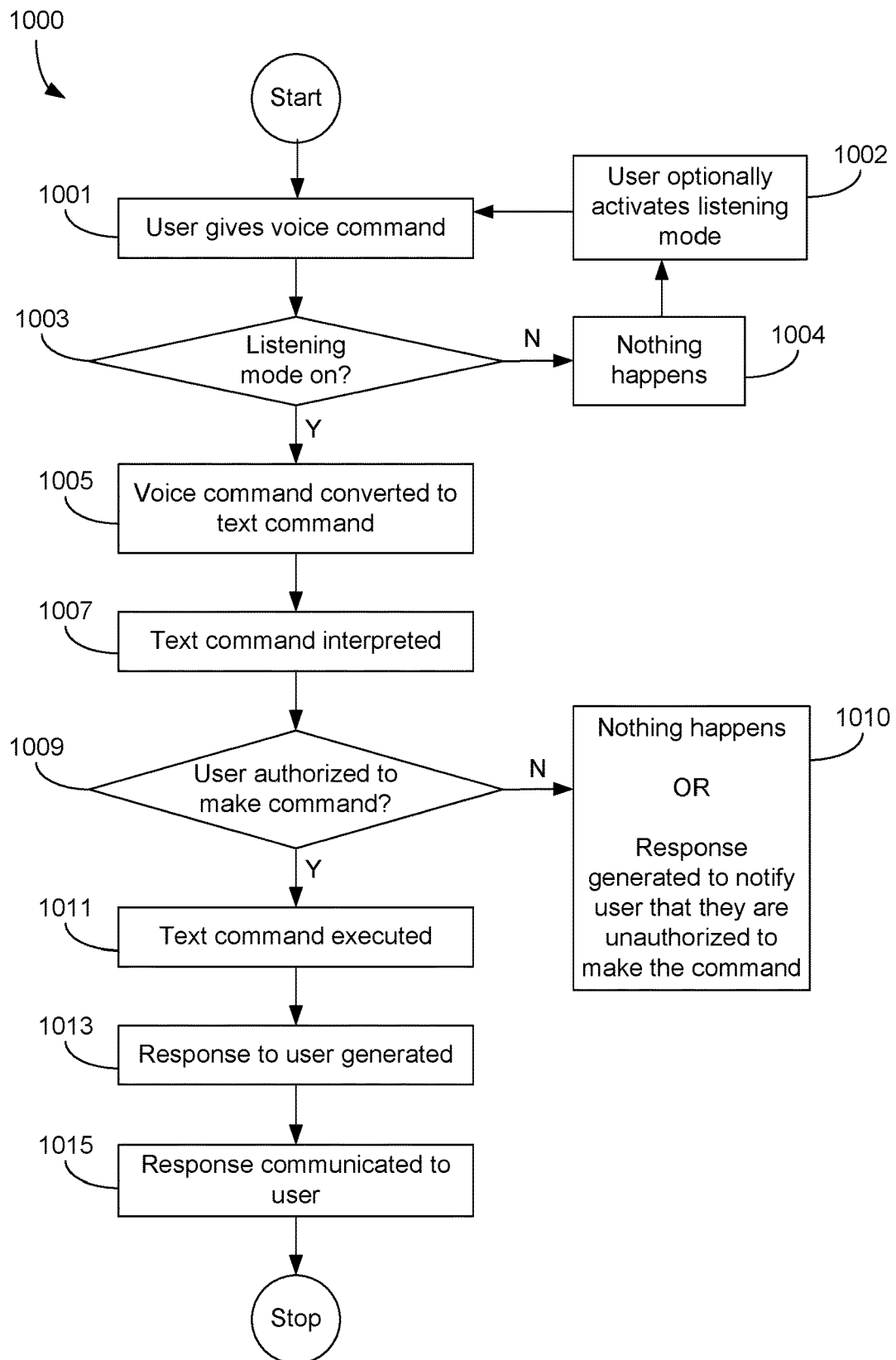
FIG. 2A shows a flowchart for a method of controlling electrochromic windows using voice control in certain implementations.

FIG. 2A illustrates a flowchart for a method 1000 of controlling one or more optically switchable devices (e.g., electrochromic windows) using voice control. The method 1000 begins at operation 1001, when a user provides a voice command. The voice command may be given in a variety of ways depending on the configuration of the voice control system and the robustness of the voice control processing, for instance. The voice control system includes at least one microphone configured and positioned to receive voice commands. The microphone may be located on an optically switchable device, on a wall device (as discussed above, a wall device may be positioned on a wall or at another location in a room such as a table, countertop, etc.), or on another electronic device such as a smartphone, tablet, laptop, PC, etc. One example command includes "turn window 1 to tint 4."

Next, at operation 1003 it is determined whether listening mode is on. When listening mode is on, the microphone is able to listen for/record voice commands from a user. When listening mode is off, the microphone is off or otherwise not accepting voice commands related to the optically switchable devices. One example where the microphone can remain "on" while listening mode is "off" is when the microphone is located in a user's cell phone and the user is making an unrelated call on their cell phone. The determination in operation 1003 may be made passively. If listening mode is not on, the microphone will not pick up/record the voice command that was made in operation 1001, and nothing will happen, as indicated at operation 1004. As described above, in certain embodiments a user may optionally activate listening mode manually, as indicated at operation 1002. Where this is the case, the method may continue at operation 1001 where the user repeats the command. If listening mode is on at operation 1003, the method continues with operation 1005, where the voice command is converted/transcribed into a text command. The voice-to-text conversion may be done by the voice recognition module 902 from FIG. 1.

In certain implementations, the voice-to-text conversion may be influenced by one or more dictionaries as described above. For example, words or phrases that sound similar to words or phrases stored in the relevant dictionary may be converted to the words/phrases stored in the dictionary, even if not exactly the same. In a particular example, a user gives the command to "switch window 1 to tint 4," but the voice recognition module initially interprets the command as "switch window 1 to tint floor." If the relevant dictionary or dictionaries associated with the voice recognition module defines phrases such as "window 1," "window 2," "tint 1," "tint 2," "tint 3," and "tint 4," but does not include any phrases with the word "floor," the voice recognition module may recognize that the user likely said "tint 4" rather than the initially understood "tint floor," which has no relevant meaning in the associated dictionary or dictionaries. In other words, the results of the text-to-speech operation may be limited or otherwise influenced by the relevant dictionaries being used.

Next, at operation 1007, the text command is interpreted. This interpretation may be done by the command processing module 904 of FIG. 1. Like the voice-to-text conversion discussed in relation to operation 1005, the interpretation of the text command in operation 1007 may be influenced by the dictionary or dictionaries being used. This operation may involve specifically identifying which optically switchable device or devices the user is requesting to change, and identifying the particular requested change. For instance, if the command provided by the user is "switch window 1 to tint 4," the interpretation may involve determining (1) that the user is requesting a change for window 1, and (2) that the requested change relates to switching the window to tint state 4.

The text command interpretation at operation 1007 (as well as the voice-to-text conversion at operation 1005) may be influenced by user preferences and/or user permissions. For instance, if a user makes a voice command to "make the windows darker," the system may interpret which windows are desired to be switched based on which windows the user typically switches and/or based on which windows the user is allowed to switch.

At operation 1009, it is determined whether the user is authorized to make the requested command. The authorization may be initiated/verified in a number of ways as described above. The authorization may be done by the authentication module 906 described in FIG. 1. If the user is not authorized to make the requested command, the method ends at operation 1010 where either (1) nothing happens, or (2) a response is generated to notify the user that they are unauthorized to make the command. The response may be provided visually (e.g., through a visual display on an optically switchable window, a wall device, or other electronic device) and/or aurally (e.g., by playing a sound file via speakers on an optically switchable device, wall device, or other electronic device). Further details related to response generation are provided below.

If the user is authorized to make the requested command, the method continues at operation 1011, where the text command is executed. The command may be executed using any of the methods and systems described herein. The command may be executed using the command execution module 908 of FIG. 1. In various cases, the command may be executed over a network on which the optically switchable device is installed, and may involve one or more window controllers, network controllers, and/or master controllers. Generally speaking, operation 1011 involves carrying out the command requested by the user in operation 1001.

At operation 1013, a response to the user is generated. The response may be generated by the response generation module 910 of FIG. 1. The response may confirm that the requested command is taking place. The response may specifically indicate the content of the command such that the user knows whether she was understood correctly. One example response may be "switching window 1 to tint 4." A simpler positive response such as "ok," or a green light and/or a tone may let the user know she was heard, without specifically repeating the content of the command (e.g., using the response generation module 910 and/or the response communication module 912). In a particular example, the response may include a request that the user confirm that the system has correctly understood the desired command. In such a case, the command may not be executed until such confirmation is received from the user.

At operation 1015, the response is communicated to the user. The response may be communicated to the user by the response communication module 912 of FIG. 1. The response may be presented to the user visually (e.g., on a display) and/or aurally (e.g., via speakers). The display and/or speakers may be provided on an optically switchable device, a wall device, or other electronic device (e.g., smartphone, tablet, laptop, PC, etc.). The display and/or speakers may be provided in the same unit as the microphone, or they may be provided in separate units. In certain cases where an aural response is provided, the response generation may involve generating the desired text of the response (e.g., using the response generation module 910), and then generating and playing a sound file that corresponds to the desired text (e.g., using response communication module 912). The method 1000 may be practiced in a variety of ways. In some embodiments, certain operations occur out-of-order from what is shown in FIG. 2A.

Figure 2B:
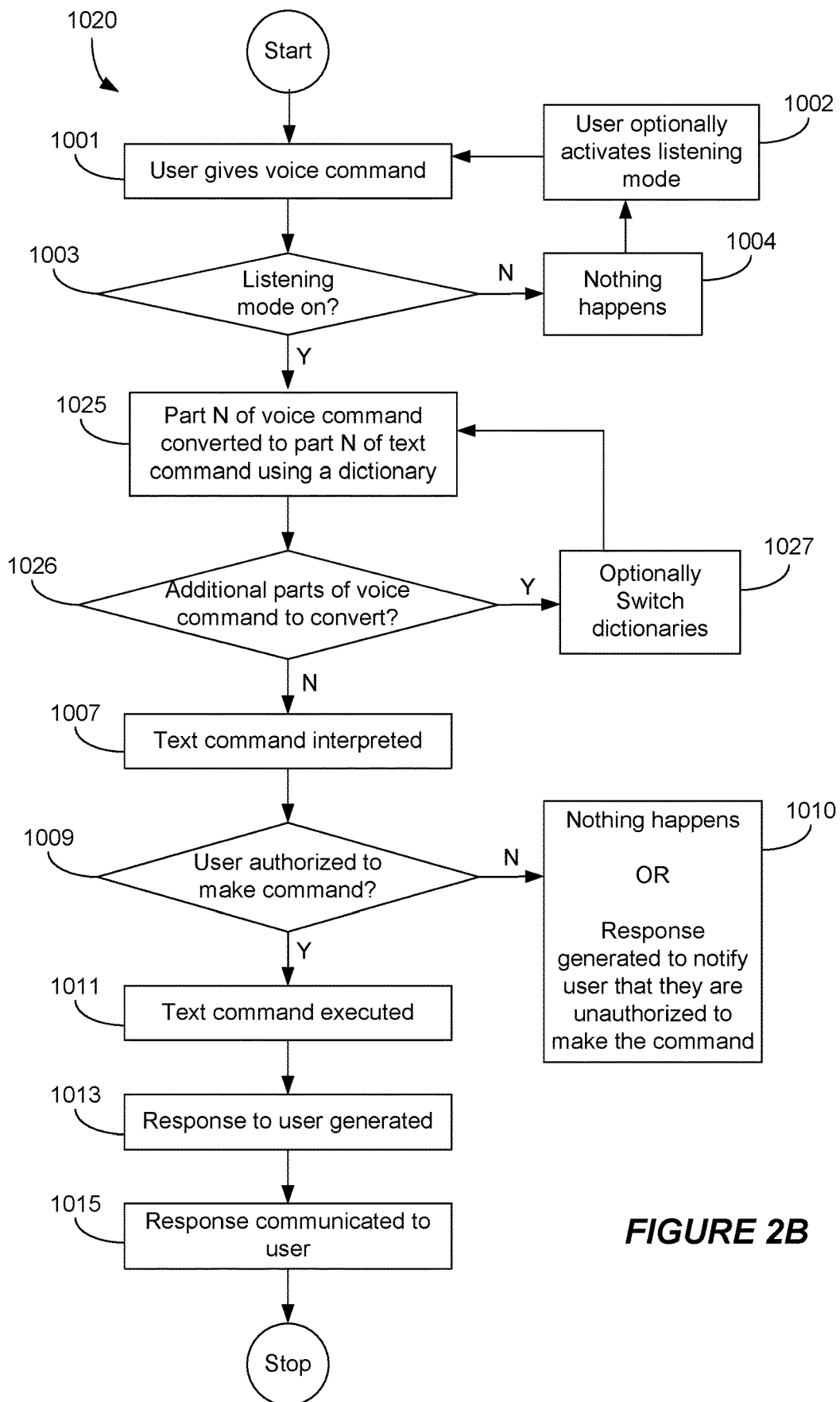
FIG. 2B shows a flowchart for a method of controlling electrochromic windows using voice control in certain implementations where multiple dictionaries are used.

In certain implementations, the voice control method may involve using two or more dictionaries, as described above. FIG. 2B illustrates a flowchart for a method 1020 of controlling one or more optically switchable devices using two or more voice-control-related dictionaries. The method 1020 of FIG. 2B is similar to the method 1000 of FIG. 2A, except that the command is interpreted in a piecemeal fashion, with different dictionaries applying to different portions of the command. Many of the operations illustrated in FIG. 2B are the same as those presented in FIG. 2A, and for the sake of brevity the description will not be repeated.

For method 1020, after it is determined that the listening mode is on in operation 1003, part 1 of the voice command is converted to part 1 of the text command using a first dictionary. The particular dictionary that is used may correspond to the part of the text that is being interpreted. Next, it is determined whether there are additional parts of the voice command to interpret/convert to text. If there are additional parts of the voice command to interpret, the method continues at operation 1027, where the dictionary is optionally switched to another dictionary. The next dictionary that is chosen may correspond to the next part of the command that is to be interpreted. The method then continues back at operation 1025, where part 2 of the voice command is converted to part 2 of the text command, optionally using a different dictionary than was used in connection with part 1 of the command. The loop of operations 1025/1026/1027 continues until all of the parts of the command have been converted to text using the appropriate dictionaries.

In one example, the full voice command is "switch window 1 to tint 4." One part of the voice command (e.g., part 1) may relate to identifying which optically switchable devices the user desires to switch, in this case "window 1." Another part of the voice command (e.g., part 2) may relate to identifying what the desired command/ending optical state is, in this case switching to "tint 4." The different parts of the command may be structured as desired for a particular system. More structured commands may be easier to process/interpret, which may make local processing a more attractive option. Less structured commands may be harder to process/interpret, which may make remote processing a more attractive option.

After all parts of the voice command have been converted to text, the different parts of the text command are joined together to define the full text command, and the method continues at operation 1007. The remaining portions of the method are the same as those described in relation to FIG. 2A.

In a similar embodiment, the text command interpretation may be done in a piecemeal fashion (rather than the voice command to text command conversion being done in a piecemeal fashion). With reference to FIG. 2A, the text command interpretation in operation 1007 may be done iteratively as described in relation to operations 1025/1026/1027 of FIG. 2B, optionally with different dictionaries applied to different parts of the text command.

In another similar embodiment, both the voice command to text command conversion in operation 1005 and the text command interpretation in operation 1007 may be done in a piecemeal fashion as described in relation to operations 1025/1026/1027 of FIG. 2B.

Furthermore, the authentication described in relation to operation 1009 may be determined in piecemeal fashion. For instance, a first authentication check may determine whether the user is allowed to make any changes. A second authentication check may determine whether the user is allowed to switch the particular optically switchable device(s) that she is requesting to switch. A third authentication check may determine whether the user is allowed to make the particular change that was requested (e.g., to prevent the user from requesting a tint state that will damage the device, or to check whether there are any overriding rules governing the tint states of the optically switchable device(s) that would prevent the requested change from taking effect, even if the user is allowed some control over the relevant optically switchable device(s)). The authentications may all be done at the same time, or at different times. Depending upon a particular user's access authority, different dictionaries may be used for that user, versus other users.

Figure 2C:
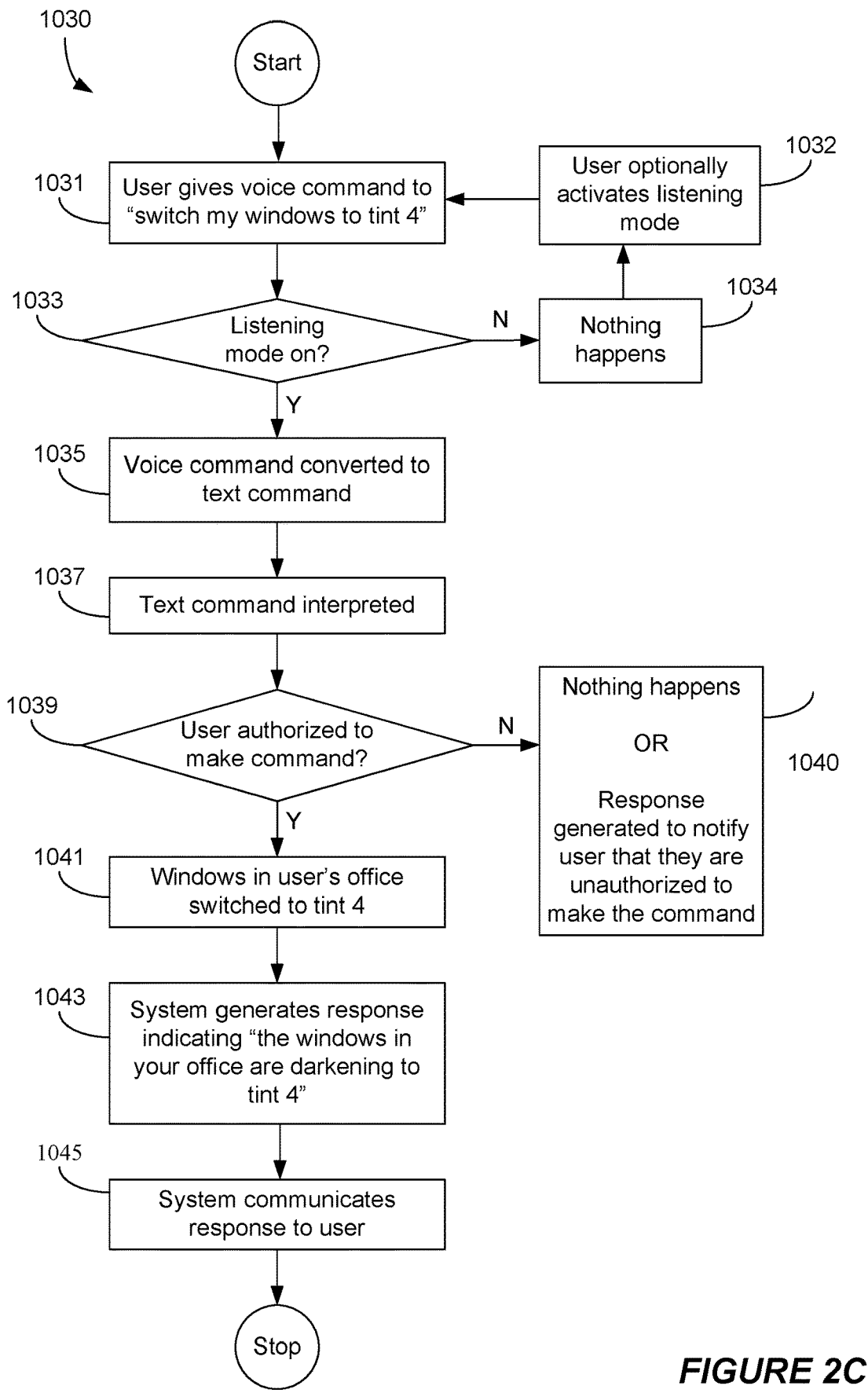
FIG. 2C shows a flowchart for a method of implementing voice control according to a specific example.

FIG. 2C depicts a flowchart similar to the one shown in FIG. 2A, in the context of a specific example where a user in an office building requests the control system to switch the windows in the user's office to a particular tint state. The method 1030 begins at operation 1031, where the user requests, by voice, to "switch my windows to tint 4." If listening mode is not on, the system will take no action in response to the user's request, as indicated at operation 1034. In some cases, the user may optionally activate listening mode manually, as indicated in operation 1032. Where this is the case, the method may continue with operation 1031 where the user repeats the command. When listening mode is on at operation 1033, the method continues at operation 1035 where the voice command is converted to a text command. As mentioned above, this may be performed by the voice recognition module 902 of FIG. 1. At this point, the control system may have an audio recording of the voice command given by the user, as well as a text file that indicates the content of the voice command.

Next, at operation 1037, the text command is interpreted. This may be done by the command processing module 904 from FIG. 1. This operation may involve identifying which windows are to be changed. In this example, the user requested to change "my windows." The control system may identify which windows to change by analyzing who is giving the command, which windows that user is authorized to change, which windows that user frequently changes, which windows are associated with the user in a database, which windows the user is near when she makes the command, etc. Identification of the user may be done in a number of ways as described above with respect to authorization. In this particular example, the control system uses voice recognition to identify the user, and identifies which windows to change by utilizing a database that associates each employee with the windows that are in each employee's office. At the end of operation 1037, the control system has identified that the user wishes to switch all the windows in the user's office to tint 4.

At operation 1039, it is determined whether the user is authorized to make the command. This may be done by the authentication module 906 of FIG. 1. In this case, the authorization process involves voice recognition. The system may analyze the recorded voice command given by the user in operation 1031 and compare it against prior recordings from this user and other users. This process allows the system to identify who made the command in operation 1031. The authorization process may also involve ensuring that the identified user is allowed to change the windows that she has requested to change. In this example, the control system checks whether the user is authorized to change the windows in her office by utilizing a database that associates each user with each window that the user is authorized to change. The user in this example works on floor 10, and is authorized to switch all the windows on floor 10. Therefore, the method continues with operation 1041, where the command is executed (e.g., via the command execution module 908 of FIG. 1), and all the windows in the user's office begin to switch to tint 4. In a case where the user makes an unauthorized command (e.g., the user is visiting a colleague on floor 9 and requests that the windows in the colleague's office go to tint 4, when the user is only authorized to switch windows on floor 10, where the user's office is located), the method may continue with operation 1040, where either nothing happens or the command system indicates that the user is not authorized to make the requested command. The system may or may not explain why the user is unauthorized to make the requested command, and/or may explain which windows, if any, the user is authorized to change.

At operation 1043, the control system generates a response indicating that "the windows in your office are darkening to tint 4." This may be done by the response generation module 910 of FIG. 1. The response may indicate which windows are going to be affected, as well as the particular action they will take (e.g., darkening, lightening, the final requested tint state, etc.). In this example, operation 1043 involves generating a text file indicating what the response will be. Next, at operation 1045, the response is communicated to the user. This may be done by the response communication module 912 of FIG. 1. The response may be communicated visually or aurally in various cases. In one example, this operation may involve generating a sound file that corresponds to the response in the text file for the response. The sound file may then be played to the user so that she knows her command has been heard, and that the system is acting on her request. Alternatively or in addition, the text file (or another file generated based on the text file) may be displayed to the user so that she can visually appreciate that her command has been heard.

In cases where gesture command is used in place of voice command, a camera may be used instead of (or in addition to) a microphone in order to perceive and record the user's command. Instead of a voice recognition module such as module 902 of FIG. 1, a gesture recognition module may be used.

Arrangement of Components and Division of Processing Steps

Figure 3A:
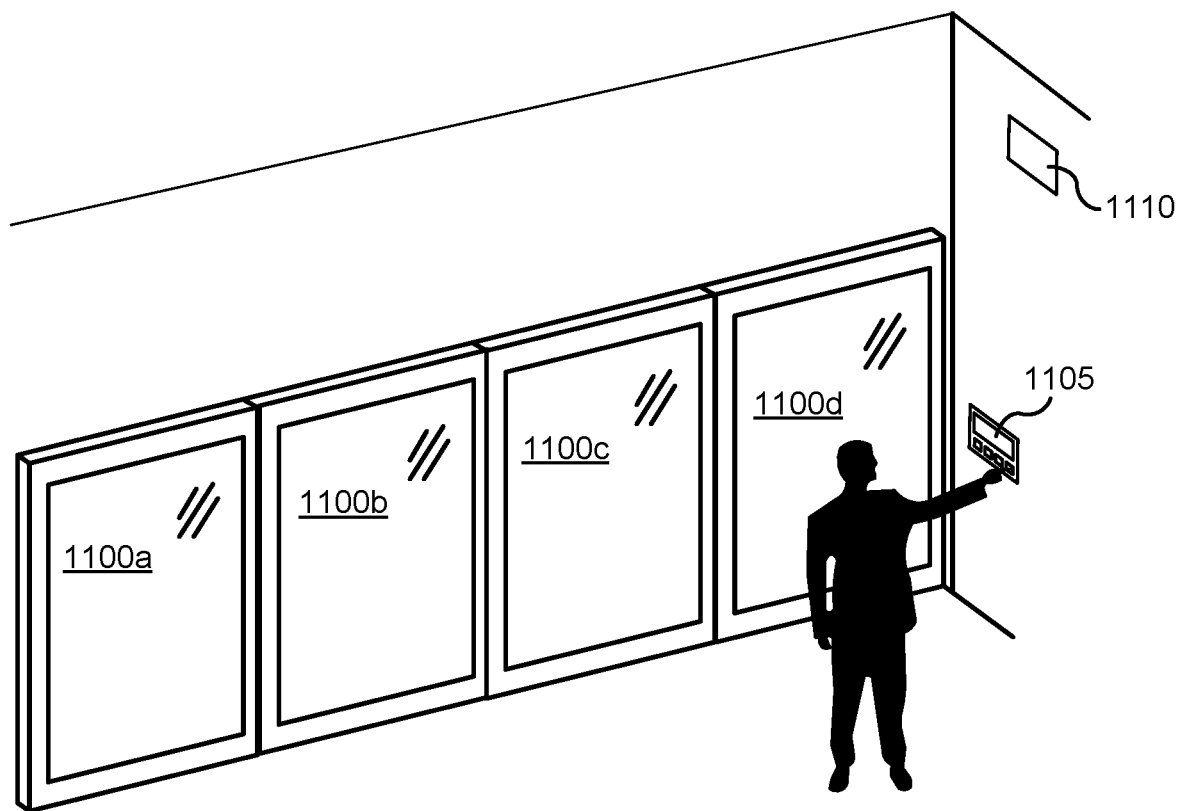
FIG. 3A shows a user interacting with a wall device to control electrochromic windows.

FIG. 3A illustrates a user interacting with a device 1105 for controlling the optical state of electrochromic windows 1100a-1100d. In this example, the device 1105 is a wall device as described above. In one example, the wall device is or includes a smart device such as an electronic tablet or similar device. Device 1105 may be any number of different electronic devices configured to control the electrochromic windows 1100a-1100d, including but not limited to a smartphone, tablet, laptop, PC, etc. The device 1105 may run an application/program that is configured to control the electrochromic windows. In certain embodiments, the device 1105 may communicate with access point 1110, for example through a wired connection or a wireless connection (e.g., WiFi, Bluetooth, Bluetooth low energy, ZigBee, WiMax, etc.). The access point 1110 may be a networking hardware device that allows a Wi-Fi compliant device to connect to a wired network. The device 1105 may communicate with a controller (e.g., a window controller, network controller, and/or master controller) through a number of different connection schemes, some of which are illustrated in FIGS. 3B-3E.

Figure 3B:
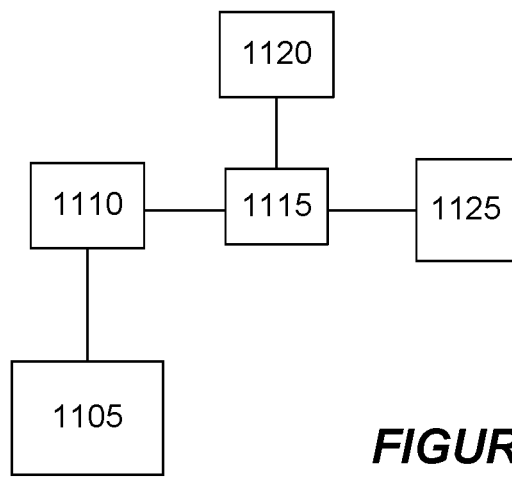
FIGS. 3B-3E show various configurations of components that may be used to implement certain control methods described herein.

In FIG. 3B, the device 1105 is connected to access point 1110, which is connected to switch 1115. Switch 1115 is connected to both router 1120 and controller 1125. The connections between the different elements may be wired or wireless, as appropriate for a particular application. In one example, access point 1110 is a wireless access point, and the connection between the access point 1110 and the device 1105 is wireless. As mentioned, the device 1105 may be any number of electronic devices configured to control the electrochromic windows. The router 1120 may include firewall protection to enhance security. The controller 1125 may be a window controller, network controller, or master controller. If the controller 1125 is not a window controller, the controller 1125 may relay instructions to relevant window controllers over the network, for example as described in relation to FIG. 6.

Figure 3C:
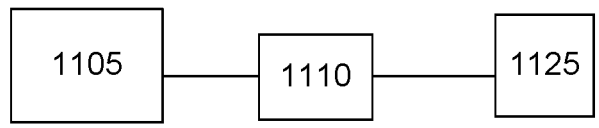
Figure 3D:
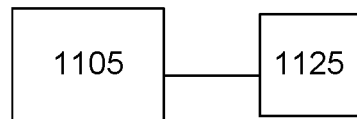
Figure 3E:
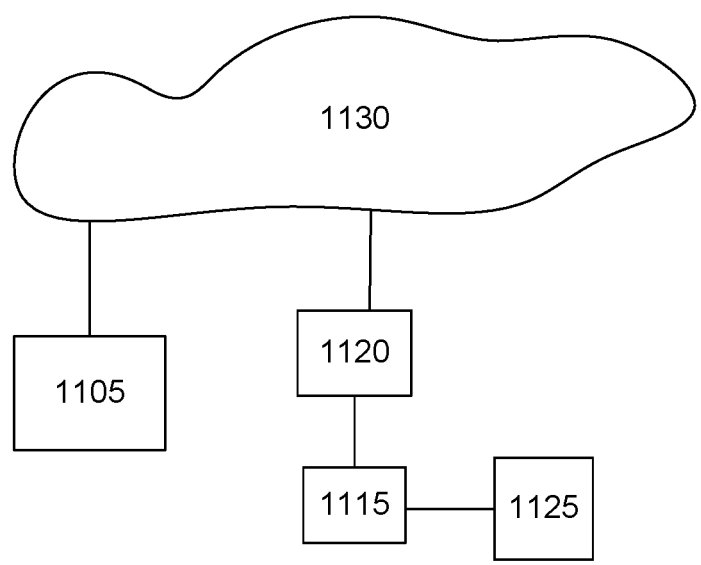

In FIG. 3C, the device 1105 is connected to access point 1110, which is connected to controller 1125. Each of these connections may be wired or wireless. In FIG. 3D, the device 1105 is directly connected to the controller 1125. This connection may be wired or wireless. In FIG. 3E, device 1105 is connected to the cloud 1130 (e.g., the Internet). The cloud 1130 is also connected with router 1120, which is connected to switch 1115, which is connected to controller 1125. The connections may be wired or wireless, as appropriate for a particular application. In a particular example, the device 1105 is a smartphone, which connects wirelessly (e.g., via 3G, 4G, etc.) with the cloud 1130.

FIGS. 3B-3E show some of the possible arrangements for allowing a device 1105 to communicate with a controller 1125 to cause the controller 1125 to effect change on the relevant electrochromic windows. Certain arrangements may be preferable for certain situations. For example, different arrangements may be preferred depending on the intensity of the different processing steps, any hardware limitations for different components, a desired level of privacy, and other concerns. For example, if the device 1105 and controller 1125 (as well as related components on the network) have limited processing power, it may be desirable to perform much of the processing in the cloud 1130, and the arrangement in FIG. 3E may be particularly beneficial. By contrast, if privacy is a top concern and it is desired to perform everything in-house (e.g., within a firewalled network), the arrangements in FIGS. 3B-3D (especially 3D where the device 1105 directly connects to the controller 1125) may be relatively more beneficial. Relatedly, the arrangements shown in FIGS. 3B-3D may be particularly useful in cases where no external internet connection is available.

Generally, the different processing steps may each independently occur on any device with sufficient processing power and connectivity to perform the relevant processing step. For example, one or more processors may be provided on each window controller, network controller, master controller, wall device (or related electronic device), and/or at a remote processing location (on the cloud, at a remote processing location maintained by a manufacturer/vendor/customer, etc.). In various cases the processors may be distributed among different components. In some other cases, the processors may be more centrally located (e.g., all within a wall device, or window controller, or network controller, or master controller). A few examples will be provided.

In one example, device 1105 is connected with controller 1125 as shown in any of FIGS. 3B-3D. The device 1105 is provided with a relatively high degree of processing capability in this example. Device 1105 accepts voice commands regarding one or more electrochromic windows associated with controller 1125. For the purposes of this example, controller 1125 is a master controller, though in other examples it may be a network controller or window controller. With respect to the method 1000 shown in FIG. 2A, operation 1001 (user gives voice command) may occur at the device 1105. The device 1105 may record the voice command for analysis. Operation 1003 (determining if listening mode is on) similarly occurs at the device 1105, though this determination may be made passively. Operation 1005 (voice command converted to text command) may also happen on the device 1105, assuming the device 1105 is provided with sufficient processing capability. Similarly, operation 1007 (text command interpreted) may happen on the device 1105 if the device 1105 has sufficient processing capability. Operation 1009 (authorization) may occur on the controller 1125, which may store or otherwise access information related to different users and the permissions related to each user. Operation 1011 (text command executed) may also occur on controller 1125 (as well as related controllers and associated electrochromic windows), which causes the relevant electrochromic windows to change as directed in operation 1001. Operation 1013 (response to user generated)

may occur on the device 1105 assuming the device 1105 has sufficient processing power. Operation 1015 (response communicated to user) may occur at the device 1105 such that the user can perceive the response (e.g., visually or aurally).

In a related example, the device 1105 may have relatively less processing capability. Therefore, some of the processing steps may be moved from the device 1105 to the controller 1125. In this case, the controller 1125 may be any controller (e.g., master controller, network controller, window controller, or a combination thereof) that has sufficient processing capability. Examples of functions that may remain at the device 1105 include operation 1001 (user gives voice command), and operation 1015 (response communicated to user). Examples of functions that may be switched to the controller 1125 include operation 1005 (voice command converted to text command), operation 1007 (text command interpreted), and operation 1013 (response to user generated) may be performed on the controller 1125. For instance, the content of the response to the user may be generated at the controller 1125, and the response may then be displayed and/or played to the user at the device 1105.

In another example, the device 1105 communicates with the controller 1125 via the cloud 1130, as shown in FIG. 3E. The processing capabilities of the cloud 1130 are essentially unlimited. As such, various processing steps may be performed in the cloud 1130. With reference to the method 1000 of FIG. 2A, examples of processing steps that may be performed in the cloud 1130 include operation 1005 (voice command converted to text command), operation 1007 (text command interpreted), operation 1009 (authorization), and operation 1013 (response to user generated). One or more of these functions may also be performed at the controller 1125. In a particular example, operation 1001 (user gives voice command) occurs at the device 1105, operation 1003 (determining whether listening mode is on) occurs at the device 1105, operation 1005 (voice command converted to text command) occurs on the cloud 1130, operation 1007 (text command interpreted) occurs on the cloud 1130, operation 1009 (authorization) occurs on the controller 1125, operation 1011 (text command executed) occurs on the controller 1125 and the associated electrochromic windows, operation 1013 (generating response to user) occurs on the controller 1125 and/or cloud 1130 (either or both of which may be used to generate the content of the response), and operation 1015 occurs on the device 1105 (which displays and/or plays the response to the user).

Example Electrochromic Window Architecture

Figure 4:
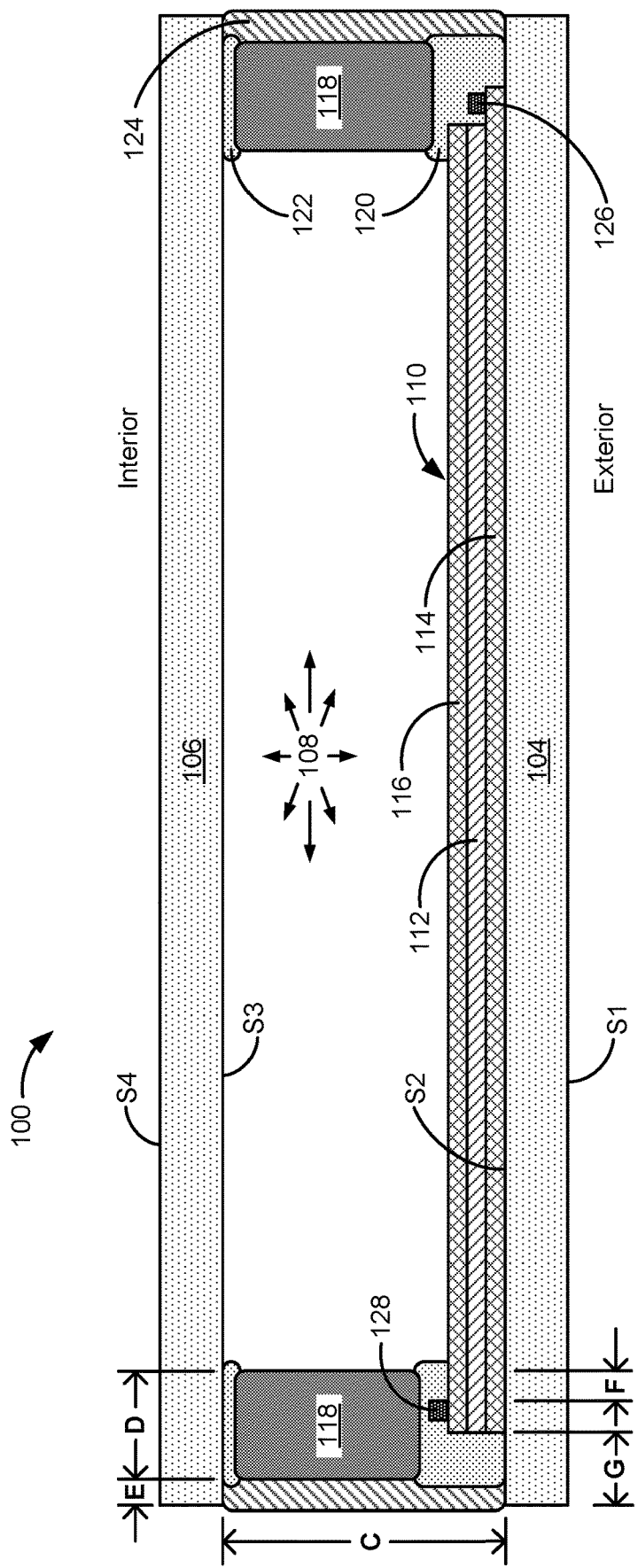
FIG. 4 shows a cross-sectional view of an example electrochromic window 100 in accordance with some implementations.

FIG. 4 shows a cross-sectional side view of an example electrochromic window 100 in accordance with some implementations. An electrochromic window is one type of optically switchable window that includes an electrochromic device (ECD) used to provide tinting or coloring. The example electrochromic window 100 can be manufactured, configured or otherwise provided as an insulated glass unit (IGU) and will hereinafter also be referred to as IGU 100. This convention is generally used, for example, because it is common and because it can be desirable to have IGUs serve as the fundamental constructs for holding electrochromic panes (also referred to as "lites") when provided for installation in a building. An IGU lite or pane may be a single substrate or a multi-substrate construct, such as a laminate of two substrates. IGUs, especially those having double- or triple-pane configurations, can provide a number of advantages over single pane configurations; for example, multi-pane configurations can provide enhanced thermal insulation, noise insulation, environmental protection and/or durability when compared with single-pane configurations. A multi-pane configuration also can provide increased protection for an ECD, for example, because the electrochromic films, as well as associated layers and conductive interconnects, can be formed on an interior surface of the multi-pane IGU and be protected by an inert gas fill in the interior volume, 108, of the IGU.

FIG. 4 more particularly shows an example implementation of an IGU 100 that includes a first pane 104 having a first surface S1 and a second surface S2. In some implementations, the first surface S1 of the first pane 104 faces an exterior environment, such as an outdoors or outside environment. The IGU 100 also includes a second pane 106 having a first surface S3 and a second surface S4. In some implementations, the second surface S4 of the second pane 106 faces an interior environment, such as an inside environment of a home, building or vehicle, or a room or compartment within a home, building or vehicle.

In some implementations, each of the first and the second panes 104 and 106 are transparent or translucent—at least to light in the visible spectrum. For example, each of the panes 104 and 106 can be formed of a glass material and especially an architectural glass or other shatter-resistant glass material such as, for example, a silicon oxide ($SO_x$)-based glass material. As a more specific example, each of the first and the second panes 104 and 106 can be a soda-lime glass substrate or float glass substrate. Such glass substrates can be composed of, for example, approximately 75% silica ($SiO_2$) as well as $Na_2O$, CaO, and several minor additives. However, each of the first and the second panes 104 and 106 can be formed of any material having suitable optical, electrical, thermal, and mechanical properties. For example, other suitable substrates that can be used as one or both of the first and the second panes 104 and 106 can include other glass materials as well as plastic, semi-plastic and thermoplastic materials (for example, poly(methyl methacrylate), polystyrene, polycarbonate, allyl diglycol carbonate, SAN (styrene acrylonitrile copolymer), poly(4-methyl-1-pentene), polyester, polyamide), or mirror materials. In some implementations, each of the first and the second panes 104 and 106 can be strengthened, for example, by tempering, heating, or chemically strengthening.

Generally, each of the first and the second panes 104 and 106, as well as the IGU 100 as a whole, is rectangular. However, in some other implementations other shapes are possible and may be desired (for example, circular, elliptical, triangular, curvilinear, convex or concave shapes). In some specific implementations, a length "L" of each of the first and the second panes 104 and 106 can be in the range of approximately 20 inches (in.) to approximately 10 feet (ft.), a width "W" of each of the first and the second panes 104 and 106 can be in the range of approximately 20 in. to approximately 10 ft., and a thickness "T" of each of the first and the second panes 104 and 106 can be in the range of approximately 0.3 millimeter (mm) to approximately 10 mm (although other lengths, widths or thicknesses, both smaller and larger, are possible and may be desirable based on the needs of a particular user, manager, administrator, builder, architect or owner). In examples where thickness T of substrate 104 is less than 3 mm, typically the substrate is laminated to an additional substrate which is thicker and thus protects the thin substrate 104. Additionally, while the IGU 100 includes two panes (104 and 106), in some other implementations, an IGU can include three or more panes. Furthermore, in some implementations, one or more of the panes can itself be a laminate structure of two, three, or more layers or sub-panes.

The first and second panes 104 and 106 are spaced apart from one another by a spacer 118, which is typically a frame structure, to form an interior volume 108. In some implementations, the interior volume is filled with Argon (Ar), although in some other implementations, the interior volume 108 can be filled with another gas, such as another noble gas (for example, krypton (Kr) or xenon (Xn)), another (non-noble) gas, or a mixture of gases (for example, air). Filling the interior volume 108 with a gas such as Ar, Kr, or Xn can reduce conductive heat transfer through the IGU 100 because of the low thermal conductivity of these gases as well as improve acoustic insulation due to their increased atomic weights. In some other implementations, the interior volume 108 can be evacuated of air or other gas. Spacer 118 generally determines the height "C" of the interior volume 108; that is, the spacing between the first and the second panes 104 and 106. In FIG. 4, the thickness of the ECD, sealant 120/122 and bus bars 126/128 is not to scale; these components are generally very thin but are exaggerated here for ease of illustration only. In some implementations, the spacing "C" between the first and the second panes 104 and 106 is in the range of approximately 6 mm to approximately 30 mm. The width "D" of spacer 118 can be in the range of approximately 5 mm to approximately 15 mm (although other widths are possible and may be desirable).

Although not shown in the cross-sectional view, spacer 118 is generally a frame structure formed around all sides of the IGU 100 (for example, top, bottom, left and right sides of the IGU 100). For example, spacer 118 can be formed of a foam or plastic material. However, in some other implementations, spacers can be formed of metal or other conductive material, for example, a metal tube or channel structure having at least 3 sides, two sides for sealing to each of the substrates and one side to support and separate the lites and as a surface on which to apply a sealant, 124. A first primary seal 120 adheres and hermetically seals spacer 118 and the second surface S2 of the first pane 104. A second primary seal 122 adheres and hermetically seals spacer 118 and the first surface S3 of the second pane 106. In some implementations, each of the primary seals 120 and 122 can be formed of an adhesive sealant such as, for example, polyisobutylene (PIB). In some implementations, IGU 100 further includes secondary seal 124 that hermetically seals a border around the entire IGU 100 outside of spacer 118. To this end, spacer 118 can be inset from the edges of the first and the second panes 104 and 106 by a distance "E." The distance "E" can be in the range of approximately 4 mm to approximately 8 mm (although other distances are possible and may be desirable). In some implementations, secondary seal 124 can be formed of an adhesive sealant such as, for example, a polymeric material that resists water and that adds structural support to the assembly, such as silicone, polyurethane and similar structural sealants that form a water tight seal.

In the particular configuration and form factor depicted in FIG. 4, the ECD coating on surface S2 of substrate 104 extends about its entire perimeter to and under spacer 118. This configuration is functionally desirable as it protects the edge of the ECD within the primary sealant 120 and aesthetically desirable because within the inner perimeter of spacer 118 there is a monolithic ECD without any bus bars or scribe lines. Such configurations are described in more detail in U.S. Pat. No. 8,164,818, issued Apr. 24, 2012 and titled ELECTROCHROMIC WINDOW FABRICATION METHODS, U.S. patent application Ser. No. 13/456,056 filed Apr. 25, 2012 and titled ELECTROCHROMIC WINDOW FABRICATION METHODS, PCT Patent Application No. PCT/US2012/068817 filed Dec. 10, 2012 and titled THIN-FILM DEVICES AND FABRICATION, U.S. Pat. No. 9,454,053, issued Sep. 27, 2016 and titled THIN-FILM DEVICES AND FABRICATION, and PCT Patent Application No. PCT/US2014/073081, filed Dec. 13, 2014 and titled THIN-FILM DEVICES AND FABRICATION, all of which are hereby incorporated by reference in their entireties and for all purposes.

In the implementation shown in FIG. 4, an ECD 110 is formed on the second surface S2 of the first pane 104. In some other implementations, ECD 110 can be formed on another suitable surface, for example, the first surface S1 of the first pane 104, the first surface S3 of the second pane 106 or the second surface S4 of the second pane 106. The ECD 110 includes an electrochromic ("EC") stack 112, which itself may include one or more layers. For example, the EC stack 112 can include an electrochromic layer, an ion-conducting layer, and a counter electrode layer. In some implementations, the electrochromic layer is formed of one or more inorganic solid materials. The electrochromic layer can include or be formed of one or more of a number of electrochromic materials, including electrochemically-cathodic or electrochemically-anodic materials. For example, metal oxides suitable for use as the electrochromic layer can include tungsten oxide ($WO_3$) and doped formulations thereof. In some implementations, the electrochromic layer can have a thickness in the range of approximately 0.05 μm to approximately 1 μm.

In some implementations, the counter electrode layer is formed of an inorganic solid material. The counter electrode layer can generally include one or more of a number of materials or material layers that can serve as a reservoir of ions when the EC device 110 is in, for example, the transparent state. In certain implementations, the counter electrode not only serves as an ion storage layer but also colors anodically. For example, suitable materials for the counter electrode layer include nickel oxide (NiO) and nickel tungsten oxide (NiWO), as well as doped forms thereof, such as nickel tungsten tantalum oxide, nickel tungsten tin oxide, nickel vanadium oxide, nickel chromium oxide, nickel aluminum oxide, nickel manganese oxide, nickel magnesium oxide, nickel tantalum oxide, nickel tin oxide as non-limiting examples. In some implementations, the counter electrode layer can have a thickness in the range of approximately 0.05 μm to approximately 1 μm.

The ion-conducting layer serves as a medium through which ions are transported (for example, in the manner of an electrolyte) when the EC stack 112 transitions between optical states. In some implementations, the ion-conducting layer is highly conductive to the relevant ions for the electrochromic and the counter electrode layers, but also has sufficiently low electron conductivity such that negligible electron transfer (electrical shorting) occurs during normal operation. A thin ion-conducting layer with high ionic conductivity enables fast ion conduction and consequently fast switching for high performance EC devices 110. In some implementations, the ion-conducting layer can have a thickness in the range of approximately 1 nm to approximately 500 nm, more generally in the range of about 5 nm to about 100 nm thick. In some implementations, the ion-conducting layer also is an inorganic solid. For example, the ion-conducting layer can be formed from one or more silicates, silicon oxides (including silicon-aluminum-oxide), tungsten oxides (including lithium tungstate), tantalum oxides, niobium oxides, lithium oxide and borates. These materials also can be doped with different dopants, including lithium; for example, lithium-doped silicon oxides include lithium silicon-aluminum-oxide, lithium phosphorous oxynitride (LiPON) and the like.

In some other implementations, the electrochromic layer and the counter electrode layer are formed immediately adjacent one another, sometimes in direct contact, without an ion-conducting layer in between and then an ion conductor material formed in situ between the electrochromic and counter electrode layers. A further description of suitable devices is found in U.S. Pat. No. 8,764,950, titled ELECTROCHROMIC DEVICES, by Wang et al., issued Jul. 1, 2014 and U.S. Pat. No. 9,261,751, titled ELECTROCHROMIC DEVICES, by Pradhan et al., issued Feb. 16, 2016, each of which is hereby incorporated by reference in its entirety and for all purposes. In some implementations, the EC stack 112 also can include one or more additional layers such as one or more passive layers. For example, passive layers can be used to improve certain optical properties, to provide moisture or to provide scratch resistance. These or other passive layers also can serve to hermetically seal the EC stack 112. Additionally, various layers, including conducting layers (such as the first and the second TCO layers 114 and 116 described below), can be treated with anti-reflective or protective oxide or nitride layers.

The selection or design of the electrochromic and counter electrode materials generally governs the possible optical transitions. During operation, in response to a voltage generated across the thickness of the EC stack 112 (for example, between the first and the second TCO layers 114 and 116), the electrochromic layer transfers or exchanges ions to or from the counter electrode layer to drive the electrochromic layer to the desired optical state. In some implementations, to cause the EC stack 112 to transition to a transparent state, a positive voltage is applied across the EC stack 112 (for example, such that the electrochromic layer is more positive than the counter electrode layer). In some such implementations, in response to the application of the positive voltage, the available ions in the stack reside primarily in the counter electrode layer. When the magnitude of the potential across the EC stack 112 is reduced or when the polarity of the potential is reversed, ions are transported back across the ion conducting layer to the electrochromic layer causing the electrochromic material to transition to an opaque state (or to a "more tinted," "darker" or "less transparent" state). Conversely, in some other implementations using electrochromic layers having different properties, to cause the EC stack 112 to transition to an opaque state, a negative voltage can be applied to the electrochromic layer relative to the counter electrode layer. In such implementations, when the magnitude of the potential across the EC stack 112 is reduced or its polarity reversed, the ions are transported back across the ion conducting layer to the electrochromic layer causing the electrochromic material to transition to a clear or "bleached" state (or to a "less tinted", "lighter" or "more transparent" state).

In some implementations, the transfer or exchange of ions to or from the counter electrode layer also results in an optical transition in the counter electrode layer. For example, in some implementations the electrochromic and counter electrode layers are complementary coloring layers. More specifically, in some such implementations, when or after ions are transferred into the counter electrode layer, the counter electrode layer becomes more transparent, and similarly, when or after the ions are transferred out of the electrochromic layer, the electrochromic layer becomes more transparent. Conversely, when the polarity is switched, or the potential is reduced, and the ions are transferred from the counter electrode layer into the electrochromic layer, both the counter electrode layer and the electrochromic layer become less transparent.

In one more specific example, responsive to the application of an appropriate electric potential across a thickness of EC stack 112, the counter electrode layer transfers all or a portion of the ions it holds to the electrochromic layer causing the optical transition in the electrochromic layer. In some such implementations, for example, when the counter electrode layer is formed from NiWO, the counter electrode layer also optically transitions with the loss of ions it has transferred to the electrochromic layer. When charge is removed from a counter electrode layer made of NiWO (that is, ions are transported from the counter electrode layer to the electrochromic layer), the counter electrode layer will transition in the opposite direction.

Generally, the transition of the electrochromic layer from one optical state to another optical state can be caused by reversible ion insertion into the electrochromic material (for example, by way of intercalation) and a corresponding injection of charge-balancing electrons. In some instances, some fraction of the ions responsible for the optical transition is irreversibly bound up in the electrochromic material. Some or all of the irreversibly bound ions are thought to have been used to compensate for "blind charge" in the material, i.e. sufficient ions are added to compensate for those that will be irreversibly bound, the fraction that are irreversibly bound constitute the blind charge. In some implementations, suitable ions include lithium ions (Li+) and hydrogen ions (H+) (i.e., protons). In some other implementations, other ions can be suitable. Intercalation of lithium ions, for example, into tungsten oxide ($WO_{3-y}$ ($0<y\leq\sim0.3$)) causes the tungsten oxide to change from a transparent state to a blue state.

The description below generally focuses on tinting transitions. One example of a tinting transition is a transition from a transparent (or "translucent," "bleached" or "least tinted") state to an opaque (or "fully darkened" or "fully tinted") state. Another example of a tinting transition is the reverse—a transition from an opaque state to a transparent state. Other examples of tinting transitions includes transitions to and from various intermediate tint states, for example, a transition from a less tinted, lighter or more transparent state to a more tinted, darker or less transparent state, and vice versa. Each of such tint states, and the tinting transitions between them, may be characterized or described in terms of percent transmission. For example, a tinting transition can be described as being from a current percent transmission (% T) to a target % T. Conversely, in some other instances, each of the tint states and the tinting transitions between them may be characterized or described in terms of percent tinting; for example, a transition from a current percent tinting to a target percent tinting.

However, although the following description generally focuses on tint states and tinting transitions between tint states, other optical states and optical transitions also are achievable in various implementations. As such, where appropriate and unless otherwise indicated, references to tint states or tinting transitions also are intended to encompass other optical states and optical transitions. In other words, optical states and optical state transitions also will be referred to herein as tint states and tint state transitions, respectively, but this is not intended to limit the optical states and state transitions achievable by the IGUs 302. For example, such other optical states and state transitions can include states and state transitions associated with various colors, intensities of color (for example, from lighter blue to darker blue and vice versa), reflectivity (for example, from less reflective to more reflective and vice versa), polarization (for example, from less polarization to more polarization and vice versa), and scattering density (for example, from less scattering to more scattering and vice versa), among others. Similarly, references to devices, control algorithms or processes for controlling tint states, including causing tinting transitions and maintaining tint states, also are intended to encompass such other optical transitions and optical states. Additionally, controlling the voltage, current or other electrical characteristics provided to an optically switchable device, and the functions or operations associated with such controlling, also may be described hereinafter as "driving" the device or the respective IGU, whether or not the driving involves a tint state transition or the maintaining of a current tint state.

The ECD 110 generally includes first and second conducting (or "conductive") layers. For example, the ECD 110 can includes a first transparent conductive oxide (TCO) layer 114 adjacent a first surface of the EC stack 112 and a second TCO layer 116 adjacent a second surface of the EC stack 112. In some implementations, the first TCO layer 114 can be formed on the second surface S2, the EC stack 112 can be formed on the first TCO layer 114, and the second TCO layer 116 can be formed on the EC stack 112. In some implementations, the first and the second TCO layers 114 and 116 can each be formed of one or more metal oxides including metal oxides doped with one or more metals. For example, some suitable metal oxides and doped metal oxides can include indium oxide, indium tin oxide (ITO), doped indium oxide, tin oxide, doped tin oxide, fluorinated tin oxide, zinc oxide, aluminum zinc oxide, doped zinc oxide, ruthenium oxide and doped ruthenium oxide, among others. While such materials are referred to as TCOs in this document, the term encompasses non-oxides as well as oxides that are transparent and electrically conductive such as certain thin film metals and certain non-metallic materials such as conductive metal nitrides and composite conductors, among other suitable materials. In some implementations, the first and the second TCO layers 114 and 116 are substantially transparent at least in the range of wavelengths where electrochromism is exhibited by the EC stack 112. In some implementations, the first and the second TCO layers 114 and 116 can each be deposited by physical vapor deposition (PVD) processes including, for example, sputtering. In some implementations, the first and the second TCO layers 114 and 116 can each have a thickness in the range of approximately 0.01 microns (μm) to approximately 1 μm. A transparent conductive material typically has an electronic conductivity significantly greater than that of the electrochromic material or the counter electrode material.

The first and the second TCO layers 114 and 116 serve to distribute electrical charge across respective first and second surfaces of the EC stack 112 to apply an electrical potential (voltage) across the thickness of the EC stack 112. For example, a first applied voltage can be applied to a first one of the TCO layers and a second applied voltage can be applied to a second one of the TCO layers. In some implementations, a first bus bar 126 distributes the first applied voltage to the first TCO layer 114 and a second bus bar 128 distributes the second applied voltage to the second TCO layer 116. In some other implementations, one of the first and the second bus bars 126 and 128 can ground the respective one of the first and the second TCO layers 114 and 116. In other implementations, the load can be floated with respect to the two TCOs. In various implementations, to modify one or more optical properties of the EC stack 112, and thus cause an optical transition, a controller can alter one or both of the first and second applied voltages to bring about a change in one or both of the magnitude and the polarity of the effective voltage applied across the EC stack 112. Desirably, the first and the second TCO layers 114 and 116 serve to uniformly distribute electrical charge over respective surfaces of the EC stack 112 with relatively little Ohmic potential drop from the outer regions of the respective surfaces to the inner regions of the surfaces. As such, it is generally desirable to minimize the sheet resistance of the first and the second TCO layers 114 and 116. In other words, it is generally desirable that each of the first and the second TCO layers 114 and 116 behaves as a substantially equipotential layer across all portions of the respective layer. In this way, the first and the second TCO layers 114 and 116 can uniformly apply an electric potential across a thickness of the EC stack 112 to effect a uniform optical transition of the EC stack 112.

In some implementations, each of the first and the second bus bars 126 and 128 is printed, patterned, or otherwise formed such that it is oriented along a length of the first pane 104 along at least one border of the EC stack 112. For example, each of the first and the second bus bars 126 and 128 can be formed by depositing a conductive ink, such as a silver ink, in the form of a line. In some implementations, each of the first and the second bus bars 126 and 128 extends along the entire length (or nearly the entire length) of the first pane 104, and in some implementations, along more than one edge of the EC stack 112.

In some implementations, the first TCO layer 114, the EC stack 112 and the second TCO layer 116 do not extend to the edges of the first pane 104. For example, a laser edge delete (LED) or other operation can be used to remove portions of the first TCO layer 114, the EC stack 112 and the second TCO layer 116 such that these layers are separated or inset from the respective edges of the first pane 104 by a distance "G," which can be in the range of approximately 8 mm to approximately 10 mm (although other distances are possible and may be desirable). Additionally, in some implementations, an edge portion of the EC stack 112 and the second TCO layer 116 along one side of the first pane 104 is removed to enable the first bus bar 126 to be formed on the first TCO layer 114 to enable conductive coupling between the first bus bar 126 and the first TCO layer 114. The second bus bar 128 is formed on the second TCO layer 116 to enable conductive coupling between the second bus bar 128 and the second TCO layer 116. In some implementations, the first and the second bus bars 126 and 128 are formed in a region between spacer 118 and the first pane 104 as shown in FIG. 4. For example, each of the first and the second bus bars 126 and 128 can be inset from an inner edge of spacer 118 by at least a distance "F," which can be in the range of approximately 2 mm to approximately 3 mm (although other distances are possible and may be desirable). This arrangement can be advantageous for a number of reasons including, for example, to hide the bus bars from view.

As noted above, the usage of the IGU convention is for convenience only. Indeed, in some implementations the basic unit of an electrochromic window can be defined as a pane or substrate of transparent material, upon which an ECD is formed or otherwise arranged, and to which associated electrical connections are coupled (to drive the ECD). As such, references to an IGU in the following description do not necessarily include all of the components described with reference to the IGU 100 of FIG. 4.

Example Control Profile for Driving Optical Transitions

Figure 5:
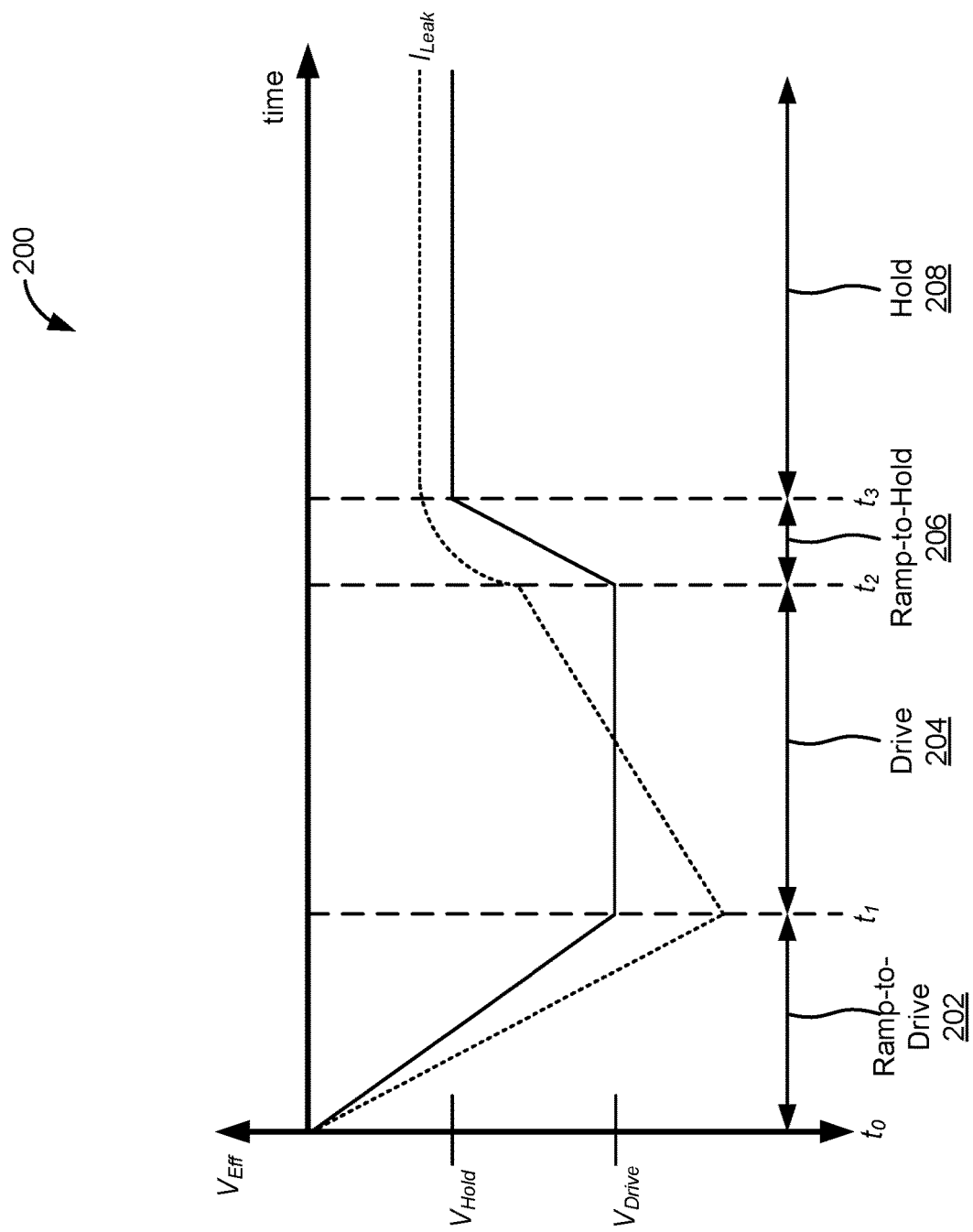
FIG. 5 illustrates an example control profile in accordance with some implementations.

FIG. 5 illustrates an example control profile 200 in accordance with some implementations. The control profile 200 can be used to drive a transition in an optically switchable device, such as the ECD 110 described above. In some implementations, a window controller can be used to generate and apply the control profile 200 to drive an ECD from a first optical state (for example, a transparent state or a first intermediate state) to a second optical state (for example, a fully tinted state or a more tinted intermediate state). To drive the ECD in the reverse direction—from a more tinted state to a less tinted state—the window controller can apply a similar but inverted profile. For example, the control profile for driving the ECD from the second optical state to the first optical state can be a mirror image of the voltage control profile depicted in FIG. 5. In some other implementations, the control profiles for tinting and lightening can be asymmetric. For example, transitioning from a first more tinted state to a second less tinted state can in some instances require more time than the reverse; that is, transitioning from the second less tinted state to the first more tinted state. In some other instances, the reverse may be true; that is, transitioning from the second less tinted state to the first more tinted state can require more time. In other words, by virtue of the device architecture and materials, bleaching or lightening is not necessarily simply the reverse of coloring or tinting. Indeed, ECDs often behave differently for each transition due to differences in driving forces for ion intercalation and deintercalation to and from the electrochromic materials.

In some implementations, the control profile 200 is a voltage control profile implemented by varying a voltage provided to the ECD. For example, the solid line in FIG. 5 represents an effective voltage $V_{Eff}$ applied across the ECD over the course of a tinting transition and a subsequent maintenance period. In other words, the solid line can represent the relative difference in the electrical voltages $V_{App1}$ and $V_{App2}$ applied to the two conducting layers of the ECD (for example, the first and the second TCO layers 114 and 116 of the ECD 110). The dotted line in FIG. 5 represents a corresponding current (I) through the device. In the illustrated example, the voltage control profile 200 includes four stages: a ramp-to-drive stage 202 that initiates the transition, a drive stage that continues to drive the transition, a ramp-to-hold stage, and subsequent hold stage.

The ramp-to-drive stage 202 is characterized by the application of a voltage ramp that increases in magnitude from an initial value at time $t_0$ to a maximum driving value of $V_{Drive}$ at time $t_1$. In some implementations, the ramp-to-drive stage 202 can be defined by three drive parameters known or set by the window controller: the initial voltage at $t_0$ (the current voltage across the ECD at the start of the transition), the magnitude of $V_{Drive}$ (governing the ending optical state), and the time duration during which the ramp is applied (dictating the speed of the transition). Additionally or alternatively, the window controller also can set a target ramp rate, a maximum ramp rate or a type of ramp (for example, a linear ramp, a second degree ramp or an $n^{th}$-degree ramp). In some applications, the ramp rate can be limited to avoid damaging the ECD.

The drive stage 204 is characterized by the application of a constant voltage $V_{Drive}$ starting at time $t_1$ and ending at time $t_2$, at which point the ending optical state is reached (or approximately reached). The ramp-to-hold stage 206 is characterized by the application of a voltage ramp that decreases in magnitude from the drive value $V_{Drive}$ at time $t_2$ to a minimum holding value of $V_{Hold}$ at time $t_3$. In some implementations, the ramp-to-hold stage 206 can be defined by three drive parameters known or set by the window controller: the drive voltage $V_{Drive}$, the holding voltage $V_{Hold}$, and the time duration during which the ramp is applied. Additionally or alternatively, the window controller also can set a ramp rate or a type of ramp (for example, a linear ramp, a second degree ramp or an $n^{th}$-degree ramp).

The hold stage 208 is characterized by the application of a constant voltage $V_{Hold}$ starting at time $t_3$. The holding voltage $V_{Hold}$ is used to maintain the ECD at the ending optical state. As such, the duration of the application of the holding voltage $V_{hold}$ may be concomitant with the duration of time that the ECD is to be held in the ending optical state. For example, because of non-idealities associated with the ECD, a leakage current $I_{Leak}$ can result in the slow drainage of electrical charge from the ECD. Such a drainage of electrical charge can result in a corresponding reversal of ions across the ECD, and consequently, a slow reversal of the optical transition. In such applications, the holding voltage $V_{Hold}$ can be continuously applied to counter or prevent the leakage current. In some other implementations, the holding voltage $V_{Hold}$ can be applied periodically to "refresh" the desired optical state, or in other words, to bring the ECD back to the desired optical state.

The voltage control profile 200 illustrated and described with reference to FIG. 5 is only one example of a voltage control profile suitable for some implementations. However, many other profiles may be desirable or suitable in such implementations or in various other implementations or applications. These other profiles also can readily be achieved using the controllers and optically switchable devices disclosed herein. For example, in some implementations, a current profile can be applied instead of a voltage profile. In some such instances, a current control profile similar to that of the current density shown in FIG. 5 can be applied. In some other implementations, a control profile can have more than four stages. For example, a voltage control profile can include one or more overdrive stages. In one example implementation, the voltage ramp applied during the first stage 202 can increase in magnitude beyond the drive voltage $V_{Drive}$ to an overdrive voltage $V_{OD}$. In some such implementations, the first stage 202 can be followed by a ramp stage 203 during which the applied voltage decreases from the overdrive voltage $V_{OD}$ to the drive voltage $V_{Drive}$. In some other such implementations, the overdrive voltage $V_{OD}$ can be applied for a relatively short time duration before the ramp back down to the drive voltage $V_{Drive}$.

Additionally, in some implementations, the applied voltage or current profiles can be interrupted for relatively short durations of time to provide open circuit conditions across the device. While such open circuit conditions are in effect, an actual voltage or other electrical characteristics can be measured, detected or otherwise determined to monitor how far along an optical transition has progressed, and in some instances, to determine whether changes in the profile are desirable. Such open circuit conditions also can be provided during a hold stage to determine whether a holding voltage $V_{Hold}$ should be applied or whether a magnitude of the holding voltage $V_{Hold}$ should be changed. Additional information related to driving and monitoring an optical transition is provided in PCT Patent Application No. PCT/US14/43514 filed Jun. 20, 2014 and titled CONTROLLING TRANSITIONS IN OPTICALLY SWITCHABLE DEVICES, which is hereby incorporated by reference in its entirety and for all purposes.

Example Controller Network Architecture

Figure 6:
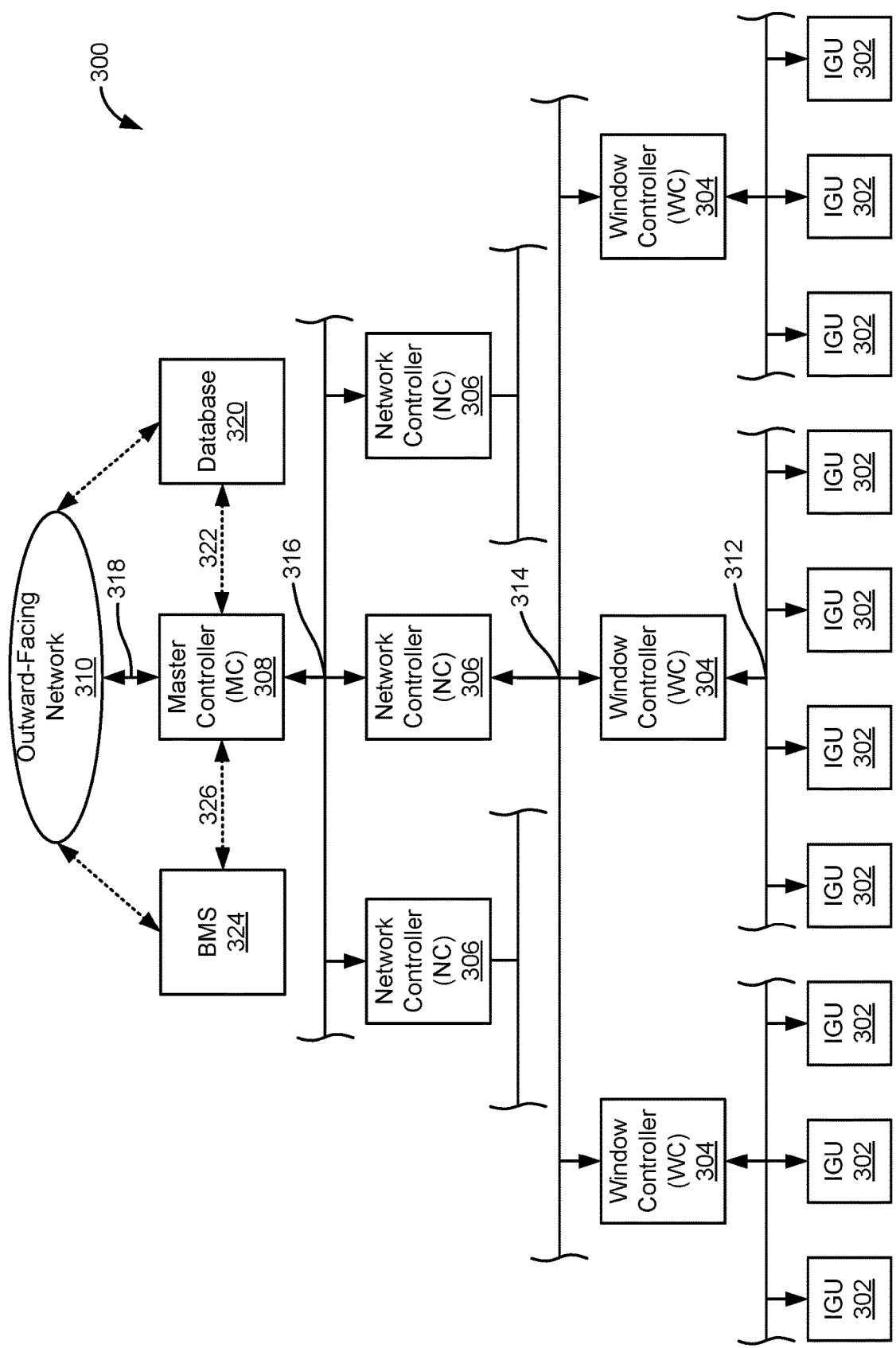
FIG. 6 shows a block diagram of an example network system operable to control a plurality of IGUs in accordance with some implementations.

In many instances, optically switchable windows can form or occupy substantial portions of a building envelope. For example, the optically switchable windows can form substantial portions of the walls, facades and even roofs of a corporate office building, other commercial building or a residential building. In various implementations, a distributed network of controllers can be used to control the optically switchable windows. FIG. 6 shows a block diagram of an example network system, 300, operable to control a plurality of IGUs 302 in accordance with some implementations. For example, each of the IGUs 302 can be the same or similar to the IGU 100 described above with reference to FIG. 4. One primary function of the network system 300 is controlling the optical states of the ECDs (or other optically switchable devices) within the IGUs 302. In some implementations, one or more of the windows 302 can be multi-zoned windows, for example, where each window includes two or more independently controllable ECDs or zones. In various implementations, the network system 300 is operable to control the electrical characteristics of the power signals provided to the IGUs 302. For example, the network system 300 can generate and communicate tinting instructions (also referred to herein as "tint commands") to control voltages applied to the ECDs within the IGUs 302.

In some implementations, another function of the network system 300 is to acquire status information from the IGUs 302 (hereinafter "information" is used interchangeably with "data"). For example, the status information for a given IGU can include an identification of, or information about, a current tint state of the ECD(s) within the IGU. The network system 300 also can be operable to acquire data from various sensors, such as temperature sensors, photosensors (also referred to herein as light sensors), humidity sensors, air flow sensors, or occupancy sensors, whether integrated on or within the IGUs 302 or located at various other positions in, on or around the building.

The network system 300 can include any suitable number of distributed controllers having various capabilities or functions. In some implementations, the functions and arrangements of the various controllers are defined hierarchically. For example, the network system 300 includes a plurality of distributed window controllers (WCs) 304, a plurality of network controllers (NCs) 306, and a master controller (MC) 308. In some implementations, the MC 308 can communicate with and control tens or hundreds of NCs 306. In various implementations, the MC 308 issues high level instructions to the NCs 306 over one or more wired or wireless links 316 (hereinafter collectively referred to as "link 316"). The instructions can include, for example, tint commands for causing transitions in the optical states of the IGUs 302 controlled by the respective NCs 306. Each NC 306 can, in turn, communicate with and control a number of WCs 304 over one or more wired or wireless links 314 (hereinafter collectively referred to as "link 314"). For example, each NC 306 can control tens or hundreds of the WCs 304. Each WC 304 can, in turn, communicate with, drive or otherwise control one or more respective IGUs 302 over one or more wired or wireless links 312 (hereinafter collectively referred to as "link 312").

The MC 308 can issue communications including tint commands, status request commands, data (for example, sensor data) request commands or other instructions. In some implementations, the MC 308 can issue such communications periodically, at certain predefined times of day (which may change based on the day of week or year), or based on the detection of particular events, conditions or combinations of events or conditions (for example, as determined by acquired sensor data or based on the receipt of a request initiated by a user or by an application or a combination of such sensor data and such a request). In some implementations, when the MC 308 determines to cause a tint state change in a set of one or more IGUs 302, the MC 308 generates or selects a tint value corresponding to the desired tint state. In some implementations, the set of IGUs 302 is associated with a first protocol identifier (ID) (for example, a BACnet ID). The MC 308 then generates and transmits a communication—referred to herein as a "primary tint command"— including the tint value and the first protocol ID over the link 316 via a first communication protocol (for example, a BACnet compatible protocol). In some implementations, the MC 308 addresses the primary tint command to the particular NC 306 that controls the particular one or more WCs 304 that, in turn, control the set of IGUs 302 to be transitioned.

The NC 306 receives the primary tint command including the tint value and the first protocol ID and maps the first protocol ID to one or more second protocol IDs. In some implementations, each of the second protocol IDs identifies a corresponding one of the WCs 304. The NC 306 subsequently transmits a secondary tint command including the tint value to each of the identified WCs 304 over the link 314 via a second communication protocol. In some implementations, each of the WCs 304 that receives the secondary tint command then selects a voltage or current profile from an internal memory based on the tint value to drive its respectively connected IGUs 302 to a tint state consistent with the tint value. Each of the WCs 304 then generates and provides voltage or current signals over the link 312 to its respectively connected IGUs 302 to apply the voltage or current profile.

In some implementations, the various IGUs 302 can be advantageously grouped into zones of EC windows, each of which zones includes a subset of the IGUs 302. In some implementations, each zone of IGUs 302 is controlled by one or more respective NCs 306 and one or more respective WCs 304 controlled by these NCs 306. In some more specific implementations, each zone can be controlled by a single NC 306 and two or more WCs 304 controlled by the single NC 306. Said another way, a zone can represent a logical grouping of the IGUs 302. For example, each zone may correspond to a set of IGUs 302 in a specific location or area of the building that are driven together based on their location. As a more specific example, consider a building having four faces or sides: a North face, a South face, an East Face and a West Face. Consider also that the building has ten floors. In such a didactic example, each zone can correspond to the set of electrochromic windows 100 on a particular floor and on a particular one of the four faces. Additionally or alternatively, each zone may correspond to a set of IGUs 302 that share one or more physical characteristics (for example, device parameters such as size or age). In some other implementations, a zone of IGUs 302 can be grouped based on one or more non-physical characteristics such as, for example, a security designation or a business hierarchy (for example, IGUs 302 bounding managers' offices can be grouped in one or more zones while IGUs 302 bounding non-managers' offices can be grouped in one or more different zones).

In some such implementations, each NC 306 can address all of the IGUs 302 in each of one or more respective zones. For example, the MC 308 can issue a primary tint command to the NC 306 that controls a target zone. The primary tint command can include an abstract identification of the target zone (hereinafter also referred to as a "zone ID"). In some such implementations, the zone ID can be a first protocol ID such as that just described in the example above. In such cases, the NC 306 receives the primary tint command including the tint value and the zone ID and maps the zone ID to the second protocol IDs associated with the WCs 304 within the zone. In some other implementations, the zone ID can be a higher level abstraction than the first protocol IDs. In such cases, the NC 306 can first map the zone ID to one or more first protocol IDs, and subsequently map the first protocol IDs to the second protocol IDs.

User or Third Party Interaction with Network

In some implementations, the MC 308 is coupled to one or more outward-facing networks, 310, (hereinafter collectively referred to as "the outward-facing network 310") via one or more wired or wireless links 318 (hereinafter "link 318"). In some such implementations, the MC 308 can communicate acquired status information or sensor data to remote computers, mobile devices, servers, databases in or accessible by the outward-facing network 310. In some implementations, various applications, including third party applications or cloud-based applications, executing within such remote devices can access data from or provide data to the MC 308. In some implementations, authorized users or applications can communicate requests to modify the tint states of various IGUs 302 to the MC 308 via the network 310. In some implementations, the MC 308 can first determine whether to grant the request (for example, based on power considerations or based on whether the user has the appropriate authorization) prior to issuing a tint command. The MC 308 can then calculate, determine, select or otherwise generate a tint value and transmit the tint value in a primary tint command to cause the tint state transitions in the associated IGUs 302.

For example, a user can submit such a request from a computing device, such as a desktop computer, laptop computer, tablet computer or mobile device (for example, a smartphone). In some such implementations, the user's computing device can execute a client-side application that is capable of communicating with the MC 308, and in some instances, with a master controller application executing within the MC 308. In some other implementations, the client-side application can communicate with a separate application, in the same or a different physical device or system as the MC 308, which then communicates with the master controller application to effect the desired tint state modifications. In some implementations, the master controller application or other separate application can be used to authenticate the user to authorize requests submitted by the user. In some implementations, the user can select the IGUs 302 to be tinted, and inform the MC 308 of the selections, by entering a room number via the client-side application.

Additionally or alternatively, in some implementations, a user's mobile device or other computing device can communicate wirelessly with various WCs 304. For example, a client-side application executing within a user's mobile device can transmit wireless communications including tint state control signals to a WC 304 to control the tint states of the respective IGUs 302 connected to the WC 304. For example, the user can use the client-side application to maintain or modify the tint states of the IGUs 302 adjoining a room occupied by the user (or to be occupied by the user or others at a future time). Such wireless communications can be generated, formatted or transmitted using various wireless network topologies and protocolsWC.

In some such implementations, the control signals sent to the respective WC 304 from the user's mobile device (or other computing device) can override a tint value previously received by the WC 304 from the respective NC 306. In other words, the WC 304 can provide the applied voltages to the IGUs 302 based on the control signals from the user's computing device rather than based on the tint value. For example, a control algorithm or rule set stored in and executed by the WC 304 can dictate that one or more control signals from an authorized user's computing device take precedence over a tint value received from the NC 306. In some other instances, such as in high demand cases, control signals such as a tint value from the NC 306 may take precedence over any control signals received by the WC 304 from a user's computing device. In some other instances, a control algorithm or rule set may dictate that tint overrides from only certain users or groups or classes of users may take precedence based on permissions granted to such users, as well as in some instances, other factors including time of day or the location of the IGUs 302.

In some implementations, based on the receipt of a control signal from an authorized user's computing device, the MC 308 can use information about a combination of known parameters to calculate, determine, select or otherwise generate a tint value that provides lighting conditions desirable for a typical user, while in some instances also using power efficiently. In some other implementations, the MC 308 can determine the tint value based on preset preferences defined by or for the particular user that requested the tint state change via the computing device. For example, the user may be required to enter a password or otherwise login or obtain authorization to request a tint state change. In such instances, the MC 308 can determine the identity of the user based on a password, a security token or based on an identifier of the particular mobile device or other computing device. After determining the user's identity, the MC 308 can then retrieve preset preferences for the user, and use the preset preferences alone or in combination with other parameters (such as power considerations or information from various sensors) to generate and transmit a tint value for use in tinting the respective IGUs 302.

Wall Devices

In some implementations, the network system 300 also can include wall switches, dimmers or other tint-state-controlling devices. A wall switch generally refers to an electromechanical interface connected to a WC. The wall switch can convey a tint command to the WC, which can then convey the tint command to the NC. Such devices also are hereinafter collectively referred to as "wall devices," although such devices need not be limited to wall-mounted implementations (for example, such devices also can be located on a ceiling or floor, or integrated on or within a desk or a conference table). For example, some or all of the offices, conference rooms or other rooms of the building can include such a wall device for use in controlling the tint states of the adjoining IGUs 302. For example, the IGUs 302 adjoining a particular room can be grouped into a zone. Each of the wall devices can be operated by an end user (for example, an occupant of the respective room) to control the tint state or other functions or parameters of the IGUs 302 that adjoin the room. For example, at certain times of the day, the adjoining IGUs 302 may be tinted to a dark state to reduce the amount of light energy entering the room from the outside (for example, to reduce AC cooling requirements). Now suppose that a user desires to use the room. In various implementations, the user can operate the wall device to communicate control signals to cause a tint state transition from the dark state to a lighter tint state.

In some implementations, each wall device can include one or more switches, buttons, dimmers, dials or other physical user interface controls enabling the user to select a particular tint state or to increase or decrease a current tinting level of the IGUs 302 adjoining the room. Additionally or alternatively, the wall device can include a display having a touchscreen interface enabling the user to select a particular tint state (for example, by selecting a virtual button, selecting from a dropdown menu or by entering a tint level or tinting percentage) or to modify the tint state (for example, by selecting a "darken" virtual button, a "lighten" virtual button, or by turning a virtual dial or sliding a virtual bar). In some other implementations, the wall device can include a docking interface enabling a user to physically and communicatively dock a portable device such as a smartphone, multimedia device, tablet computer or other portable computing device (for example, an IPHONE, IPOD or IPAD produced by Apple, Inc. of Cupertino, Calif.). In such implementations, the user can control the tinting levels via input to the portable device, which is then received by the wall device through the docking interface and subsequently communicated to the MC 308, NC 306 or WC 304. In such implementations, the portable device may include an application for communicating with an API presented by the wall device.

For example, the wall device can transmit a request for a tint state change to the MC 308. In some implementations, the MC 308 can first determine whether to grant the request (for example, based on power considerations or based on whether the user has the appropriate authorizations/permissions). The MC 308 can then calculate, determine, select or otherwise generate a tint value and transmit the tint value in a primary tint command to cause the tint state transitions in the adjoining IGUs 302. In some such implementations, each wall device can be connected with the MC 308 via one or more wired links (for example, over communication lines such as CAN or Ethernet compliant lines or over power lines using power line communication techniques). In some other implementations, each wall device can be connected with the MC 308 via one or more wireless links. In some other implementations, the wall device can be connected (via one or more wired or wireless connections) with an outward-facing network 310 such as a customer-facing network, which then communicates with the MC 308 via link 318.

In some implementations, the MC 308 can identify the IGUs 302 associated with the wall device based on previously programmed or discovered information associating the wall device with the IGUs 302. In some implementations, a control algorithm or rule set stored in and executed by the MC 308 can dictate that one or more control signals from a wall device take precedence over a tint value previously generated by the MC 308. In some other instances, such as in times of high demand (for example, high power demand), a control algorithm or rule set stored in and executed by the MC 308 can dictate that the tint value previously generated by the MC 308 takes precedence over any control signals received from a wall device.

In some other implementations or instances, based on the receipt of a tint-state-change request or control signal from a wall device, the MC 308 can use information about a combination of known parameters to generate a tint value that provides lighting conditions desirable for a typical user, while in some instances also using power efficiently. In some other implementations, the MC 308 can generate the tint value based on preset preferences defined by or for the particular user that requested the tint state change via the wall device. For example, the user may be required to enter a password into the wall device or to use a security token or security fob such as the IBUTTON or other 1-Wire device to gain access to the wall device. In such instances, the MC 308 can determine the identity of the user, based on the password, security token or security fob, retrieve preset preferences for the user, and use the preset preferences alone or in combination with other parameters (such as power considerations or information from various sensors) to calculate, determine, select or otherwise generate a tint value for the respective IGUs 302.

In some other implementations, the wall device can transmit a tint state change request to the appropriate NC 306, which then communicates the request, or a communication based on the request, to the MC 308. For example, each wall device can be connected with a corresponding NC 306 via one or more wired links such as those just described for the MC 308 or via a wireless link (such as those described below). In some other implementations, the wall device can transmit a request to the appropriate NC 306, which then itself determines whether to override a primary tint command previously received from the MC 308 or a primary or secondary tint command previously generated by the NC 306 (as described below, the NC 306 can in some implementations generate tint commands without first receiving a tint command from an MC 308). In some other implementations, the wall device can communicate requests or control signals directly to the WC 304 that controls the adjoining IGUs 302. For example, each wall device can be connected with a corresponding WC 304 via one or more wired links such as those just described for the MC 308 or via a wireless linkWC.

In some specific implementations, the NC 306 or the MC 308 determines whether the control signals from the wall device should take priority over a tint value previously generated by the NC 306 or the MC 308. As described above, in some implementations, the wall device can communicate directly with the NC 306. However, in some other implementations, the wall device can communicate requests directly to the MC 308 or directly to a WC 304, which then communicates the request to the NC 306. In still other implementations, the wall device can communicate requests to a customer-facing network (such as a network managed by the owners or operators of the building), which then passes the requests (or requests based therefrom) to the NC 306 either directly or indirectly by way of the MC 308. In some implementations, a control algorithm or rule set stored in and executed by the NC 306 or the MC 308 can dictate that one or more control signals from a wall device take precedence over a tint value previously generated by the NC 306 or the MC 308. In some other instances, such as in times of high demand (for example, high power demand), a control algorithm or rule set stored in and executed by the NC 306 or the MC 308 can dictate that the tint value previously generated by the NC 306 or the MC 308 takes precedence over any control signals received from a wall device.

As described above with reference to the MC 308, in some other implementations, based on the receipt of a tint-state-change request or control signal from a wall device, the NC 306 can use information about a combination of known parameters to generate a tint value that provides lighting conditions desirable for a typical user, while in some instances also using power efficiently. In some other implementations, the NC 306 or the MC 308 can generate the tint value based on preset preferences defined by or for the particular user that requested the tint state change via the wall device. As described above with reference to the MC 308, the user may be required to enter a password into the wall device or to use a security token or security fob such as the IBUTTON or other 1-Wire device to gain access to the wall device. In such instances, the NC 306 can communicate with the MC 308 to determine the identity of the user, or the MC 308 can alone determine the identity of the user, based on the password, security token or security fob, retrieve preset preferences for the user, and use the preset preferences alone or in combination with other parameters (such as power considerations or information from various sensors) to calculate, determine, select or otherwise generate a tint value for the respective IGUs 302.

In some implementations, the MC 308 is coupled to an external database (or "data store" or "data warehouse") 320. In some implementations, the database 320 can be a local database coupled with the MC 308 via a wired hardware link 322. In some other implementations, the database 320 can be a remote database or a cloud-based database accessible by the MC 308 via an internal private network or over the outward-facing network 310. In some implementations, other computing devices, systems or servers also can have access to read the data stored in the database 320, for example, over the outward-facing network 310. Additionally, in some implementations, one or more control applications or third party applications also can have access to read the data stored in the database via the outward-facing network 310. In some cases, the MC 308 stores in the database 320 a record of all tint commands including the corresponding tint values issued by the MC 308. The MC 308 also can collect status and sensor data and store it in the database 320. In such instances, the WCs 304 can collect the sensor data and status data from the IGUs 302 and communicate the sensor data and status data to the respective NCs 306 over link 314 for communication to the MC 308 over link 316. Additionally or alternatively, the NCs 306 or the MC 308 themselves also can be connected to various sensors such as light, temperature or occupancy sensors within the building as well as light or temperature sensors positioned on, around or otherwise external to the building (for example, on a roof of the building). In some implementations the NCs 306 or the WCs 304 also can transmit status or sensor data directly to the database 320 for storage.

Integration with Other Systems or Services

In some implementations, the network system 300 also can be designed to function in conjunction with modern heating, ventilation, and air conditioning (HVAC) systems, interior lighting systems, security systems or power systems as an integrated and efficient energy control system for an entire building or a campus of buildings. Some implementations of the network system 300 are suited for integration with a building management system (BMS), 324. A BMS is broadly a computer-based control system that can be installed in a building to monitor and control the building's mechanical and electrical equipment such as HVAC systems (including furnaces or other heaters, air conditioners, blowers and vents), lighting systems, power systems, elevators, fire systems, and security systems. The BMS can include hardware and associated firmware and software for maintaining conditions in the building according to preferences set by the occupants or by a building manager or other administrator. The software can be based on, for example, internet protocols or open standards. A BMS can typically be used in large buildings where it functions to control the environment within the building. For example, the BMS can control lighting, temperature, carbon dioxide levels, and humidity within the building. To control the building environment, the BMS can turn on and off various mechanical and electrical devices according to rules or in response to conditions. Such rules and conditions can be selected or specified by a building manager or administrator, for example. One function of a BMS can be to maintain a comfortable environment for the occupants of a building while minimizing heating and cooling energy losses and costs. In some implementations, the BMS can be configured not only to monitor and control, but also to optimize the synergy between various systems, for example, to conserve energy and lower building operation costs.

Additionally or alternatively, some implementations of the network system 300 are suited for integration with a smart thermostat service, alert service (for example, fire detection), security service or other appliance automation service. On example of a home automation service is NEST®, made by Nest Labs of Palo Alto, Calif., (NEST® is a registered trademark of Google, Inc. of Mountain View, Calif.). As used herein, references to a BMS can in some implementations also encompass, or be replaced with, such other automation services.

In some implementations, the MC 308 and a separate automation service, such as a BMS 324, can communicate via an application programming interface (API). For example, the API can execute in conjunction with a master controller application (or platform) within the MC 308, or in conjunction with a building management application (or platform) within the BMS 324. The MC 308 and the BMS 324 can communicate over one or more wired links 326 or via the outward-facing network 310. In some instances, the BMS 324 can communicate instructions for controlling the IGUs 302 to the MC 308, which then generates and transmits primary tint commands to the appropriate NCs 306. In some implementations, the NCs 306 or the WCs 304 also can communicate directly with the BMS 324 (whether through a wired/hardware link or wirelessly through a wireless data link). In some implementations, the BMS 324 also can receive data, such as sensor data, status data and associated timestamp data, collected by one or more of the MC 308, the NCs 306 and the WCs 304. For example, the MC 308 can publish such data over the network 310. In some other implementations in which such data is stored in a database 320, the BMS 324 can have access to some or all of the data stored in the database 320.

Example Master Controller

Figure 7:
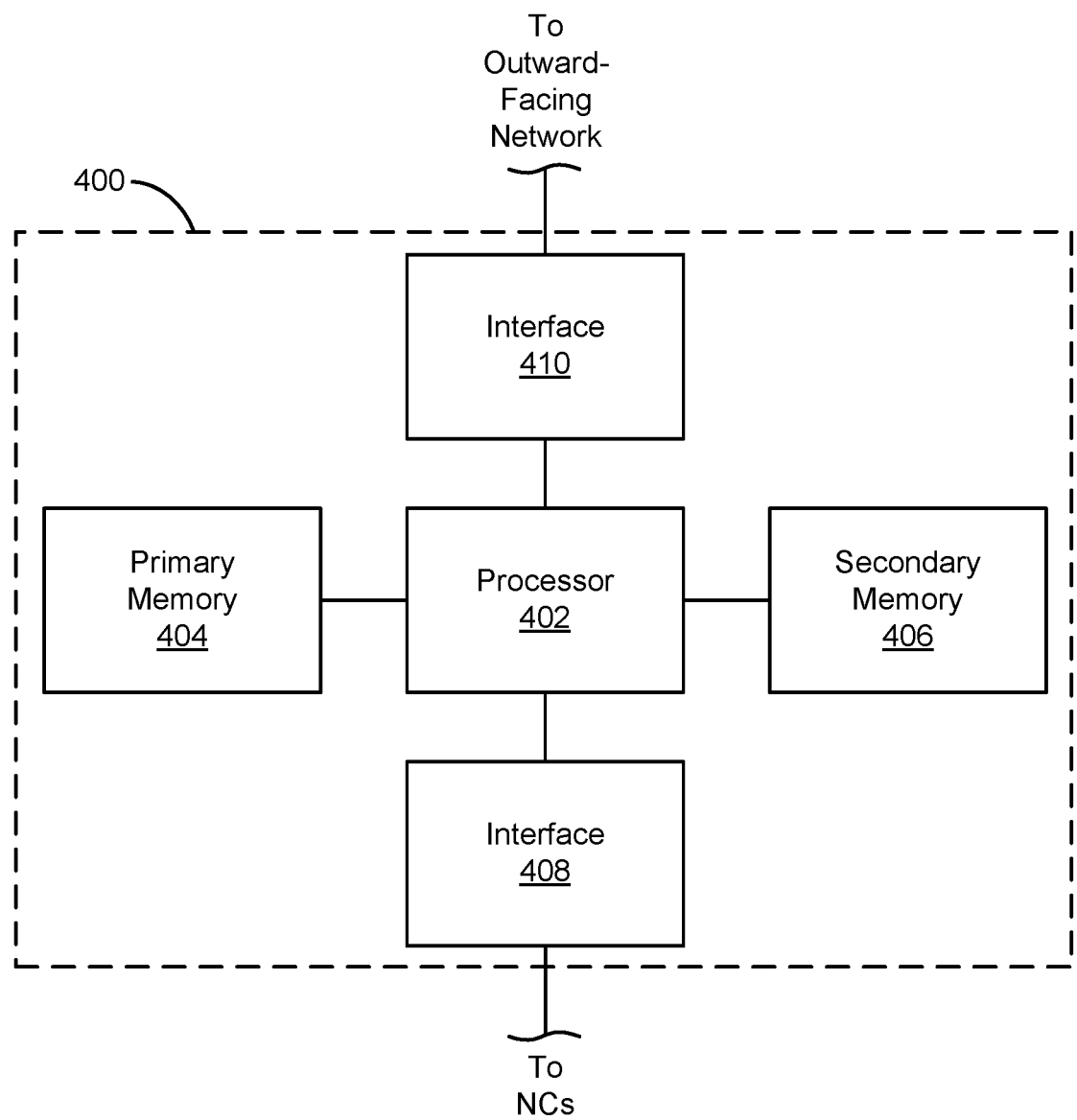
FIG. 7 shows a block diagram of an example master controller (MC) in accordance with some implementations.

FIG. 7 shows a block diagram of an example master controller (MC) 400 in accordance with some implementations. For example, the MC 400 of FIG. 7 can be used to implement the MC 308 described above with reference to the network system 300 of FIG. 6. As used herein, references to "the MC 400" also encompass the MC 308, and vice versa; in other words, the two references may be used interchangeably. The MC 400 can be implemented in or as one or more computers, computing devices or computer systems (herein used interchangeably where appropriate unless otherwise indicated). Additionally, reference to "the MC 400" collectively refers to any suitable combination of hardware, firmware and software for implementing the functions, operations, processes or capabilities described. For example, the MC 400 can refer to a computer that implements a master controller application (also referred to herein as a "program" or a "task").

As shown in FIG. 7, the MC 400 generally includes one or more processors 402 (also collectively referred to hereinafter as "the processor 402"). Processor 402 can be or can include a central processing unit (CPU), such as a single core or a multi-core processor. The processor 402 can additionally include a digital signal processor (DSP) or a network processor in some implementations. In some implementations, the processor 402 also can include one or more application-specific integrated circuits (ASICs). The processor 402 is coupled with a primary memory 404, a secondary memory 406, an inward-facing network interface 408 and an outward-facing network interface 410. The primary memory 404 can include one or more high-speed memory devices such as, for example, one or more random-access memory (RAM) devices including dynamic-RAM (DRAM) devices. Such DRAM devices can include, for example, synchronous DRAM (SDRAM) devices and double data rate SDRAM (DDR SDRAM) devices (including DDR2 SDRAM, DDR3 SDRAM, and DDR4 SDRAM), thyristor RAM (T-RAM), and zero-capacitor (Z-RAMC), among other suitable memory devices.

The secondary memory 406 can include one or more hard disk drives (HDDs) or one or more solid-state drives (SSDs). In some implementations, the memory 406 can store processor-executable code (or "programming instructions") for implementing a multi-tasking operating system such as, for example, an operating system based on a Linux® kernel. In some other implementations, the operating system can be a UNIX®- or Unix-like-based operating system, a Microsoft Windows®-based operating system, or another suitable operating system. The memory 406 also can store code executable by the processor 402 to implement the master controller application described above, as well as code for implementing other applications or programs. The memory 406 also can store status information, sensor data or other data collected from network controllers, window controllers and various sensors.

In some implementations, the MC 400 is a "headless" system; that is, a computer that does not include a display monitor or other user input device. In some such implementations, an administrator or other authorized user can log in to or otherwise access the MC 400 from a remote computer or mobile computing device over a network (for example, the network 310) to access and retrieve information stored in the MC 400, to write or otherwise store data in the MC 400, and to control various functions, operations, processes or parameters implemented or used by the MC 400. In some other implementations, the MC 400 also can include a display monitor and a direct user input device (for example, one or more of a mouse, a keyboard and a touchscreen).

In various implementations, the inward-facing network interface 408 enables the MC 400 to communicate with various distributed controllers, and in some implementations, also with various sensors. The inward-facing network interface 408 can collectively refer to one or more wired network interfaces or one or more wireless network interfaces (including one or more radio transceivers). In the context of the network system 300 of FIG. 6, the MC 400 can implement the MC 308 and the inward-facing network interface 408 can enable communication with the downstream NCs 306 over the link 316.

The outward-facing network interface 410 enables the MC 400 to communicate with various computers, mobile devices, servers, databases or cloud-based database systems over one or more networks. The outward-facing network interface 410 also can collectively refer to one or more wired network interfaces or one or more wireless network interfaces (including one or more radio transceivers). In the context of the network system 300 of FIG. 6, the outward-facing network interface 410 can enable communication with various computers, mobile devices, servers, databases or cloud-based database systems accessible via the outward-facing network 310 over the link 318. As described above, in some implementations, the various applications, including third party applications or cloud-based applications, executing within such remote devices can access data from or provide data to the MC 400 or to the database 320 via the MC 400. In some implementations, the MC 400 includes one or more APIs for facilitating communication between the MC 400 and various third party applications. Some example implementations of APIs that the MC 400 can enable are described in PCT Patent Application No. PCT/US15/64555 filed Dec. 8, 2015 and titled MULTIPLE INTERACTING SYSTEMS AT A SITE, which is hereby incorporated by reference in its entirety and for all purposes. For example, such third-party applications can include various monitoring services including thermostat services, alert services (for example, fire detection), security services or other appliance automation services. Additional examples of monitoring services and systems can be found in PCT Patent Application No. PCT/US2015/019031 filed Mar. 5, 2015 and titled MONITORING SITES CONTAINING SWITCHABLE OPTICAL DEVICES AND CONTROLLERS, which is hereby incorporated by reference in its entirety and for all purposes.

In some implementations, one or both of the inward-facing network interface 408 and the outward-facing network interface 410 can include a BACnet compatible interface. BACnet is a communications protocol typically used in building automation and control networks and defined by the ASHRAE/ANSI 135 and ISO 16484-5 standards. The BACnet protocol broadly provides mechanisms for computerized building automation systems and devices to exchange information, regardless of the particular services they perform. For example, BACnet has traditionally been used to enable communication among heating, ventilating, and air-conditioning control (HVAC) systems, lighting control systems, access or security control systems, and fire detection systems as well as their associated equipment. In some other implementations, one or both of the inward-facing network interface 408 and the outward-facing network interface 410 can include an oBIX (Open Building Information Exchange) compatible interface or another RESTful Web Services-based interface. As such, while the following description is sometimes focused on BACnet implementations, in other implementations, other protocols compatible with oBIX or other RESTful Web Services can be used.

The BACnet protocol is generally based on a server-client architecture. In some implementations, as viewed from the outward-facing network 310, the MC 400 functions as a BACnet server. For example, the MC 400 can publish various information through the outward-facing network interface 410 over the network 310 to various authorized computers, mobile devices, servers or databases, or to various authorized applications executing on such devices. When viewed from the rest of the network system 300, the MC 400 can function as a client. In some such implementations, the NCs 306 function as BACnet servers collecting and storing status data, sensor data or other data acquired from the WCs 304, and publishing this acquired data such that it is accessible to the MC 400.

The MC 400 can communicate as a client to each of the NCs 306 using BACnet standard data types. Such BACnet data types can include analog values (AVs). In some such implementations, each NC 306 stores an array of AVs. The array of AVs can be organized by BACnet IDs. For example, each BACnet ID can be associated with at least two AVs; a first one of the AVs can be associated with a tint value set by the MC 400 and a second one of the AVs can be associated with a status indication value set (or received) from a respective WC 304. In some implementations, each BACnet ID can be associated with one or more WCs 304. For example, each of the WCs 304 can be identified by a second protocol ID such as a Controller Area Network (CAN) vehicle bus standard ID (referred to hereinafter as a "CAN ID"). In such implementations, each BACnet ID can be associated with one or more CAN IDs in the NC 306.

In some implementations, when the MC 400 determines to tint one or more IGUs 302, the MC 400 writes a specific tint value to the AV in the NC 306 associated with the one or more respective WCs 304 that control the target IGUs 302. In some more specific implementations, the MC 400 generates a primary tint command including a BACnet ID associated with the WCs 304 that control the target IGUs 302. The primary tint command also can include a tint value for the target IGUs 302. The MC 400 can direct the transmission of the primary tint command through the inward-facing interface 408 and to the particular NC 306 using a network address of the NC 306. For example, the network address of the NC 306 can include an Internet Protocol (IP) address (for example, an IPv4 or IPv6 address) or a Media Access Control (MAC) address (for example, when communicating over an Ethernet link 316).

The MC 400 can calculate, determine, select or otherwise generate a tint value for one or more IGUs 302 based on a combination of parameters. For example, the combination of parameters can include time or calendar information such as the time of day, day of year or time of season. Additionally or alternatively, the combination of parameters can include solar calendar information such as, for example, the direction of the sun relative to the IGUs 302. In some instances, the direction of the sun relative to the IGUs 302 can be determined by the MC 400 based on time and calendar information together with information known about the geographical location of the building on the Earth and the direction that the IGUs face (for example, in a North-East-Down coordinate system). The combination of parameters also can include the outside temperature (external to the building), the inside temperature (within a room adjoining the target IGUs 302), or the temperature within the interior volume of the IGUs 302. The combination of parameters also can include information about the weather (for example, whether it is clear, sunny, overcast, cloudy, raining or snowing). Parameters such as the time of day, day of year, or direction of the sun can be programmed into and tracked by the MC 308. Parameters such as the outside temperature, inside temperature or IGU temperature can be obtained from sensors in, on or around the building or sensors integrated on or within the IGUs 302. Some information about the weather also can be obtained from such sensors. Additionally or alternatively, parameters such as the time of day, time of year, direction of the sun, or weather can be provided by, or determined based on information provided by, various applications including third party applications over the network 310. Additional examples of algorithms, routines, modules, or other means for generating tint values are described in U.S. patent application Ser. No. 13/772,969 filed Feb. 21, 2013 and titled CONTROL METHOD FOR TINTABLE WINDOWS, and in PCT Patent Application No. PCT/US15/029675 filed May 7, 2015 and titled CONTROL METHOD FOR TINTABLE WINDOWS, both of which are hereby incorporated by reference in their entireties and for all purposes.

Generally, each ECD within each IGU 302 is capable of being tinted, responsive to a suitable driving voltage applied across the EC stack, to virtually any tint state within a continuous tint spectrum defined by the material properties of the EC stack. However, in some implementations, the MC 400 is programmed to select a tint value from a finite number of discrete tint values. For example, the tint values can be specified as integer values. In some such implementations, the number of available discrete tint values can be 4, 8, 16, 32, 64, 128 or 256 or more. For example, a 2-bit binary number can be used to specify any one of four possible integer tint values, a 3-bit binary number can be used to specify any one of eight possible integer tint values, a 4-bit binary number can be used to specify any one of sixteen possible integer tint values, a 5-bit binary number can be used to specify any one of thirty-two possible integer tint values, and so on. Each tint value can be associated with a target tint level (for example, expressed as a percentage of maximum tint, maximum safe tint, or maximum desired or available tint). For didactic purposes, consider an example in which the MC 400 selects from among four available tint values: 0, 5, 10 and 15 (using a 4-bit or higher binary number). The tint values 0, 5, 10 and 15 can be respectively associated with target tint levels of 60%, 40%, 20% and 4%, or 60%, 30%, 10% and 1%, or another desired, advantageous, or suitable set of target tint levels.

Example Network Controller

Figure 8:
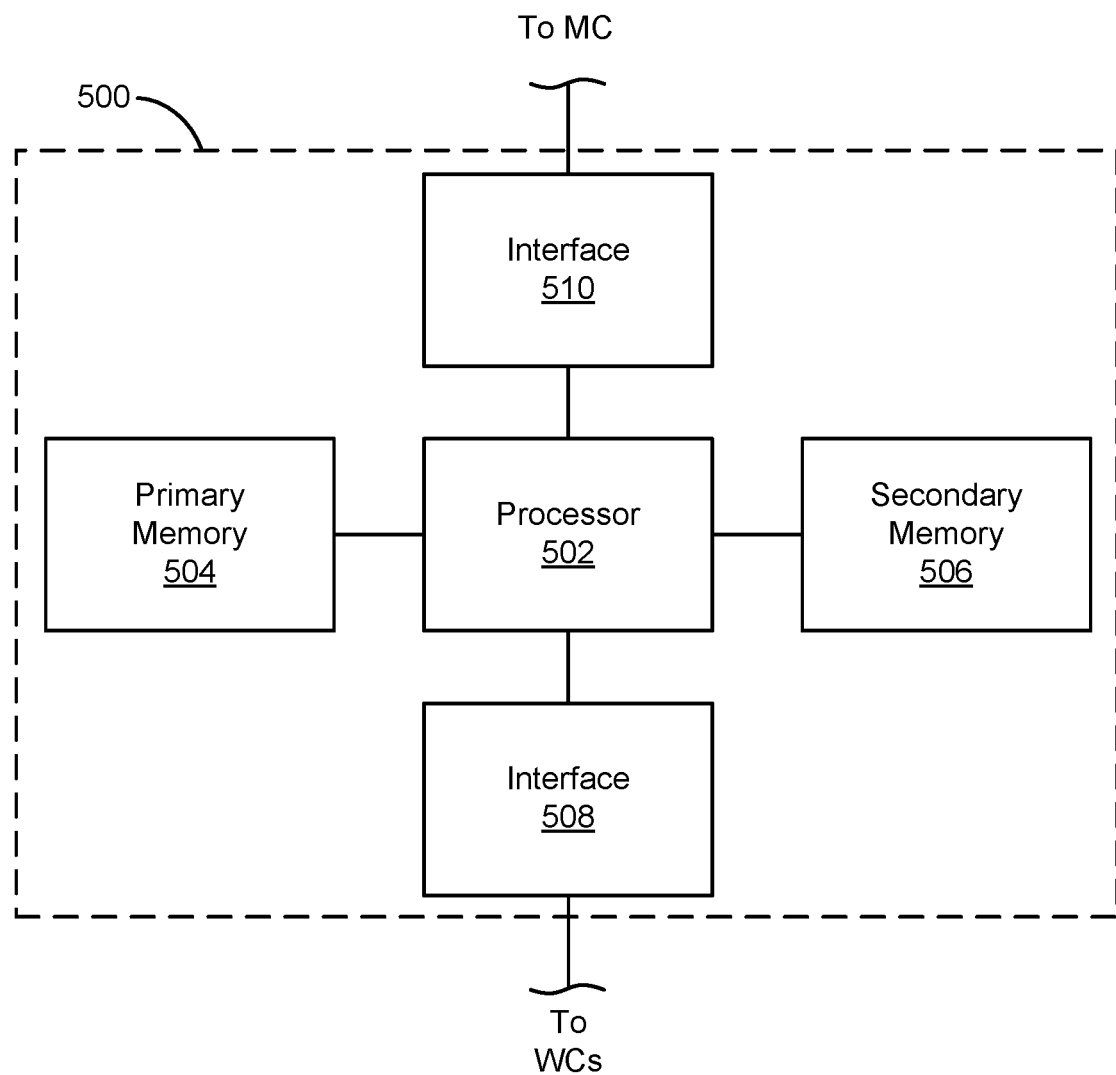
FIG. 8 shows a block diagram of an example network controller (NC) in accordance with some implementations.

FIG. 8 shows a block diagram of an example network controller (NC) 500 in accordance with some implementations. For example, the NC 500 of FIG. 8 can be used to implement the NC 306 described above with reference to the network system 300 of FIG. 6. As used herein, references to "the NC 500" also encompass the NC 306, and vice versa; in other words, the two references may be used interchangeably. The NC 500 can be implemented in or as one or more network components, networking devices, computers, computing devices or computer systems (herein used interchangeably where appropriate unless otherwise indicated). Additionally, reference to "the NC 500" collectively refers to any suitable combination of hardware, firmware and software for implementing the functions, operations, processes or capabilities described. For example, the NC 500 can refer to a computer that implements a network controller application (also referred to herein as a "program" or a "task").

As shown in FIG. 8, the NC 500 generally includes one or more processors 502 (also collectively referred to hereinafter as "the processor 502"). In some implementations, the processor 502 can be implemented as a microcontroller or as one or more logic devices including one or more application-specific integrated circuits (ASICs) or programmable logic devices (PLDs), such as field-programmable gate arrays (FPGAs) or complex programmable logic devices (CPLDs). If implemented in a PLD, the processor can be programmed into the PLD as an intellectual property (IP) block or permanently formed in the PLD as an embedded processor core. In some other implementations, the processor 502 can be or can include a central processing unit (CPU), such as a single core or a multi-core processor. The processor 502 is coupled with a primary memory 504, a secondary memory 506, a downstream network interface 508 and an upstream network interface 510. In some implementations, the primary memory 504 can be integrated with the processor 502, for example, as a system-on-chip (SOC) package, or in an embedded memory within a PLD itself. In some other implementations, the NC 500 alternatively or additionally can include one or more high-speed memory devices such as, for example, one or more RAM devices.

The secondary memory 506 can include one or more solid-state drives (SSDs) storing one or more lookup tables or arrays of values. In some implementations, the secondary memory 506 can store a lookup table that maps first protocol IDs (for example, BACnet IDs) received from the MC 400 to second protocol IDs (for example, CAN IDs) each identifying a respective one of the WCs 304, and vice versa. In some implementations, the secondary memory 506 can additionally or alternatively store one or more arrays or tables. In some implementations, such arrays or tables can be stored as comma-separated values (CSV) files or via another table-structured file format. For example, each row of the file can be identified by a timestamp corresponding to a transaction with a WC 304. Each row can include a tint value (C) for the IGUs 302 controlled by the WC 304 (for example, as set by the MC 400 in the primary tint command); a status value (S) for the IGUs 302 controlled by the WC 304; a set point voltage (for example, the effective applied voltage $V_{Eff}$) an actual voltage level $V_{Act}$ measured, detected or otherwise determined across the ECDs within the IGUs 302; an actual current level $I_{Act}$ measured, detected or otherwise determined through the ECDs within the IGUs 302; and various sensor data. In some implementations, each row of the CSV file can include such status information for each and all of the WCs 304 controlled by the NC 500. In some such implementations, each row also includes the CAN IDs or other IDs associated with each of the respective WC 304.

In some implementations in which the NC 500 is implemented in a computer that executes a network controller application, the secondary memory 506 also can store processor-executable code (or "programming instructions") for implementing a multi-tasking operating system such as, for example, an operating system based on a Linux® kernel. In some other implementations, the operating system can be a UNIX®- or Unix-like-based operating system, a Microsoft Windows®-based operating system, or another suitable operating system. The memory 506 also can store code executable by the processor 502 to implement the network controller application described above, as well as code for implementing other applications or programs.

In various implementations, the downstream network interface 508 enables the NC 500 to communicate with distributed WCs 304, and in some implementations, also with various sensors. In the context of the network system 300 of FIG. 6, the NC 500 can implement the NC 306 and the downstream network interface 508 can enable communication with the WCs 304 over the link 314. The downstream network interface 508 can collectively refer to one or more wired network interfaces or one or more wireless network interfaces (including one or more radio transceivers). In some implementations, the downstream interface 508 can include a CANbus interface enabling the NC 500 to distribute commands, requests or other instructions to various WCs 304, and to receive responses including status information from the WCs 304, according to a CANBus protocol (for example, via the CANopen communication protocol). In some implementations, a single CANbus interface can enable communication between the NC 500 and tens, hundreds or thousands of WCs 304. Additionally or alternatively, the downstream interface 508 can include one or more Universal Serial Bus (USB) interfaces (or "ports"). In some such implementations, to enable communication via a CANbus communication protocol, a USB-to-CAN adapter can be used to couple the USB port of the downstream interface 508 with CANbus-compatible cables. In some such implementations, to enable the NC 500 to control even more WCs 304, a USB hub (for example, having 2, 3, 4, 5 10 or more hub ports) can be plugged into the USB port of the downstream interface 508. A USB-to-CAN adapter can then be plugged into each hub port of the USB hub.

The upstream network interface 510 enables the NC 500 to communicate with the MC 400, and in some implementations, also with various other computers, servers or databases (including the database 320). The upstream network interface 510 also can collectively refer to one or more wired network interfaces or one or more wireless network interfaces (including one or more radio transceivers). In the context of the network system 300 of FIG. 6, the upstream network interface 510 can enable communication with the MC 308 over the link 318. In some implementations, the upstream network interface 510 also can be coupled to communicate with applications, including third party applications and cloud-based applications, over the outward-facing network 310. For example, in implementations in which the NC 500 is implemented as a network controller application executing as a task within a computer, the network controller application can communicate directly with the outward-facing network 310 via the operating system and the upstream network interface 510. In some other implementations, the NC 500 may be implemented as a task running on the MC 308 and managing the CANbus devices via the CANbus interface. In such implementations, in addition or as an alternative to TCP/IP or UDP/IP communications to the MC, the communications could be via UNIX Domain Sockets (UDS) or other communication methods like shared memory, or other non-IP communication methods.

In some implementations, the upstream interface 510 can include BACnet compatible interface, an oBIX compatible interface or another RESTful Web Services-based interface. As described above with reference to FIG. 7, in some implementations the NC 500 functions as a BACnet server collecting and storing status data, sensor data or other data acquired from the WCs 304, and publishing this acquired data such that it is accessible to the MC 400. In some implementations, the NC 500 also can publish this acquired data over the network 310 directly; that is, without first passing the data to the MC 400. The NC 500 also functions in some respects similar to a router. For example, the NC 500 can function as a BACnet to CANBus gateway, receiving communications transmitted from the MC 400 according to the BACnet protocol, converting commands or messages from the BACnet protocol to a CANBus protocol (for example, the CANopen communication protocol), and distributing commands or other instructions to various WCs 304 according to the CANBus protocol.

BACnet is built over the user datagram protocol (UDP). In some other implementations, a non-broadcast-based communication protocol can be used for communication between the MC 400 and the NCs 500. For example, the transmission control protocol (TCP) can serve as the transport layer as opposed to UDP. In some such implementations, the MC 400 can communicate with the NCs 500 via an oBIX-compatible communication protocol. In some other implementations, the MC 400 can communicate with the NCs 500 via a WebSocket-compatible communication protocol. Such TCP protocols also can allow the NCs 500 to communicate directly with one another.

In various implementations, the NC 500 can be configured to perform protocol translation (or "conversion") between one or more upstream protocols and one or more downstream protocols. As described above, the NC 500 can perform translation from BACnet to CANopen, and vice versa. As another example, the NC 500 can receive upstream communications from the MC 400 via an oBIX protocol and translate the communications into CANopen or other CAN-compatible protocols for transmission to the downstream WCs 304, and vice versa. In some wireless implementations, the NC 500 or the MC 400 also can translate various wireless protocols including, for example, protocols based on the IEEE 802.11 standard (for example, WiFi), protocols based on the IEEE 802.15.4 standard (for example, ZigBee, 6LoWPAN, ISA100.11a, WirelessHART or MiWi), protocols based on the Bluetooth standard (including the Classic Bluetooth, Bluetooth high speed and Bluetooth low energy protocols and including the Bluetooth v4.0, v4.1 and v4.2 versions), or protocols based on the EnOcean standard (ISO/IEC 14543-3-10). For example, the NC 500 can receive upstream communications from the MC 400 via an oBIX protocol and translate the communications into WiFi or 6LowPAN for transmission to the downstream WCs 304, and vice versa. As another example, the NC 500 can receive upstream communications from the MC 400 via WiFi or 6LowPAN and translate the communications into CANopen for transmission to the downstream WCs 304, and vice versa. In some other examples, the MC 400 rather than the NC 500 handles such translations for transmission to downstream WCs 304.

As described above with reference to FIG. 7, when the MC 400 determines to tint one or more IGUs 302, the MC 400 can write a specific tint value to the AV in the NC 500 associated with the one or more respective WCs 304 that control the target IGUs 302. In some implementations, to do so, the MC 400 generates a primary tint command communication including a BACnet ID associated with the WCs 304 that control the target IGUs 302. The primary tint command also can include a tint value for the target IGUs 302. The MC 400 can direct the transmission of the primary tint command to the NC 500 using a network address such as, for example, an IP address or a MAC address. Responsive to receiving such a primary tint command from the MC 400 through the upstream interface 510, the NC 500 can unpackage the communication, map the BACnet ID (or other first protocol ID) in the primary tint command to one or more CAN IDs (or other second protocol IDs), and write the tint value from the primary tint command to a first one of the respective AVs associated with each of the CAN IDs.

In some implementations, the NC 500 then generates a secondary tint command for each of the WCs 304 identified by the CAN IDs. Each secondary tint command can be addressed to a respective one of the WCs 304 by way of the respective CAN ID. Each secondary tint command also can include the tint value extracted from the primary tint command. The NC 500 transmits the secondary tint commands to the target WCs 304 through the downstream interface 508 via a second communication protocol (for example, via the CANOpen protocol). In some implementations, when a WC 304 receives such a secondary tint command, the WC 304 transmits a status value back to the NC 500 indicating a status of the WC 304. For example, the tint status value can represent a "tinting status" or "transition status" indicating that the WC is in the process of tinting the target IGUs 302, an "active" or "completed" status indicating that the target IGUs 302 are at the target tint state or that the transition has been finished, or an "error status" indicating an error. After the status value has been stored in the NC 500, the NC 500 can publish the status information or otherwise make the status information accessible to the MC 400 or to various other authorized computers or applications. In some other implementations, the MC 400 can request status information for a particular WC 304 from the NC 500 based on intelligence, a scheduling policy, or a user override. For example, the intelligence can be within the MC 400 or within a BMS. A scheduling policy can be stored in the MC 400, another storage location within the network system 300, or within a cloud-based system.

Integrated Master Controller and Network Controller

As described above, in some implementations the MC 400 and the NC 500 can be implemented as a master controller application and a network controller application, respectively, executing within respective physical computers or other hardware devices. In some alternative implementations, each of the master controller application and the network controller application can be implemented within the same physical hardware. For example, each of the master controller application and the network controller application can be implemented as a separate task executing within a single computer device that includes a multi-tasking operating system such as, for example, an operating system based on a Linux® kernel or another suitable operating system.

In some such integrated implementations, the master controller application and the network controller application can communicate via an application programming interface (API). In some particular implementations, the master controller and network controller applications can communicate over a loopback interface. By way of reference, a loopback interface is a virtual network interface, implemented through an operating system, which enables communication between applications executing within the same device. A loopback interface is typically identified by an IP address (often in the 127.0.0.0/8 address block in IPv4, or the 0:0:0:0:0:0:0:1 address (also expressed as ::1) in IPv6). For example, the master controller application and the network controller application can each be programmed to send communications targeted to one another to the IP address of the loopback interface. In this way, when the master controller application sends a communication to the network controller application, or vice versa, the communication does not need to leave the computer.

In implementations in which the MC 400 and the NC 500 are implemented as master controller and network controller applications, respectively, there are generally no restrictions limiting the available protocols suitable for use in communication between the two applications. This generally holds true regardless of whether the master controller application and the network controller application are executing as tasks within the same or different physical computers. For example, there is no need to use a broadcast communication protocol, such as BACnet, which limits communication to one network segment as defined by a switch or router boundary. For example, the oBIX communication protocol can be used in some implementations for communication between the MC 400 and the NCs 500.

In the context of the network system 300, each of the NCs 500 can be implemented as an instance of a network controller application executing as a task within a respective physical computer. In some implementations, at least one of the computers executing an instance of the network controller application also executes an instance of a master controller application to implement the MC 400. For example, while only one instance of the master controller application may be actively executing in the network system 300 at any given time, two or more of the computers that execute instances of network controller application can have an instance of the master controller application installed. In this way, redundancy is added such that the computer currently executing the master controller application is no longer a single point of failure of the entire system 300. For example, if the computer executing the master controller application fails or if that particular instance of the master controller application otherwise stops functioning, another one of the computers having an instance of the master network application installed can begin executing the master controller application to take over for the other failed instance. In some other applications, more than one instance of the master controller application may be executing concurrently. For example, the functions, processes or operations of the master controller application can be distributed to two (or more) instances of the master controller application.

Example Window Controller

An example window controller is further described in PCT Patent Application No. PCT/US16/58872, titled CONTROLLERS FOR OPTICALLY-SWITCHABLE DEVICES, filed Oct. 26, 2016, which is herein incorporated by reference in its entirety. Controllers for optically switchable devices are also described in U.S. patent application Ser. No. 15/334,832, titled CONTROLLERS FOR OPTICALLY-SWITCHABLE DEVICES, filed Oct. 26, 2016, which is herein incorporate by reference in its entirety.

Smart Network Controller

Figure 9:
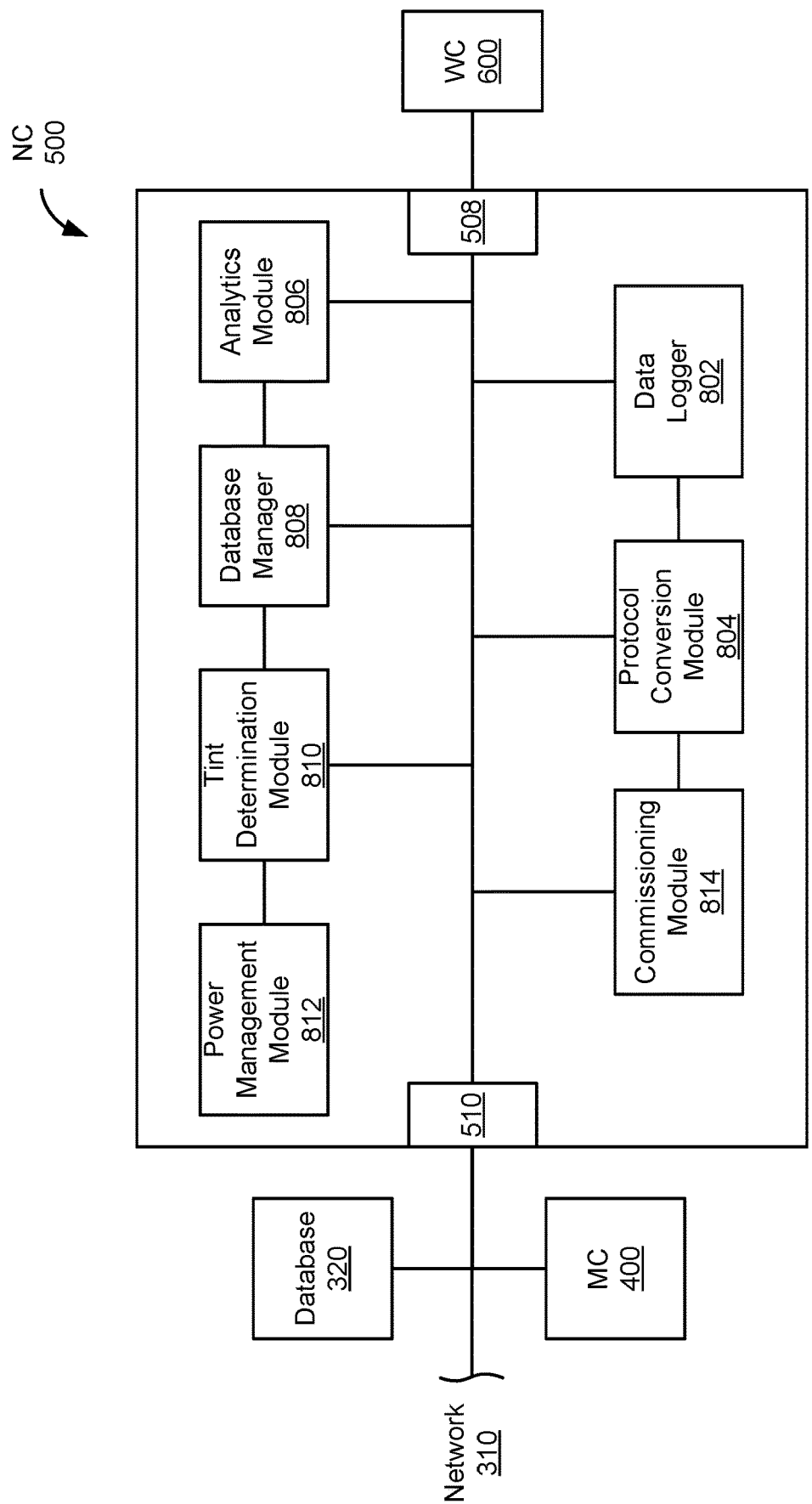
FIG. 9 shows a block diagram of example modules of a network controller in accordance with some implementations.

In some implementations, the NC 500 described with reference to FIG. 8 can take over some of the functions, processes or operations that are described above as being responsibilities of the MC 400 of FIG. 7. Additionally or alternatively, the NC 500 can include additional functionalities or capabilities not described with reference to the MC 400. FIG. 9 shows a block diagram of example modules of a network controller in accordance with some implementations. For example, the modules of FIG. 9 can be implemented in the NC 500 in any suitable combination of hardware, firmware and software. In some implementations in which the NC 500 is implemented as a network controller application executing within a computer, each of the modules of FIG. 1 also can be implemented as an application, task or subtask executing within the network controller application.

In some implementations, the NC 500 periodically requests status information from the WCs it controls. For example, the NC 500 can communicate a status request to each of the WCs it controls every few seconds, every few tens of seconds, every minute, every few minutes or after any desirable period of time. In some implementations, each status request is directed to a respective one of the WCs using the CAN ID or other identifier of the respective WC. In some implementations, the NC 500 proceeds sequentially through all of the WCs it controls during each round of status acquisition. In other words, the NC 500 loops through all of the WCs it controls such that a status request is sent to each of the WCs sequentially in each round of status acquisition. After a status request has been sent to a given WC, the NC 500 then waits to receive the status information from the respective WC before sending a status request to the next one of the WCs in the round of status acquisition.

In some implementations, after status information has been received from all of the WCs that the NC 500 controls, the NC 500 then performs a round of tint command distribution. For example, in some implementations, each round of status acquisition is followed by a round of tint command distribution, which is then followed by a next round of status acquisition and a next round of tint command distribution, and so on. In some implementations, during each round of tint command distribution, the NC 500 proceeds to send a tint command to each of the WCs that the NC 500 controls. In some such implementations, the NC 500 also proceeds sequentially through all of the WCs it controls during the round of tint command distribution. In other words, the NC 500 loops through all of the WCs it controls such that a tint command is sent to each of the WCs sequentially in each round of tint command distribution.

In some implementations, each status request includes instructions indicating what status information is being requested from the respective WC. In some implementations, responsive to the receipt of such a request, the respective WC responds by transmitting the requested status information to the NC 500 (for example, via the communication lines in an upstream set of cables). In some other implementations, each status request by default causes the WC to transmit a predefined set of information for the set of IGUs it controls. Either way, the status information that the WC communicates to the NC 500 responsive to each status request can include a tint status value (S) for the IGUs, for example, indicating whether the IGUs is undergoing a tinting transition or has finished a tinting transition. Additionally or alternatively, the tint status value S or another value can indicate a particular stage in a tinting transition (for example, a particular stage of a voltage control profile). In some implementations, the status value S or another value also can indicate whether the WC is in a sleep mode. The status information communicated in response to the status request also can include the tint value (C) for the IGUs, for example, as set by the MC 400 or the NC 500. The response also can include a set point voltage set by the WC based on the tint value (for example, the value of the effective applied $V_{Eff}$). In some implementations, the response also can include a near real-time actual voltage level $V_{Act}$ measured, detected or otherwise determined across the ECDs within the IGUs (for example, via the amplifier and the feedback circuit). In some implementations, the response also can include a near real-time actual current level $I_{Act}$ measured, detected or otherwise determined through the ECDs within the IGUs (for example, via the amplifier and the feedback circuit). The response also can include various near real-time sensor data, for example, collected from photosensors or temperature sensors integrated on or within the IGUs.

Some protocols such as CANOpen limit the size of each frame of data sent from the WC to the NC 500 and vice versa. In some instances, the sending of each status request and the receiving of status information responsive to such a request actually includes multiple two-way communications, and thus, multiple frames. For example, each status request described above can include a separate sub-request for each of the status values described above. As a more specific example, each status request from the NC 500 to a particular WC can include a first sub-request requesting the status value S. In response to the first sub-request, the WC can transmit to the NC 500 an acknowledgement and a frame including the status value S. The NC 500 can then transmit a second sub-request to the WC requesting the tint value C. In response to the second sub-request, the WC can transmit to the NC 500 an acknowledgement and a frame including the tint value C. The values of $V_{Eff}$, $V_{Act}$ and $I_{Act}$ as well as sensor data can similarly be obtained with separate respective sub-requests and responses.

In some other implementations, rather than polling or sending a status request to each of the WCs on a sequential basis, the NC 500 can asynchronously send status requests to particular WCs. For example, it may not be useful to receive status information (including C, S, $V_{Eff}$, $V_{Act}$ and $I_{Act}$) from all of the WCs periodically. For example, it may be desirable to asynchronously request such information from only particular ones of the WCs that have recently received or implemented a tint command, that are currently undergoing a tinting transition, that have recently finished a tinting transition, or from which status information has not been collected for a relatively long duration of time.

In some other implementations, rather than polling or sending status requests to each of the WCs individually, whether on a sequential basis or asynchronously, each of the WCs can periodically broadcast its status information (including C, S, $V_{Eff}$, $V_{Act}$ and $I_{Act}$). In some such implementations, each of the WCs can broadcast the status information wirelessly. For example, each WC can broadcast the status information every few seconds, tens of seconds, minutes or tens of minutes. In some implementations, the WCs can be synchronized to broadcast their respective status information at certain times to avoid occupying a large amount of collective bandwidth. Additionally, the broadcast period can be different for different sets (such as the zones described above) of WCs and at different times, for example, based on the positions of the respective IGUs in the building and relative to the sun, or based on whether the rooms adjoining the IGUs are occupied.

In some other implementations, each of the WCs can broadcast its status information in response to certain conditions, for example, when starting a tinting transition, when finishing a tinting transition, when $V_{Act}$ changes by a threshold, when $I_{Act}$ changes by a threshold, when sensor data (for example, light intensity or temperature) changes by a threshold, when an occupancy sensor indicates the adjoining room is occupied, or when entering or exiting a sleep mode. The NC 500 can listen for such broadcasted status information, and when it hears it, record the status information. Advantageously, in broadcasting implementations, the time required to receive status information from a set of WCs is approximately cut in half because there is no need to request the status information from the WCs, and thus, no roundtrip delay associated with each WC. Instead, there is only a one-way latency associated with the time required to transmit the status information from each WC to the NC 500.

In some other implementations, at power on or thereafter, each of the WCs can be configured to read device parameters, drive parameters and lite IDs or other ECD IDs for connected IGUs. The WCs then broadcast their CAN IDs as well as the lite IDs and the associated device and drive parameters. That is, in some implementations, such broadcasting is initiated by one or more processors in a WC without or irrespective of any requests for such data by the NCs or other controllers. When the IDs and parameters are broadcast, the NC 500 can receive and process the IDs and parameters. In some implementations, lite IDs and parameters from messages broadcasted by the WC are then communicated from the NC to the MC, which stores them, for example, in a table including a list of known CAN IDs. For example, each row of the table can include a CAN ID, a WC location ID associated with the CAN ID, the connected lite IDs, the locations of the respective windows associated with the lite IDs, and the device and drive parameters for the respective ECDs. In some implementations, the MC can store the table in a cloud-based database system so that even if the MC fails, another MC can be instantiated and access the table in the cloud.

In some instances, during commissioning, a field service technician may intervene and attempt to perform ad hoc lite-to-lite matching based on perceived differences in the tints of two or more neighboring windows. In such cases, the technician may determine that the drive parameters for one or more ECDs should be modified, and these modifications are then implemented. In some implementations, the WC is configured to broadcast the modified parameters to the corresponding NC, from which the parameters can be communicated to the MC. In situations where the WC then fails or experiences an error, the NC or MC can determine that the WC has failed, for instance, because the WC is no longer broadcasting in situations where the WC has been configured to periodically broadcast data such as the WC's CAN ID and/or WC location ID. When the failed WC is replaced with a new WC, which is then powered-on, the new WC will read the corresponding lite IDs and, as described above, broadcast the new WC's CAN ID and the connected lite IDs. When the NC or MC receives this information, the NC or MC can be configured to retrieve the modified drive parameters for the failed WC from a database table by performing a table look-up using the lite IDs. In such instances, the NC or MC is also configured to automatically update the table by assigning the new CAN ID to the WC location ID and associated lite IDs. The NC or MC will then automatically communicate the modified drive parameters to the new WC. In this way, the ECD which had its drive parameters modified during commissioning can still be driven by the modified drive parameters even when the respective WC has been replaced. Other techniques for automatically modifying, updating, and applying drive parameters can be performed in some implementations, as further described in PCT Patent Application No. PCT/US17/20805, titled METHOD OF COMMISSIONING ELECTROCHROMIC WINDOWS, by Shrivastava et al., filed Mar. 3, 2017, which is hereby incorporated by reference in its entirety and for all purposes, In some such implementations, rather than sending a tint command to each of the WCs on a sequential basis, the NC 500 can asynchronously send a tint command to a particular WC whether through a wired or wireless connection. For example, it may not be useful to send tint commands to all of the WCs periodically. For example, it may be desirable to asynchronously sent tint commands to only particular ones of the WCs that are to be transitioned to a different tint state, for which status information has just been (or has recently been) received, or to which a tint command has not been sent for a relatively long duration of time.

Data Logger

In some implementations, the NC 500 also includes a data logging module (or "data logger") 802 for recording data associated with the IGUs controlled by the NC 500. In some implementations, the data logger 802 records the status information included in each of some or all of the responses to the status requests. As described above, the status information that the WC communicates to the NC 500 responsive to each status request can include a tint status value (S) for the IGUs, a value indicating a particular stage in a tinting transition (for example, a particular stage of a voltage control profile), a value indicating whether the WC is in a sleep mode, a tint value (C), a set point voltage set by the WC based on the tint value (for example, the value of the effective applied $V_{Eff}$), an actual voltage level $V_{Act}$ measured, detected or otherwise determined across the ECDs within the IGUs, an actual current level $I_{Act}$ measured, detected or otherwise determined through the ECDs within the IGUs, and various sensor data, for example, collected from photosensors or temperature sensors integrated on or within the IGUs. In some other implementations, the NC 500 can collect and queue status information in a messaging queue like RabbitMC, ActiveMQ or Kafka and stream the status information to the MC for subsequent processing such as data reduction/compression, event detection, etc., as further described herein.

In some implementations, the data logger 802 within the NC 500 collects and stores the various information received from the WCs in the form of a log file such as a comma-separated values (CSV) file or via another table-structured file format. For example, each row of the CSV file can be associated with a respective status request, and can include the values of C, S, $V_{Eff}$, $V_{Act}$ and $I_{Act}$ as well as sensor data (or other data) received in response to the status request. In some implementations, each row is identified by a timestamp corresponding to the respective status request (for example, when the status request was sent by the NC 500, when the data was collected by the WC, when the response including the data was transmitted by the WC, or when the response was received by the NC 500). In some implementations, each row also includes the CAN ID or other ID associated with the respective WC.

In some other implementations, each row of the CSV file can include the requested data for all of the WCs controlled by the NC 500. As described above, the NC 500 can sequentially loop through all of the WCs it controls during each round of status requests. In some such implementations, each row of the CSV file is still identified by a timestamp (for example, in a first column), but the timestamp can be associated with a start of each round of status requests, rather than each individual request. In one specific example, columns 2-6 can respectively include the values C, S, $V_{Eff}$, $V_{Act}$ and $I_{Act}$ for a first one of the WCs controlled by the NC 500, columns 7-11 can respectively include the values C, S, $V_{Eff}$, $V_{Act}$ and $I_{Act}$ for a second one of the WCs, columns 12-16 can respectively include the values C, S, $V_{Eff}$, $V_{Act}$ and $I_{Act}$ for a third one of the WCs, and so on and so forth through all of the WCs controlled by the NC 500. The subsequent row in the CSV file can include the respective values for the next round of status requests. In some implementations, each row also can include sensor data obtained from photosensors, temperature sensors or other sensors integrated with the respective IGUs controlled by each WC. For example, such sensor data values can be entered into respective columns between the values of C, S, $V_{Eff}$, $V_{Act}$ and $I_{Act}$ for a first one of the WCs but before the values of C, S, $V_{Eff}$, $V_{Act}$ and $I_{Act}$ for the next one of the WCs in the row. Additionally or alternatively, each row can include sensor data values from one or more external sensors, for example, positioned on one or more facades or on a rooftop of the building. In some such implementations, the NC 500 can send a status request to the external sensors at the end of each round of status requests.

Compact Status

As described above, some protocols such as CANopen limit the size of each frame sent from the WC to the NC 500 and vice versa. In some instances, the sending of each status request and the receiving of status information responsive to such a request actually includes multiple two-way communications and frames. For example, each status request described above can include a separate sub-request for each of the status values described above. In some implementations, each of two or more of the requested values C, S, $V_{Eff}$, $V_{Act}$ and $I_{Act}$ can be transmitted together within a single response—a compact status response. For example, in some implementations, the values of two or more of C, S, $V_{Eff}$, $V_{Act}$ and $I_{Act}$ are formatted so as to fit in one frame. For example, the CANopen protocol limits the size of the data payload that can be sent in each frame to 8 bytes (where each byte includes 8 bits). And in implementations in which the Service Data Object (SDO) sub-protocol of CAN open is used, the maximum size of the data payload portion of the CANopen frame is 4 bytes (32 bits). In some implementations, the size of each of the values $V_{Eff}$, $V_{Act}$ and $I_{Act}$ is 10 bits. Thus, each of the values of $V_{Eff}$, $V_{Act}$ and $I_{Act}$ can be packaged within a single SDO frame. This leaves 2 bits left over. In some implementations, each of the values of C and S can be specified with one respective bit. In such case, all of the values of C, S, $V_{Eff}$, $V_{Act}$ and $I_{Act}$ can be specified using only 32 bits, and thus, be packaged within one SDO CANopen frame.

In some implementations, additional time savings can be achieved using a broadcast status request. For example, rather than sending a status request to each of the WCs on an individual (or "unicast" basis), the NC 500 can broadcast a single status request to all of the WCs it controls. As described above, responsive to receiving the status request, each WC can be programmed to respond by communicating status information such as the values C, S, $V_{Eff}$, $V_{Act}$ and $I_{Act}$ in one or more compact status responses.

Protocol Conversion Module

As described above, one function of the NC 500 can be in translating between various upstream and downstream protocols, for example, to enable the distribution of information between WCs and the MC 400 or between the WCs and the outward-facing network 310. In some implementations, a protocol conversion module 804 is responsible for such translation or conversion services. In various implementations, the protocol conversion module 904 can be programmed to perform translation between any of a number of upstream protocols and any of a number of downstream protocols. As described above, such upstream protocols can include UDP protocols such as BACnet, TCP protocols such as oBix, other protocols built over these protocols as well as various wireless protocols. Downstream protocols can include, for example, CANopen, other CAN-compatible protocol, and various wireless protocols including, for example, protocols based on the IEEE 802.11 standard (for example, WiFi), protocols based on the IEEE 802.15.4 standard (for example, ZigBee, 6LoWPAN, ISA100.11a, WirelessHART or MiWi), protocols based on the Bluetooth standard (including the Classic Bluetooth, Bluetooth high speed and Bluetooth low energy protocols and including the Bluetooth v4.0, v4.1 and v4.2 versions), or protocols based on the EnOcean standard (ISO/IEC 14543-3-10).

Integrated Analytics

In some implementations, the NC 500 uploads the information logged by the data logger 802 (for example, as a CSV file) to the MC 400 on a periodic basis, for example, every 24 hours. For example, the NC 500 can transmit a CSV file to the MC 400 via the File Transfer Protocol (FTP) or another suitable protocol over an Ethernet data link 316. In some such implementations, the status information can then be stored in the database 320 or made accessible to applications over the outward-facing network 310.

In some implementations, the NC 500 also can include functionality to analyze the information logged by the data logger 802. For example, an analytics module 906 can receive and analyze the raw information logged by the data logger 802 in real time. In various implementations, the analytics module 806 can be programmed to make decisions based on the raw information from the data logger 802. In some other implementations, the analytics module 806 can communicate with the database 320 to analyze the status information logged by the data logger 802 after it is stored in the database 320. For example, the analytics module 806 can compare raw values of electrical characteristics such as $V_{Eff}$, $V_{Act}$ and $I_{Act}$ with expected values or expected ranges of values and flag special conditions based on the comparison. For example, such flagged conditions can include power spikes indicating a failure such as a short, an error, or damage to an ECD. In some implementations, the analytics module 806 communicates such data to the tint determination module 810 or to the power management module 812.

In some implementations, the analytics module 806 also can filter the raw data received from the data logger 802 to more intelligently or efficiently store information in the database 320. For example, the analytics module 806 can be programmed to pass only "interesting" information to a database manager 808 for storage in the database 320. For example, interesting information can include anomalous values, values that otherwise deviate from expected values (such as based on empirical or historical values), or for specific periods when transitions are happening. More detailed examples of how raw data can be filtered, parsed, temporarily stored, and efficiently stored long term in a database are described in PCT Patent Application No. PCT/US15/029675 filed May 7, 2015 and titled CONTROL METHOD FOR TINTABLE WINDOWS, which is hereby incorporated by reference in its entirety and for all purposes.

Database Manager

In some implementations, the NC 500 includes a database manager module (or "database manager") 808 configured to store information logged by the data logger 804 to a database on a periodic basis, for example, every hour, every few hours or every 24 hours. In some implementations, the database can be an external database such as the database 320 described above. In some other implementations, the database can be internal to the NC 500. For example, the database can be implemented as a time-series database such as a Graphite database within the secondary memory 506 of the NC 500 or within another long term memory within the NC 500. In some example implementations, the database manager 808 can be implemented as a Graphite Daemon executing as a background process, task, sub-task or application within a multi-tasking operating system of the NC 500. A time-series database can be advantageous over a relational database such as SQL because a time-series database is more efficient for data analyzed over time In some implementations, the database 320 can collectively refer to two or more databases, each of which can store some or all of the information obtained by some or all of the NCs 500 in the network system 300. For example, it can be desirable to store copies of the information in multiple databases for redundancy purposes. In some implementations, the database 320 can collectively refer to a multitude of databases, each of which is internal to a respective NC 500 (such as a Graphite or other times-series database). It also can be desirable to store copies of the information in multiple databases such that requests for information from applications including third party applications can be distributed among the databases and handled more efficiently. In some such implementations, the databases can be periodically or otherwise synchronized to maintain consistency.

In some implementations, the database manager 808 also can filter data received from the analytics module 806 to more intelligently or efficiently store information in an internal or external database. For example, the database manager 808 can additionally or alternatively be programmed to store only "interesting" information to a database. Again, interesting information can include anomalous values, values that otherwise deviate from expected values (such as based on empirical or historical values), or for specific periods when transitions are happening. More detailed examples of how raw data can be filtered, parsed, temporarily stored, and efficiently stored long term in a database are described in PCT Patent Application No. PCT/US15/029675 filed May 7, 2015 and titled CONTROL METHOD FOR TINTABLE WINDOWS, which is hereby incorporated by reference in its entirety and for all purposes.

Tint Determination

In some implementations, the WC, NC 500 or the MC 400 includes intelligence for calculating, determining, selecting or otherwise generating tint values for the IGUs. For example, as similarly described above with reference to the MC 400 of FIG. 7, a tint determination module 810 can execute various algorithms, tasks or subtasks to generate tint values based on a combination of parameters. The combination of parameters can include, for example, the status information collected and stored by the data logger 802. The combination of parameters also can include time or calendar information such as the time of day, day of year or time of season. Additionally or alternatively, the combination of parameters can include solar calendar information such as, for example, the direction of the sun relative to the IGUs. The combination of parameters also can include the outside temperature (external to the building), the inside temperature (within a room adjoining the target IGUs), or the temperature within the interior volume of the IGUs. The combination of parameters also can include information about the weather (for example, whether it is clear, sunny, overcast, cloudy, raining or snowing). Parameters such as the time of day, day of year, or direction of the sun can be programmed into and tracked by the NC 500. Parameters such as the outside temperature, inside temperature or IGU temperature can be obtained from sensors in, on or around the building or sensors integrated on or within the IGUs. In some implementations, various parameters can be provided by, or determined based on information provided by, various applications including third party applications that can communicate with the NC 500 via an API. For example, the network controller application, or the operating system in which it runs, can be programmed to provide the API.

In some implementations, the tint determination module 810 also can determine tint values based on user overrides received via various mobile device applications, wall devices or other devices. In some implementations, the tint determination module 810 also can determine tint values based on commands or instructions received various applications, including third party applications and cloud-based applications. For example, such third party applications can include various monitoring services including thermostat services, alert services (for example, fire detection), security services or other appliance automation services. Additional examples of monitoring services and systems can be found in PCT/US2015/019031 filed 5 Mar. 2015 and titled MONITORING SITES CONTAINING SWITCHABLE OPTICAL DEVICES AND CONTROLLERS. Such applications can communicate with the tint determination module 810 and other modules within the NC 500 via one or more APIs. Some examples of APIs that the NC 500 can enable are described in PCT Patent Application No. PCT/US15/64555 filed Dec. 8, 2015 and titled MULTIPLE INTERFACING SYSTEMS AT A SITE.

Power Management

As described above, the analytics module 806 can compare values of $V_{Eff}$, $V_{Act}$ and $I_{Act}$ as well as sensor data either obtained in real time or previously stored within the database 320 with expected values or expected ranges of values and flag special conditions based on the comparison. The analytics module 806 can pass such flagged data, flagged conditions or related information to the power management 812. For example, such flagged conditions can include power spikes indicating a short, an error, or damage to an ECD. The power management module 812 can then modify operations based on the flagged data or conditions. For example, the power management module 812 can delay tint commands until power demand has dropped, stop commands to troubled WCs (and put them in idle state), start staggering commands to WCs, manage peak power, or signal for help.

CONCLUSION

In one or more aspects, one or more of the functions described herein may be implemented in hardware, digital electronic circuitry, analog electronic circuitry, computer software, firmware, including the structures disclosed in this specification and their structural equivalents thereof, or in any combination thereof. Certain implementations of the subject matter described in this document also can be implemented as one or more controllers, computer programs, or physical structures, for example, one or more modules of computer program instructions, encoded on a computer storage media for execution by, or to control the operation of window controllers, network controllers, and/or antenna controllers. Any disclosed implementations presented as or for electrochromic windows can be more generally implemented as or for switchable optical devices (including windows, mirrors, etc.).

Various modifications to the embodiments described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the devices as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this does not necessarily mean that the operations are required to be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Certain documents are incorporated by reference herein. It should be understood that any disclaimers or disavowals made in such documents do not necessarily apply to the present embodiments. Similarly, features which are described as necessary in such documents may or may not be used in the present embodiments.

What is claimed is:

1. A method of controlling a tint state of an electrochromic device, the method comprising:
   (a) receiving from a user, at a voice recognition module, a voice command or, at a gesture recognition module, a gesture command the voice recognition module configured to interpret the voice command, the gesture recognition module configured to interpret the gesture command, and the voice command or gesture command conveying information for changing the tint state of the electrochromic device to a desired tint state; and
   (b) executing the voice command or gesture command to cause the electrochromic device to transition to the desired tint state.

2. The method of claim 1, further comprising:
   (c) generating a response to the user indicating whether the voice command or gesture command made in (a) is occurring.

3. The method of claim 1, wherein the method is implemented on a network of electrochromic devices, and wherein the method is implemented to control the tint state of a plurality of electrochromic devices on the network.

4. The method of claim 1, wherein the voice command or gesture command from the user in (a) indicates that the electrochromic device should become (i) darker or lighter, (ii) more opaque or less opaque, and/or (iii) more reflective or less reflective.

5. The method of claim 1, wherein the voice command or gesture command from the user in (a) indicates the desired tint state without reference to a starting tint state of the electrochromic device.

6. The method of claim 1, wherein the voice command or gesture command from the user in (a) is a voice command instructing the electrochromic device to switch to the desired tint state according to one or more rules.

7. The method of claim 6, wherein the one or more rules relate to a schedule and the voice command instructs the electrochromic device to switch to the desired tint state at a scheduled time.

8. The method of claim 6, wherein the one or more rules relate to weather and the voice command instructs the electrochromic device to switch to the desired tint state if a particular weather condition occurs.

9. The method of claim 6, wherein the electrochromic device is installed in a building, wherein the one or more rules relate to environmental conditions within the building, and wherein the voice command instructs the electrochromic device to switch to the desired tint state if an internal condition within the building occurs.

10. The method of claim 1, wherein the voice command or gesture command from the user in (a) comprises the gesture command.

11. A system for controlling a tint state of an electrochromic device in response to a voice command or a gesture command from a user, the system comprising:
- (a) at least one element selected from the group consisting of: a microphone, a video camera, and a motion sensor, wherein the voice command or gesture command is perceived by the microphone, video camera, and/or motion sensor, and wherein the voice command or gesture command conveys information for changing the tint state of the electrochromic device to a desired tint state;
- (b) a controller communicatively coupled with the electrochromic device and configured to control the tint state of the electrochromic device;
- (c) a command execution module configured to execute the voice command or gesture command to cause the electrochromic device to transition to the desired tint state;
- (d) a voice recognition module configured to interpret the voice command; and
- (e) a gesture recognition module configured to interpret the gesture command.

12. The system of claim 11, implemented on a network of electrochromic devices, wherein the system is implemented to control the tint state of a plurality of electrochromic devices on the network.

13. The system of claim 11, further comprising a response generation module configured to generate a response to the user.

14. The system of claim 11, further comprising an authentication module configured to confirm whether the user is authorized to control the electrochromic device as requested in the voice command or gesture command.

15. The system of claim 11, wherein the microphone, video camera, and/or motion sensor are provided onboard the electrochromic device.

16. The system of claim 11, wherein the microphone, video camera, and/or motion sensor are provided on an electronic device that communicates with the electrochromic device.

17. The system of claim 16, wherein the electronic device is a smartphone, tablet, laptop, personal computer, fitness device, watch, or wall unit.

18. The system of claim 11, wherein the gesture command is perceived by the motion sensor, wherein the motion sensor is provided on an electronic device that communicates with the electrochromic device, and wherein the motion sensor comprises one or more accelerometers, gyroscopes, and/or magnetometers.

19. The system of claim 11, further comprising a voice recognition module or a gesture recognition module, the voice recognition module or gesture recognition module being configured to convert the voice command or gesture command into a text command, wherein the command execution module executes the voice command or gesture command by executing the text command.

* * * * *